United States Patent
Sasaki et al.

(10) Patent No.: US 6,298,460 B1
(45) Date of Patent: Oct. 2, 2001

(54) CODE IMAGE DATA OUTPUT APPARATUS AND METHOD

(75) Inventors: Hiroshi Sasaki, Hachioji; Shinichi Imade, Iruma, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/566,016

(22) Filed: May 5, 2000

Related U.S. Application Data

(63) Continuation of application No. 08/900,959, filed on Jul. 25, 1997, now Pat. No. 6,134,695.

(30) Foreign Application Priority Data

Aug. 7, 1996 (JP) .................................................. 8-208197

(51) Int. Cl.[7] .............................................. H03M 13/00
(52) U.S. Cl. ........................................................ 714/752
(58) Field of Search .................................. 714/763, 752; 369/59; 348/383

(56) References Cited

U.S. PATENT DOCUMENTS

| | | |
|---|---|---|
| 4,658,369 | 4/1987 | Sugiura . |
| 5,073,820 | 12/1991 | Nakagawa et al. ............. 375/240.03 |
| 5,136,390 | 8/1992 | Inova et al. ............................ 348/383 |
| 5,513,264 | 4/1996 | Wang et al. ............................ 380/51 |
| 5,564,001 | 10/1996 | Lewis ................................. 345/302 |
| 5,644,557 | 7/1997 | Akamine et al. ...................... 369/14 |
| 5,719,886 | * 2/1998 | Matsui et al. ......................... 714/763 |
| 5,751,718 | 5/1998 | Yip et al. ............................... 370/468 |
| 5,764,611 | * 6/1998 | Watanabe ............................... 369/59 |
| 5,896,403 | 4/1999 | Nagasaki et al. ...................... 714/752 |
| 5,898,709 | 4/1999 | Imade et al. .......................... 714/763 |
| 6,037,915 | * 3/2000 | Matsueda et al. ....................... 345/8 |

FOREIGN PATENT DOCUMENTS

| | | |
|---|---|---|
| 0670555 A1 | 9/1995 | (EP) . |
| 0713194 A1 | 5/1996 | (EP) . |
| 60-2680 | 1/1985 | (JP) . |
| 62-212176 | 9/1987 | (JP) . |

OTHER PUBLICATIONS

Jagannathan et al., A Number Theory based Image Coding, IEEE, Nov. 18–20, 1996.*

* cited by examiner

*Primary Examiner*—Albert Decady
*Assistant Examiner*—Shelly A Chase
(74) *Attorney, Agent, or Firm*—Frishauf, Holtz, Goodman, Langer & Chick, P.C.

(57) ABSTRACT

A compressed data amount calculation section calculates the data amount of compression-coded data corresponding to input multimedia information in advance before a code image is recorded. A precode image data generation section generates precode image data determined on the basis of the calculated data amount and displays the precode image data on a display section. The user changes various coding parameters through a user setting section while observing the displayed precode image data to regenerate the precode image data, thereby obtaining the desired size. A code image data generation section generates actual code image data in accordance with the changed coding parameters.

10 Claims, 51 Drawing Sheets

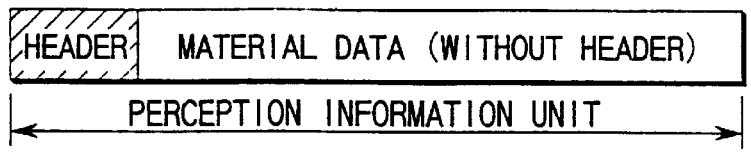
FIG. 3
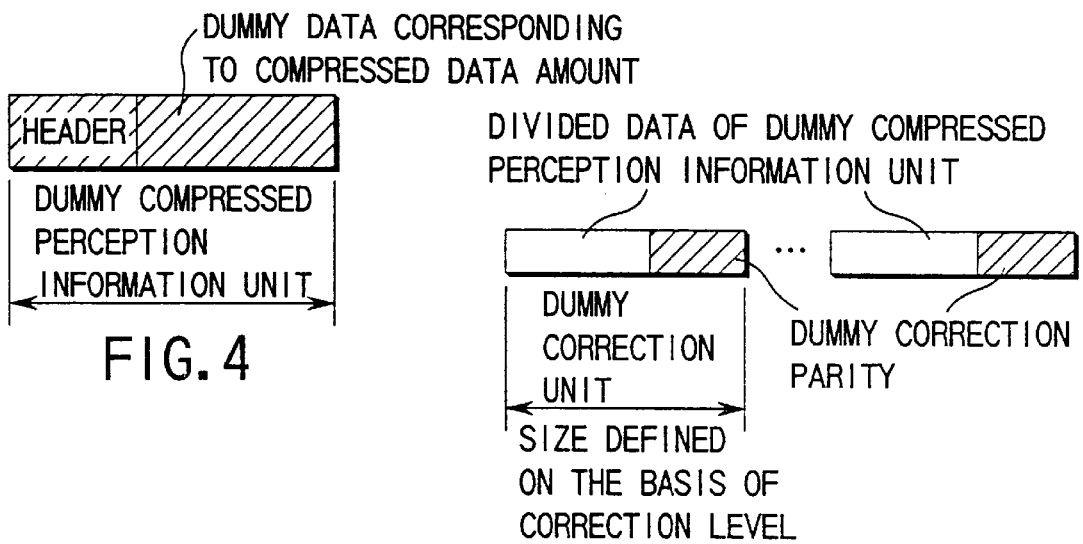
FIG. 4
FIG. 5
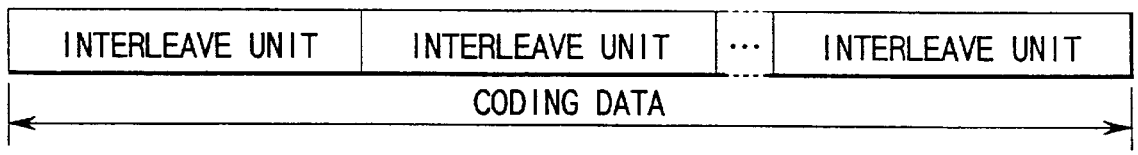
FIG. 6
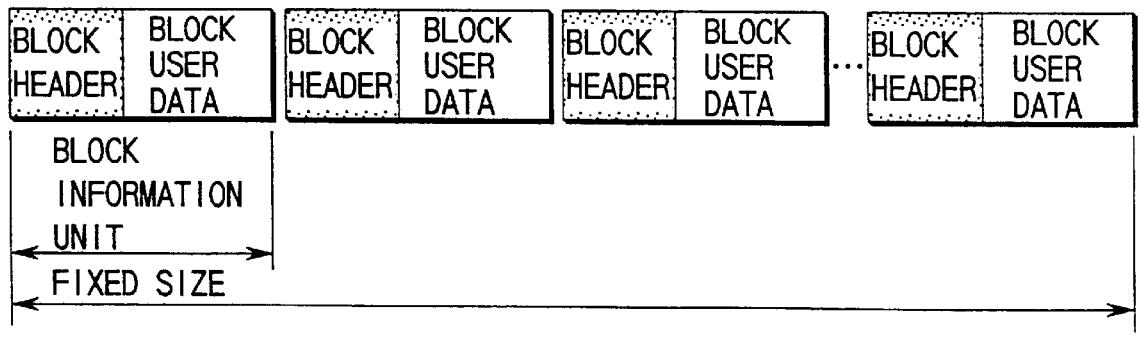
FIG. 7

PRECODE IMAGE

CODE IMAGE

BLOCK PATTERN IMAGE

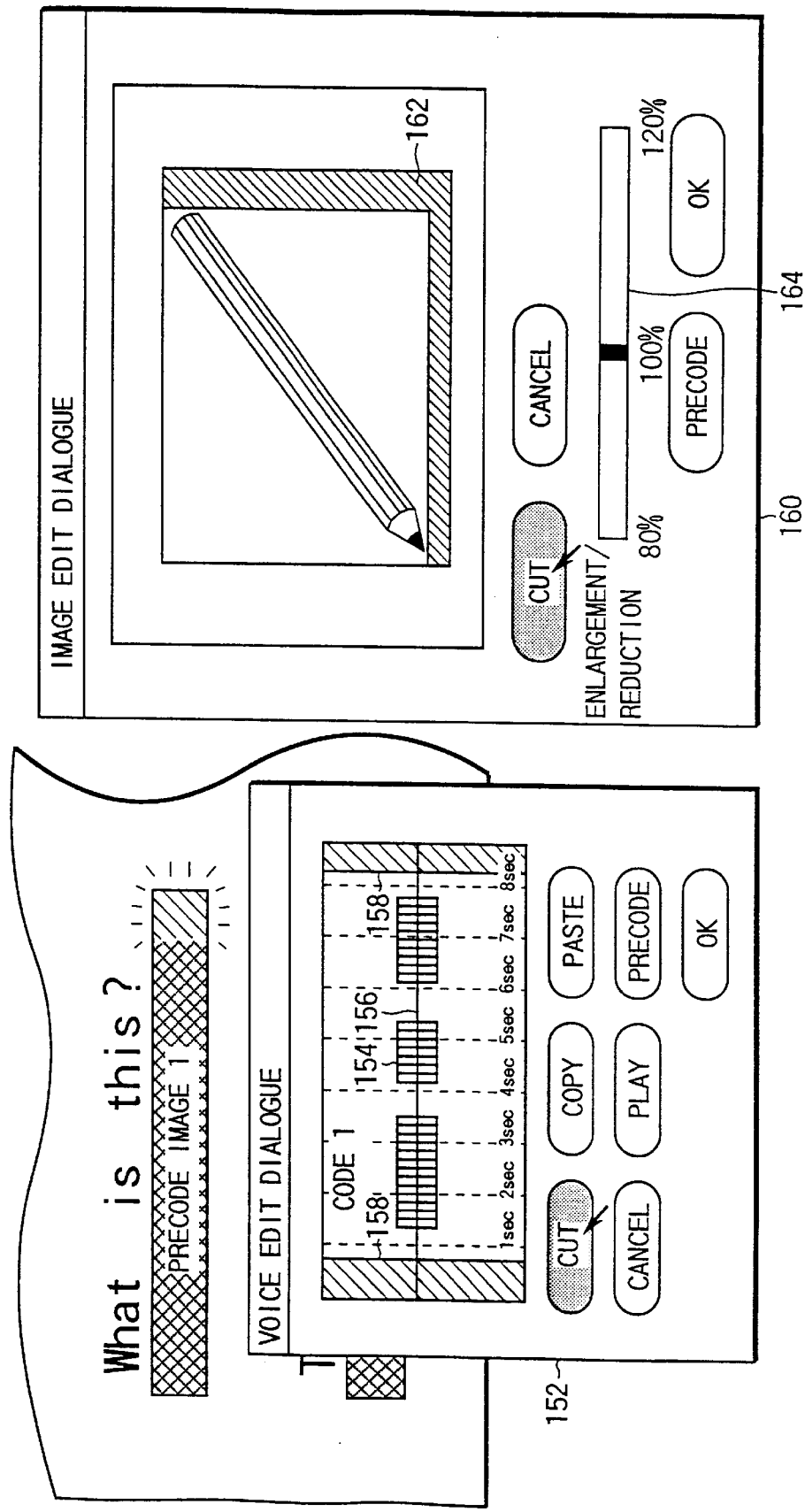

| FILE HEADER | PERCEPTION INFORMATION UNIT 1 | PERCEPTION INFORMATION UNIT 2 | ... | PERCEPTION INFORMATION UNIT N |

| OUTPUT STATE EDIT PANEL (OUTPUT TIME/PERIOD/WINDOW) | | | | | |
|---|---|---|---|---|---|
| SETTING MODE: OUTPUT TIME / OUTPUT PERIOD / OUTPUT WINDOW | | | | | |

| PERCEPTION INFORMATION UNIT | OUTPUT WINDOW | | | | |
|---|---|---|---|---|---|
| | Win No.1 | Win No.2 | Win No.3 | Win No.4 | Win No.5 |
| No.1 | 🔊 | | | | |
| No.2 | | | 😀 | | |
| No.3 | | ABC | | | |
| No.4 | ABC | | | | |
| No.5 | | | 😀 | | |
| No.6 | | | | | 🔊 |
| No.7 | | | | | 😀 |
| No.8 | | | | 😀 | |
| | | ABC | | | |

FILE ID: 5
FILE NAME: XXXX.mmp

PREVIEW    RECORD    CANCEL

SS(n):nTH PERCEPTION INFORMATION UNIT OR DUMMY
COMPRESSED PERCEPTION INFORMATION UNIT
DUMMY COMPRESSED PERCEPTION INFORMATION UNIT:
INFORMATION UNIT WHICH HAS NO ACTUAL DATA BUT
VIRTUAL DATA AS USER DATA

| CORRECTION LEVEL SETTING | | |
|---|---|---|
| ※SELECT CODE PREPARATION OR USE ENVIRONMENT | | |
| PAPER | PRINT ENVIRONMENT | CODE USE SITUATION |
| NORMAL PAPER | A PRINT SHOP ○○ PRINTING PRESS | ILLUSTRATED BOOK FOR CHILD |
| COATED PAPER | B PRINT SHOP ×× PRINTING PRESS | REFERENCE BOOK FOR JUNIOR HIGH SCHOOL STUDENT |
| MEDIUM-GRADE PAPER | X MAKER △△ PRINTER | OA REFERENCE MATERIAL |
| SYNTHETIC PAPER | Y MAKER ◇◇ PRINTER | NEWSPAPER/ MAGAZINE |

FIG. 68

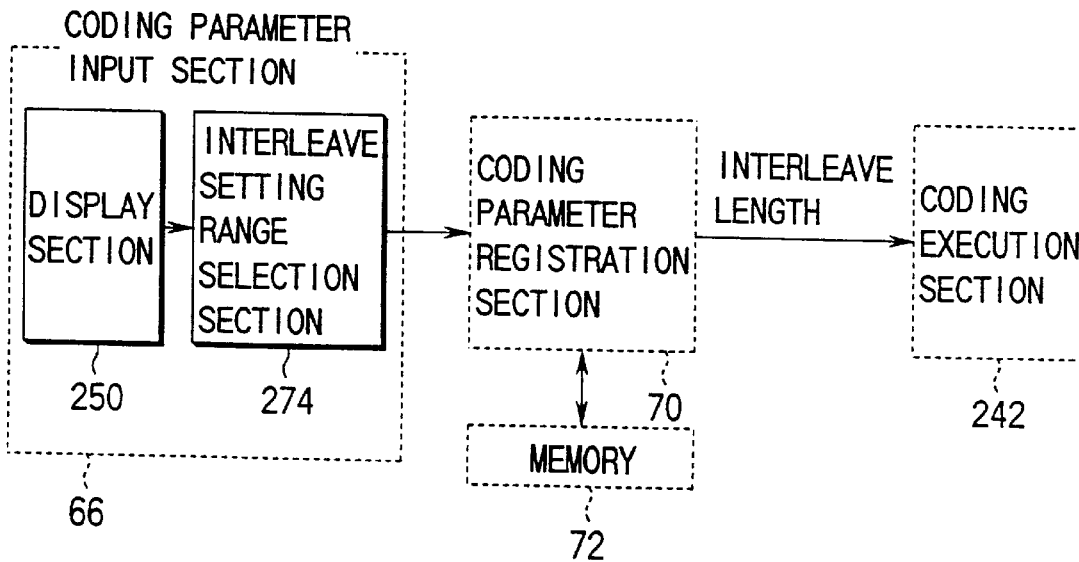

FIG. 69

CODE IMAGE GENERATION CONDITION SETTING

| | |
|---|---|
| IMAGE FORMAT | ○ PICT  ○ TIFF  ● EPS |
| BLOCK SIZE | [30 ▼] |
| PRINT RESOLUTION | [2400dpi ▼] [1234] |
| DOT SHAPE | [AUTO ▼] |
| DOT PITCH | [6] 63 ($\mu$) |
| DOT SIZE | ROW DIRECTION [ ]  COLUMN DIRECTION [ ] |
| CODE DIRECTION | [VERTICAL ▼] |
| NUMBER OF DIVIDED CODES | [2] |
| BLOCK PATTERN | [2×1×2 ▼] |
| NUMBER OF TIMES OF REPETITION | [2] |
| ISSUER CODE | XXXX |

( SET )    ( CANCEL )

PRINT RESOLUTION [2400dpi ▼] [1234] — NUMERICAL VALUE INPUT FROM KEYBOARD

CODE IMAGE DATA OUTPUT APPARATUS AND METHOD

This application is a continuation of Ser. No. 08/900,959 filed Jul. 25, 1997, U.S. Pat. No. 6,134,695.

BACKGROUND OF THE INVENTION

The present invention relates to a code image data output apparatus and method for converting so-called multimedia information including audio information such as voice data or music data, image information obtained from a camera or a video device, and digital code data obtained from a personal computer or a word processor into an optically readable code pattern and outputting the code pattern.

Various media including magnetic tapes and optical disks are conventionally known as media for recording voice data or music data. However, such media require a large storage space and have a relatively high unit cost even when they are duplicated in a large quantity. In addition, it takes a long time to deliver an audio data-recorded medium to a person in a remote place, regardless of whether the medium is sent by mail or directly handed. This applies not only to such audio information but also to so-called multimedia information including image information obtained from a camera or a video device and digital code data obtained from a personal computer or a word processor.

As a technique of coping with such problems, EP 0,670,555 A1 (corresponding to U.S. Ser. No. 08/407,018) or EP 0,713,194 A1 (corresponding to U.S. Ser. No. 08/586,792) by the present assignee discloses an apparatus which records, on an information recording medium such as a paper sheet, multimedia information including at least one of audio information, image information, and digital code data in the form of a two-dimensional code pattern formed by two-dimensionally arranging a plurality of dots as image information, i.e., coded information allowing facsimile transmission and inexpensive duplication in a large quantity.

In the above prior arts, however, neither functions necessary for printing a code on printed matter nor specific processing methods/procedures for a coding process of actually generating a code are sufficiently described. Particularly, processes of realizing code size editing which is desired for layout editing together with a general original are not considered.

As a bar code printing technique as a technique of recording an optically readable code pattern, a technique disclosed in, e.g., Jpn. Pat. Appln. KOKAI Publication No. 62-212176 is known. According to this technique, the bar code length, the direction (vertical or horizontal) of the bar code, the ratio of thickness can be set by a user, and high-quality code printing can be performed using a general-purpose printer.

In this prior art, however, no proposals are made for processes of coding one or a plurality of perception information, code size editing based on data amount adjustment for realizing a desired printing layout, and a technique of setting the pattern shape of a bar as a recording unit.

BRIEF SUMMARY OF THE INVENTION

The present invention has been made in consideration of the above situations, and has as its object to provide a code image data output apparatus and method for converting so-called multimedia information into optically readable code pattern image data, which enable quick and easy confirmation and size adjustment of data coded in perception information units or linking units of a plurality of perception information units and also allow a user to record intended or permitted recording information in an intended or permitted code size.

The perception information unit corresponds to a subset as a user recognizable information unit disclosed in EP 0,713,194 A1 (corresponding to U.S. Ser. No. 08/586,792). More specifically, the perception information unit is a data block which can be recognized as one information unit such as information containing only voice data or information containing only image data. When a plurality of pieces of voice information exist, each voice information is defined as a perception information unit, i.e., a data block which can be recognized as one information unit.

It is another object of the present invention to provide a function of enabling code size adjustment without changing information contents.

It is still another object of the present invention to provide a function of allowing a user to flexibly set a correction condition and a print condition such that user control can be easily performed in accordance with the rate of error generation depending on a code print condition/code use situation.

It is still another object of the present invention to provide a function of allowing a user to flexibly set an output state (output position/time/period) such that user control for the output state of coded multimedia information can be easily performed.

It is still another object of the present invention to provide a function of allowing a user to flexibly set a management structure with which a perception information unit can be divided in a coding process and decoded such that the data can be reproduced while preventing the recording capacity of a perception information unit to be recorded or a multimedia file constituted by linked perception information units from depending on the storage capacity of a reproduction device.

According to a first aspect of the present invention, there is provided a code image data output apparatus which outputs code image data corresponding to multimedia information including at least one of voice information and image information to a recording device for recording the multimedia information on a recording medium as an optically readable code image, comprising:

input means for inputting the multimedia information;

compression coding means for compression-coding data corresponding to the multimedia information input by the input means; and code conversion means for converting the data compression-coded by the compression coding means into code data, converting the code data into optically readable code image data according to a predetermined recording format, and outputting the code image data, wherein the compression coding means includes data amount calculation means for calculating, in advance before the code image is recorded, a data amount of the compression-coded data corresponding to the multimedia information input by the input means, and the code conversion means includes precode generation means for generating precode image data determined on the basis of the data amount calculated by the data amount calculation means and outputting the precode image data before the code image is recorded.

According to a second aspect of the present invention, there is provided a code image data output apparatus which outputs code image data corresponding to multimedia information including at least one of voice information and image information to a recording device for recording the multimedia information on a recording medium as an optically readable code image, comprising:

input means for inputting the multimedia information;

compression coding means for compression-coding data corresponding to the multimedia information input by the input means;

code conversion means for converting the data compression-coded by the compression coding means into code data, converting the code data into optically readable code image data according to a predetermined recording format, and outputting the code image data;

switching means for performing switching between a precode image generation mode in which a data amount of the compression-coded data corresponding to the multimedia information input by the input means is calculated in advance before the code image is recorded, and precode image data determined on the basis of the calculated data amount is generated and output, and a code image generation mode in which the data corresponding to the multimedia information input by the input means is compression-coded, the compressed data is converted into the code data, the code data is converted into the optically readable code image data according to the predetermined recording format, and the code image data is output.

According to a third aspect of the present invention, there is provided a code image data output method of outputting code image data corresponding to multimedia information including at least one of voice information and image information to a recording device for recording the multimedia information on a recording medium as an optically readable code image, comprising the steps of:

calculating a data amount of compression-coded data corresponding to the input multimedia information in advance;

generating precode image data on the basis of the calculated data amount;

compression-coding the data corresponding to the multimedia information and converting the data into code data; and converting the code data into optically readable code image data according to a predetermined recording format and outputting the code image data.

According to a fourth aspect of the present invention, there is provided a code image data output apparatus which outputs code image data corresponding to multimedia information including at least one of voice information and image information to a recording device for recording the multimedia information on a recording medium as an optically readable code image, comprising:

input means for inputting the multimedia information;

unit information generation means for dividing the multimedia information input by the input means into predetermined information units and generating at least one unit information;

compression coding means for compression-coding unit data corresponding to the unit information in units of unit information generated by the unit information generation means; and code conversion means for converting at least one unit data compression-coded by the compression coding means into code data, converting the code data into optically readable code image data according to a predetermined recording format, and outputting the code image data, wherein the compression coding means comprises data amount calculation means for calculating, in advance before the code image is recorded, a data amount of the compression-coded unit data in units of unit information generated by the unit information generation means, and the code conversion means comprises precode generation means for generating precode image data determined on the basis of the amount of the at least one unit data, which is calculated by the data amount calculation means before the code image is recorded, and outputting the precode image data.

According to a fifth aspect of the present invention, there is provided a code image data output apparatus which outputs code image data corresponding to multimedia information including at least one of voice information and image information to a recording device for recording the multimedia information on a recording medium as an optically readable code image, comprising:

input means for inputting the multimedia information;

unit information generation means for dividing the multimedia information input by the input means into predetermined information units and generating at least one unit information;

compression coding means for compression-coding unit data corresponding to the unit information in units of unit information generated by the unit information generation means;

code conversion means for converting at least one unit data compression-coded by the compression coding means into code data, converting the code data into optically readable code image data according to a predetermined recording format, and outputting the code image data; and switching means for performing switching between a precode image generation mode in which a data amount of the compression-coded unit data in units of unit information generated by the unit information generation means is calculated in advance before the code image is recorded, and precode image data determined on the basis of the calculated amount of at least one unit data is generated and output, and a code image generation mode in which the unit data is compression-coded in units of unit information generated by the unit information generation means, the at least one compressed unit data is converted into the code data, the code data is converted into the optically readable code image data according to the predetermined recording format, and the code image data is output.

According to a sixth aspect of the present invention, there is provided a code image data output method of outputting code image data corresponding to multimedia information including at least one of voice information and image information to a recording device for recording the multimedia information on a recording medium as an optically readable code image, comprising the steps of:

dividing the input multimedia information into predetermined information units;

calculating a data amount of compression-coded unit data corresponding to the unit information in units of the divided unit information in advance;

generating precode image data on the basis of the calculated amount of at least one unit data;

compression-coding the unit data in units of unit information to convert the unit data into code data; and converting the code data into optically readable code image data according to a predetermined recording format and outputting the code image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a view showing the multimedia source file of a perception information unit;

FIG. 4 is a view showing dummy compressed perception information unit;

FIG. 5 is a view showing a dummy correction unit;

FIG. 6 is a view showing coding data;

FIG. 7 is a view showing a block information unit;

FIG. 33 is a view showing a voice edit dialogue;

FIG. 34 is a view showing an image edit dialogue;

FIG. 60 is a view showing an output state edit panel in setting an output window;

FIG. 61 is a view showing the output state edit panel in setting an output time and an output period;

FIG. 68 is a view showing a correction level setting window in this case;

FIG. 69 is a block diagram for explaining the arrangement of a coding parameter input section for setting an error correction condition (interleave);

FIG. 78 is a view showing a precode image generation condition setting window;

FIG. 79 is a view showing a print resolution setting window in the precode image generation condition setting window;

DETAILED DESCRIPTION OF THE INVENTION

Embodiments of the present invention will be described below.

Figure 1:
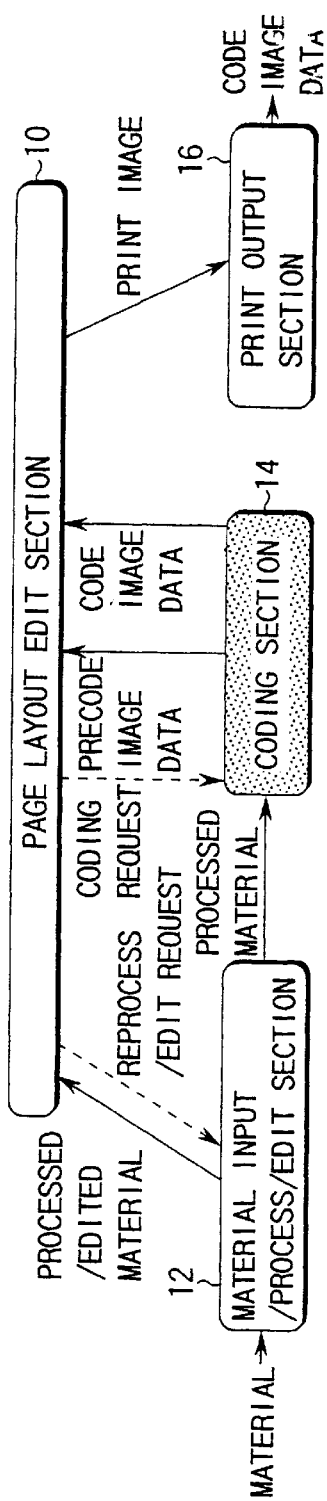
FIG. 1 is a block diagram showing the overall system arrangement of the present invention.

FIG. 1 is a block diagram schematically showing the overall arrangement of a code image data output apparatus. This code image data output apparatus is constituted by a page layout edit section 10, a material input/process/edit section 12, and a coding section 14. A print output section 16 serving as a recording device is also connected to the code image data output apparatus.

The material input/process/edit section 12 has a material input function and a primary process/edit function. The material input/process/edit section 12 processes/edits a material such as image data/character data to be laid out on printed matter, and supplies the processed/edited material to the page layout edit section 10. The material input/process/edit section 12 also processes/edits a material such as voice data/image data/character data to be coded, and supplies the material to the coding section 14. More specifically, the material input/process/edit section 12 receives a material such as voice data input from a microphone or image data read by a scanner or the like and processes the input material in accordance with a process request signal from the page layout edit section 10. For voice data, the amplitude is changed, fade-in/fade-out processing is performed, or an unnecessary portion is cut. For image data, enlargement/reduction is performed, an unnecessary portion is cut, or edge emphasis or color change processing is performed.

The coding section 14 converts processed data input from the material input/process/edit section 12 into optically readable code data in accordance with a coding request signal from the page layout edit section 10. First, not code data but precode image data is output to the page layout edit section 10. The user determines the page layout on the basis of the precode image data through the page layout edit section 10. The precode image (to be described later in detail) represents a page space occupied by actual code image data and can be easily and quickly calculated on the basis of the data amount, the compression level, the error correction level, and the like. When the layout is determined, a coding request signal is supplied from the page layout edit section 10 to the coding section 14. The coding section 14 generates actual code image data in accordance with this coding request signal and sends the code image data to the page layout edit section 10.

The page layout edit section 10 synthesizes the input code image data with another data to be recorded on the paper, thereby generating print image data. The print image data is sent to the page layout edit section 10 and printed/recorded on an actual paper sheet.

Figure 2:
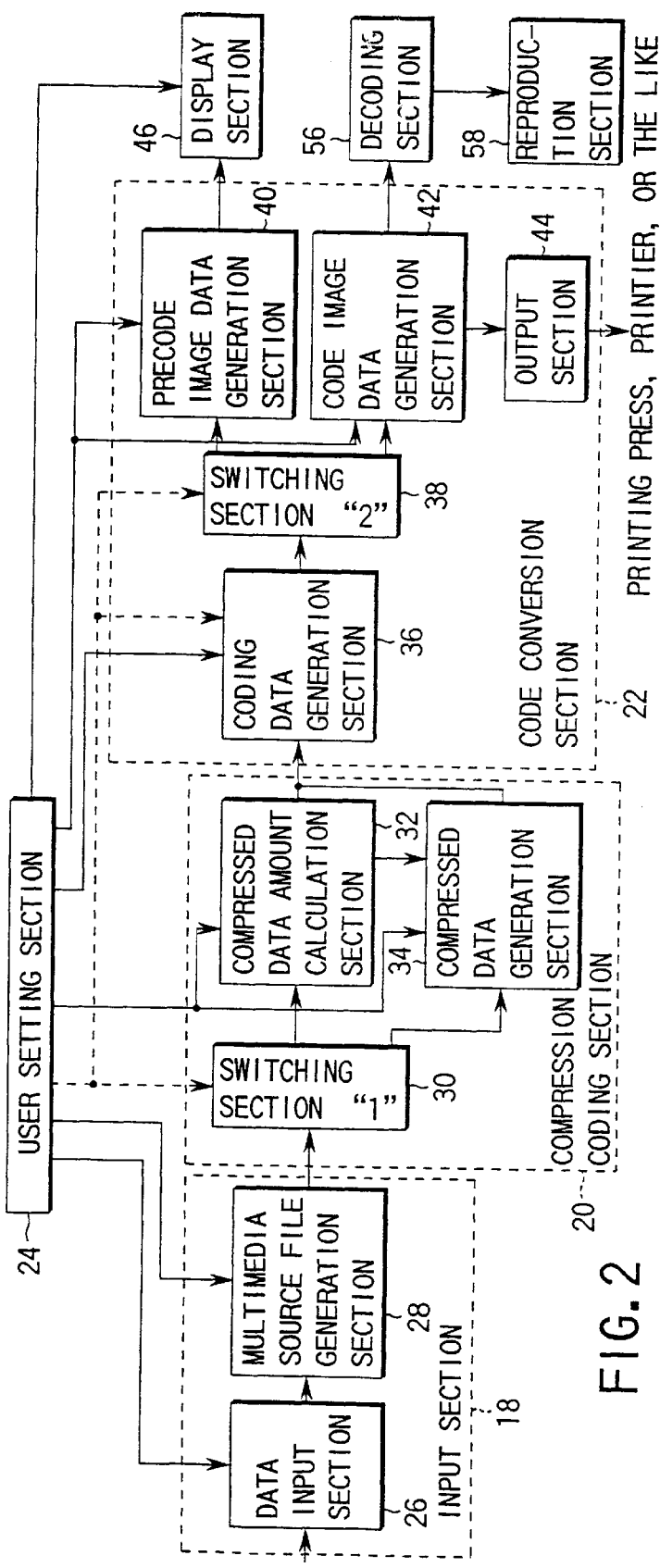
FIG. 2 is a block diagram showing the arrangement of the first embodiment.

FIG. 2 is a block diagram showing the arrangement of a code image data output apparatus according to the first embodiment. The code image data output apparatus of this embodiment comprises an input section 18, a compression coding section 20, a code conversion section 22, and a user setting section 24.

The input section 18 is constituted by a data input section 26 and a multimedia source file generation section 28.

The data input section 26 stores an input material. When analog voice data is input from a microphone or a tape recorder, the data input section 26 A/D-converts the data, adds a header for, e.g., a wave file to the digital data, and files and stores the data. When digital image data obtained by digitizing a picture or the like with a scanner or a digital camera is input, the data input section 26 adds a header for TIFF or PICT to the digital data, and files and stores the digital data.

The user performs initial editing/processing of the stored data and selects, through the user setting section 24, data to be coded. The selected file is input to the multimedia source file generation section 28.

The multimedia source file generation section 28 deletes the header of the input file, adds a header for a dot code having a data structure common to voice data and image data to the remaining material data, and outputs the data to the compression coding section 20 as the multimedia source file of a perception information unit as shown in FIG. 3.

The compression coding section 20 is constituted by a switching section "1" 30, a compressed data amount calculation section 32, and a compressed data generation section 34.

The data output from the multimedia source file generation section 28 is input to the switching section "1" 30. The switching section "1" 30 selectively outputs the input data to the compressed data amount calculation section 32 or the compressed data generation section 34 in accordance with a mode selected by the user setting section 24. When a precode mode is selected, the input data is supplied to the compressed data amount calculation section 32. When a code image generation mode is selected, the input data is supplied to the compressed data generation section 34.

When the precode mode is selected, the compressed data amount calculation section 32 calculates the compressed data amount of the perception information unit output from the switching section "1" 30 on the basis of, e.g., a compression level selected by the user setting section 24. The data size in the header of the input perception information unit is rewritten to a data size corresponding to the calculated compressed data amount to prepare a new header, and dummy data corresponding to the calculated compressed data amount is added to the header. This data shown in FIG. 4 will be referred to as a dummy compressed perception information unit hereinafter. The dummy compressed perception information unit is output to the code conversion section 22.

The code conversion section 22 is constituted by a coding data generation section 36, a switching section "2" 38, a precode image data generation section 40, a code image data generation section 42, and an output section 44.

In the code conversion section 22, the dummy compressed perception information unit output from the compressed data amount calculation section 32 is input to the coding data generation section 36. The coding data generation section 36 performs correction code addition processing and interleave processing for the dummy compressed perception information unit in accordance with information including a correction level and an interleaving scheme supplied from the user setting section 24, thereby generating coding data. More specifically, the coding data generation section 36 divides the input dummy compressed perception information unit into a plurality of data and adds a dummy correction parity to each of the divided data, thereby generating dummy correction units as shown in FIG. 5. When a correction parity is actually added to the divided data as a correction unit, processing takes a long time. For this reason, the dummy correction parity is added. The number of bytes necessary for the correction parity can be determined on the basis of the correction level. The generated the dummy correction units are interleaved in accordance with the interleaving unit to generate one coding data as shown in FIG. 6. This coding data is output to the switching section "2" 38.

The switching section "2" 38 selectively outputs the input data to the precode image data generation section 40 or the code image data generation section 42 in accordance with a mode selected by the user setting section 24, like the switching section "1" 30. More specifically, when the precode mode is selected, the input data is supplied to the precode image data generation section 40. When the code image generation mode is selected, the input data is supplied to the code image data generation section 42.

Figure 8:
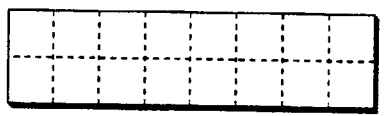
FIG. 8 is a view showing precode image data.

When the precode mode is selected, the precode image data generation section 40 divides the coding data supplied from the switching section "2" 38 into block information units (fixed size defined by the dot code format) each made of a block header and block user data, as shown in FIG. 7. The size of a precode image is determined on the basis of the divided block information units and information including a dot size and a resolution supplied from the user setting section 24. More specifically, the number of blocks of a dot code is determined on the basis of the number of divided block information units, and a recording area per block is determined on the basis of the resolution and the like, thus defining the size of the entire code image. With this processing, precode image data consisting of, e.g., an outer frame is generated, as shown in FIG. 8.

The precode image generated by the precode image data generation section 40 is input to a display section 46 so that the precode image is displayed on the layout page.

The user performs layout processing on the basis of the precode image. Upon determining the layout, the user setting section 24 outputs a switching signal representing the code image generation mode to the switching section "1" 30 and the switching section "2" 38.

Figure 9:
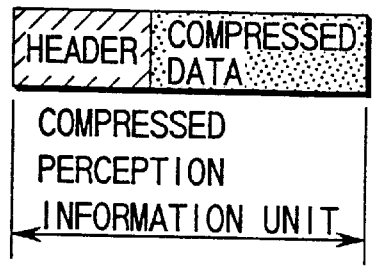
FIG. 9 is a view showing a compressed perception information unit.

The switching section "1" 30 supplies the input data to the compressed data generation section 34. The compressed data generation section 34 receives a compression level which has already been set by the user setting section 24 and a compression parameter calculated by the compressed data amount calculation section 32. The compressed data generation section 34 compresses the material data portion of the perception information unit supplied from the switching section "1" 30 on the basis of the compression level and the compression parameter, thereby generating a compressed perception information unit as shown in FIG. 9. The compressed perception information unit is input to the coding data generation section 36 in the code conversion section 22.

Figure 10:
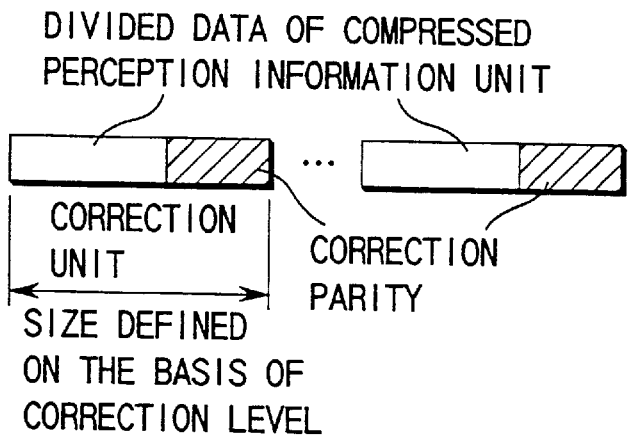
FIG. 10 is a view showing a correction unit.

The coding data generation section 36 divides the input compressed perception information unit into a plurality of data and actually adds a correction parity to each of the divided data, thereby generating correction units, as shown in FIG. 10. These correction units are interleaved to generate coding data, as shown in FIG. 6. The coding data is output to the switching section "2" 38.

Since the code image generation mode is selected by the user setting section 24, the switching section "2" 38 supplies the input data to the code image data generation section 42.

Figure 11:
FIG. 11 is a view showing code image data.
Figure 12:
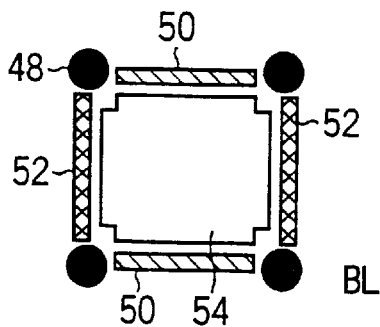
FIG. 12 is a view showing the structure of one block of a dot code.

The code image data generation section 42 divides the input coding data into block information units each made of a block header and block user data, as shown in FIG. 7, to form actual code image data as shown in FIG. 11. In FIG. 11, one square represents one block of a dot code as disclosed in EP 0,713,194 A1 (corresponding to U.S. Ser. No. 08/586, 792). More specifically, each block has an area with a marker 48 arranged at the upper left corner, as shown in FIG. 12, and is surrounded by a total of four markers, i.e., the marker 48, the marker of a block on the right side, the marker of a block on the lower side, and the marker of a block on the lower right side. A pattern code 50 consisting of predetermined matching pattern dots is arranged at a predetermined position with respect to the marker 48 of the block, e.g., between the marker 48 and the adjacent marker on the right side. In addition, a block header 52 including address dots representing a block address is arranged at a predetermined position with respect to the marker 48, e.g., between the marker 48 and the adjacent marker on the lower side. Each of the pattern dots and the address dots basically has the same size as that of a data dot arranged in a block user data area 54. However, the dots need not always have the same size.

The code image data as a print image generated by the code image data generation section 42 and described in a predetermined format is sent to the output section 44. The output section 44 obtains an interface to a printing press or printer serving as a recording device (not shown), i.e., converts the print image into a data format corresponding to the printing scheme of the printing press or printer and outputs the data to the printing device. As the description format of code image data to be sent to the output section 44, bitmap, postscript, or TIFF is used, and a format may be selected in accordance with the specifications of the output section 44.

To check whether the code image data generated by the code image data generation section 42 has been generated as a proper print image, the data is also supplied to the decoding section 56. The decoding section 56 converts the supplied print image data into data with the same resolution as that of a reproduction device for reading the dot code actually recorded on a paper sheet and reproducing the image data, and converts the resolution-converted print image data into an actual data string using the same read algorithm as that of the reproduction device. The data is sent to a reproduction section 58 to reproduce voice or image data. For image data, the display section 46 can also be used as the reproduction section 58, as a matter of course. To more easily check the contents of the generated code, the block information unit group may be recorded in another area (e.g., a header) together with the code image, and the voice or image data may be reproduced from the block information unit group.

Figure 13:
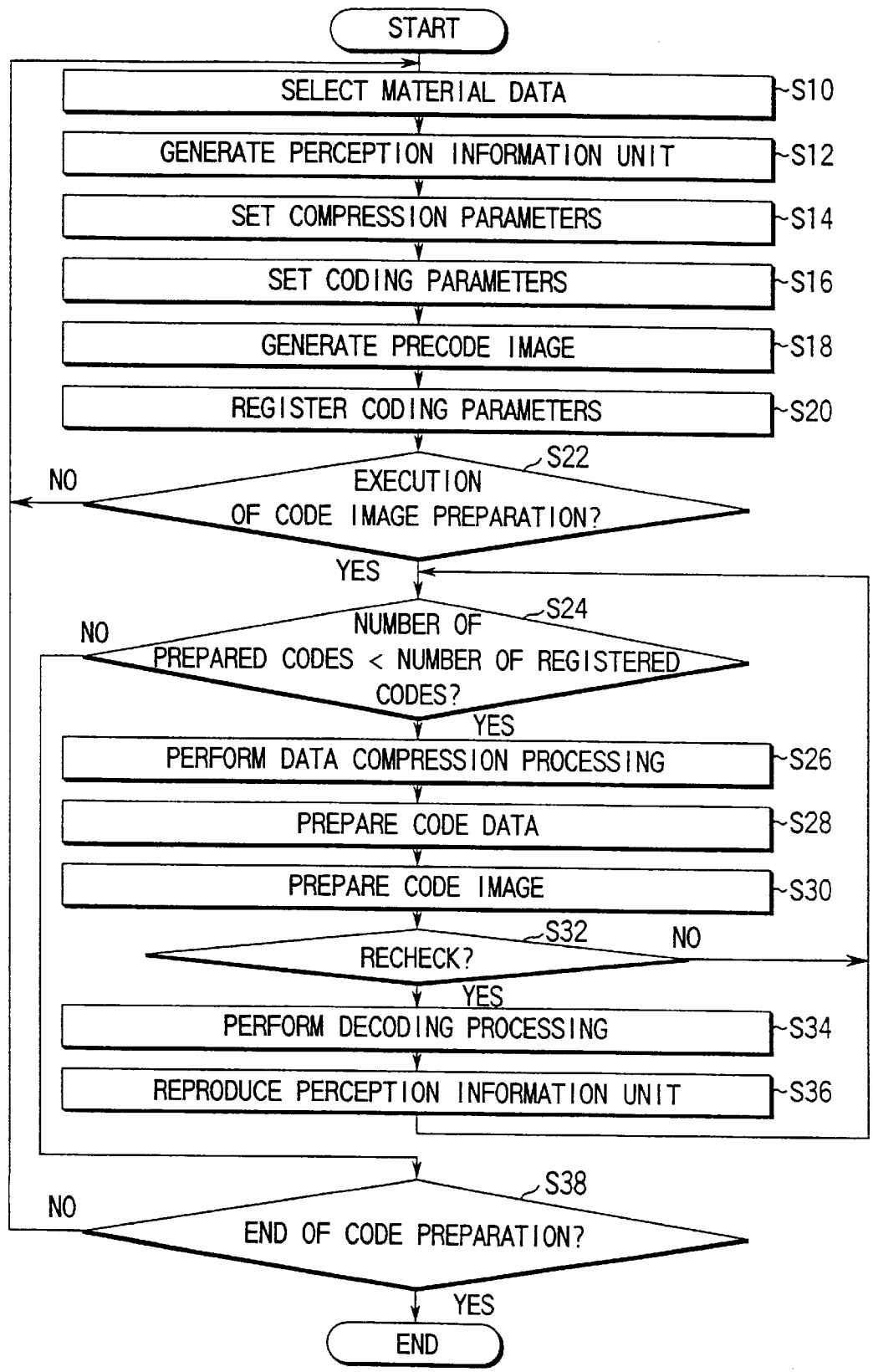
FIG. 13 is a flow chart of the operation of the first embodiment.

FIG. 13 is a flow chart showing the above-described operation.

The user selects material data through the user setting section 24 (step S10) and generates a perception information unit (step S12). The user setting section 25 sets a compression parameter (step S14), coding parameters, i.e., a correction level, an interleaving level, and the size and shape of a dot constituting a dot code (step S16). A precode image is generated (step S18), and the coding parameters at that time are registered in a memory (not shown) in the user setting section 24 (step S20).

The user determines whether a code image is to be prepared, i.e., whether another precode image is to be prepared (step S22). If another precode image is to be prepared, the flow returns to step S10. Material data is newly selected, another precode image is prepared, and coding parameters are registered.

If generation of a code image is to be executed, it is determined whether the number of prepared codes is smaller than the number of registered codes in the coding parameters (step S24). This determination is made because code images are prepared until the number of already prepared codes reaches the number of registered codes in the coding parameters.

If the number of prepared codes is smaller than the number of registered codes in the coding parameters, data compression processing is actually performed (step S26) to prepare code data (step S28), thereby preparing a code image (step S30). The user determines whether reproduction check is to be performed (step S32). If NO in step S32, the flow returns to step S24. If YES in step S32, decoding processing is performed (step S34) to reproduce the perception information unit (step S36), and the flow returns to step S24.

If it is determined in step S24 that coding of all registered codes is complete, i.e., when the number of prepared codes has reached the number of codes to be prepared, the user selects whether code preparation is to be ended (step S38). If NO in step S38, the flow returns to step S10 to repeat the above processing.

In this case, processing may be sequentially performed. For example, one precode image or a plurality of precode images for one page are generated, and the layout is determined. Subsequently, corresponding code images are generated and printed/recorded on a paper sheet. Thereafter, the next precode image or a plurality of precode images for the next page are generated, and code images are generated and printed/recorded. However, generation of a code image takes a much longer time than generation of a precode image. For this reason, in terms of efficiency, batch processing is preferably performed such that after generation and layout processing of precode images for a plurality of pages are performed, corresponding code images are generated at once, e.g., at night.

Figure 14:
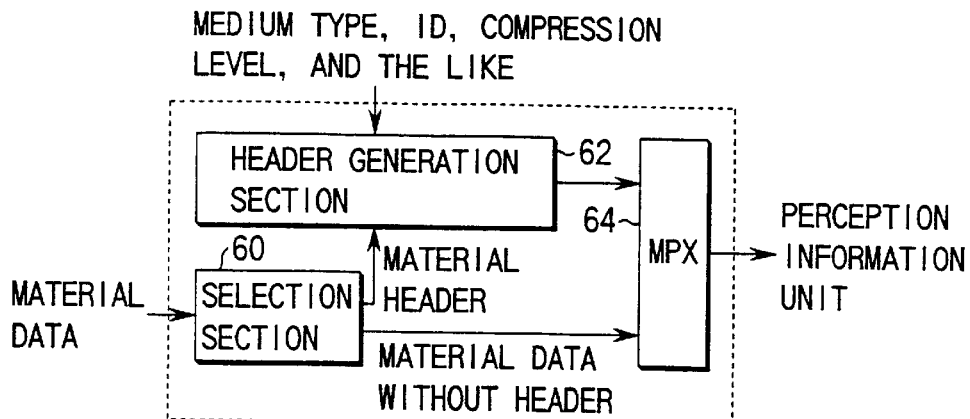
FIG. 14 is a block diagram showing the arrangement of a multimedia source file generation section.

FIG. 14 is a block diagram showing the structure of the multimedia source file generation section 28. The multimedia source file generation section 28 comprises a selection section 60, a header generation section 62, and a multiplexer (MPX) 64.

Selected material data is input from the data input section 26 to the selection section 60. The selection section 60 divides the material data into a material header and a portion other than the material header, i.e., material data with no header. The selection section 60 selectively supplies the material header to the header generation section 62 and the material data with no header to the multiplexer 64. The header generation section 62 receives information including a medium type, the ID of the medium, and a compression level from the user setting section 24. The header generation section 62 links these pieces of information with the material header to generate a header for a perception information unit and supplies the header to the multiplexer 64. The multiplexer 64 outputs the header from the header generation section 62 and then the material data from the selection section 60, thereby outputting the perception information unit as shown in FIG. 3.

Figure 15:
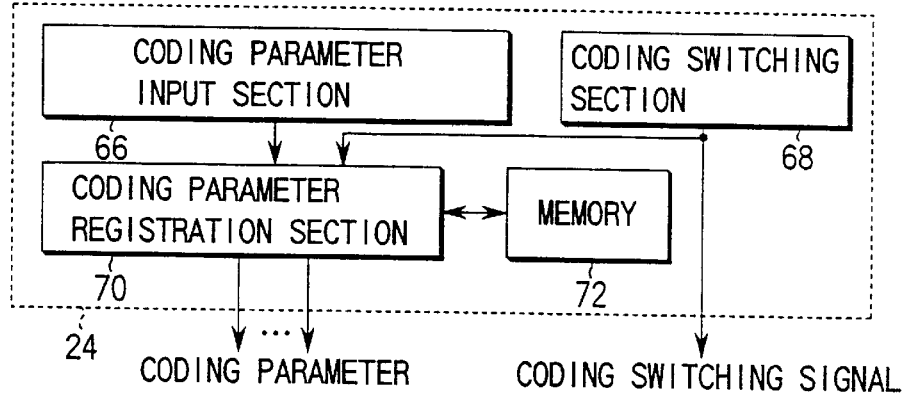
FIG. 15 is a block diagram showing the arrangement of a user selection section.

The user setting section 24 will be described next with reference to a block diagram in FIG. 15. The user setting section 24 comprises a coding parameter input section 66, a coding switching section 68, a coding parameter registration section 70, and a memory 72 supplementarily arranged for the coding parameter registration section 70.

The coding parameter input section 66 is a user interface portion for inputting coding parameters including a compression level, a correction level, an interleaving level, a print resolution, and the dot size and shape of a dot code. The coding parameters input and set by the coding parameter input section 66 are supplied to the coding parameter registration section 70 and registered in the memory 72 by the coding parameter registration section 70. The coding parameter registration section 70 also reads out the coding parameters registered in the memory 72 and outputs the coding parameters to the respective parts in the input section 18, the compression coding section 20, and the code conversion section 22. The coding switching section 68 outputs a coding switching signal representing generation of a precode image or a code image. The coding switching signal from the coding switching section 68 triggers the coding parameter registration section 70 to output the data registered on the memory 72 to the respective sections. The coding switching signal is also supplied to the switching section "1" 30 and the switching section "2" 38 to control the switching operations of these sections.

Figure 16:
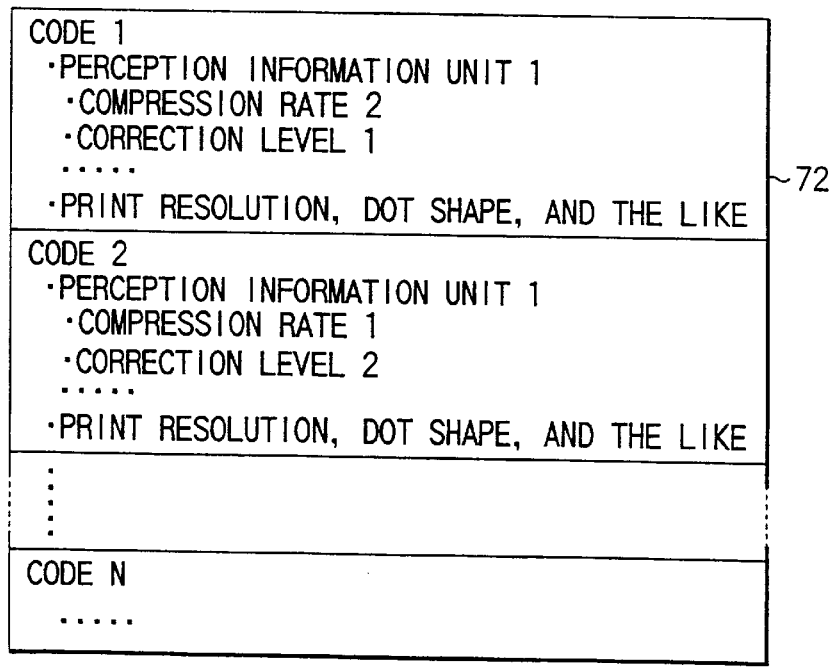
FIG. 16 is a view showing an example of coding parameters stored in a memory.

FIG. 16 is a view showing data registered on the memory 72. Each of code 1, code 2, . . . , code N stores a compression level, a correction level, and the like in correspondence with the ID of a perception information unit and also stores a print resolution, a dot shape, and the like.

Figure 17:
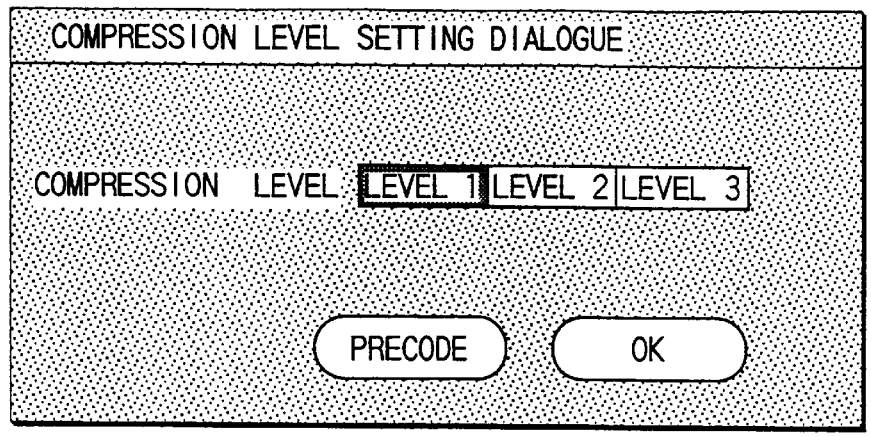
FIG. 17 is a view showing a compression level setting dialogue.

FIG. 17 is a view showing a compression level setting dialogue serving as a user interface used to set a compression level in the coding parameter input section 66. This window is displayed on the display section 46 when the perception information unit of multimedia information is to be generated by the multimedia source file generation section 28. When a compression level button is depressed by, e.g., moving a mouse cursor to the button and clicking the button, the compression level is selected. A "precode" button is depressed to designate generation of a precode image. An "OK" button is used to designate registration in the memory 72. Each compression level corresponds to a predetermined compression rate for voice or image data.

Figure 18:
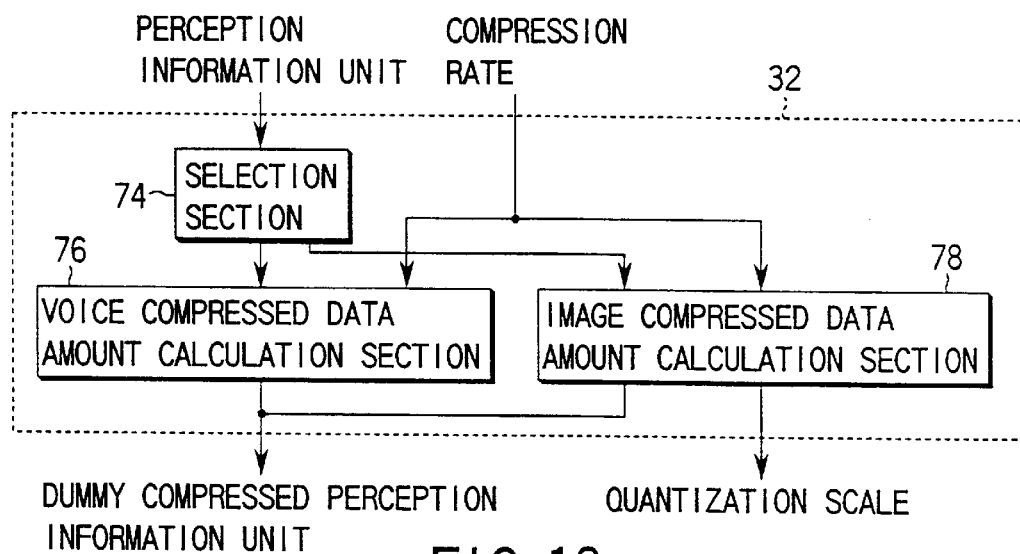
FIG. 18 is a block diagram showing the arrangement of a compressed data amount calculation section.

FIG. 18 is a block diagram showing the structure of the compressed data amount calculation section 32. The compressed data amount calculation section 32 comprises a selection section 74, a voice compressed data amount calculation section 76, and an image compressed data amount calculation section 78.

The selection section 74 receives a perception information unit from the switching section "1" 30 and selects whether the input perception information unit is voice data or image data. Voice data is supplied to the voice compressed data amount calculation section 76, and image data is supplied to the image compressed data amount calculation section 78. The voice compressed data amount calculation section 76 and the image compressed data amount calculation section 78 receive compression rates which have already been set by the user setting section 24. The voice compressed data amount calculation section 76 or the image compressed data amount calculation section 78 calculates the compressed data amount of the supplied perception information unit on the basis of the corresponding compression rate and outputs a dummy compressed perception information unit as shown in FIG. 4, which has dummy data corresponding to the compressed data amount, to the coding data generation section 36. Only the image compressed data amount calculation section 78 further outputs a quantization scale as a parameter for compression to the compressed data generation section 34.

Figure 19:
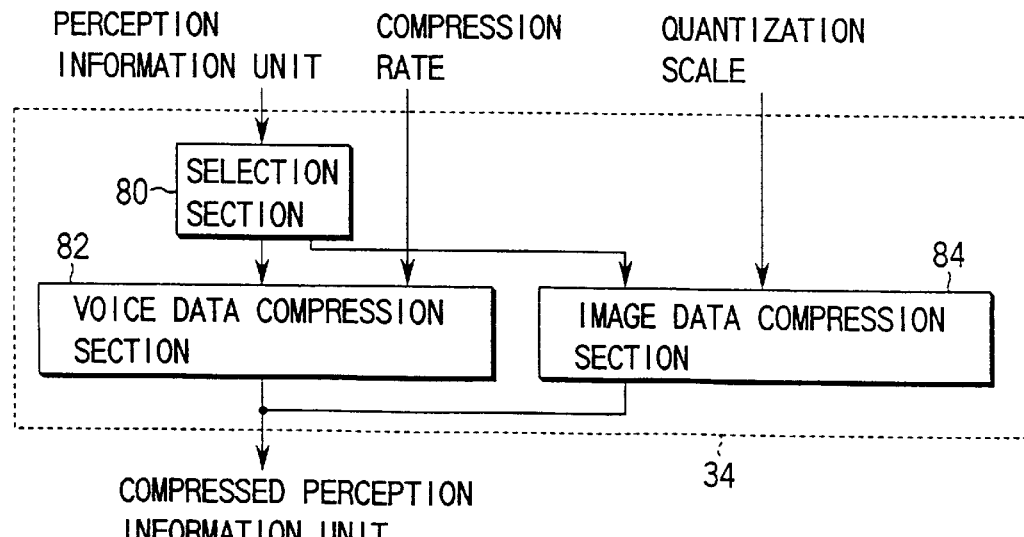
FIG. 19 is a block diagram showing the arrangement of a compressed data generation section.

The compressed data generation section 34 is constituted by a selection section 80, a voice data compression section 82, and an image data compression section 84, as shown in FIG. 19.

The selection section 80 receives a perception information unit from the switching section "1" 30 and selects whether the input perception information unit is voice or image data. Voice data is supplied to the voice data compression section 82, and image data is supplied to the image data compression section 84. The voice data compression section 82 receives a compression rate supplied from the user setting section 24. The supplied perception information unit is actually subjected to voice compression processing on the basis of the compression rate, and the compressed perception information unit as shown in FIG. 9 is output to the coding data generation section 36. Similarly, the image data compression section 84 receives a quantization scale calculated by the image compressed data amount calculation section 78. The supplied perception information unit is actually subjected to image compression processing on the basis of the quantization scale, and the compressed perception information unit is output to the coding data generation section 36.

Figure 20:
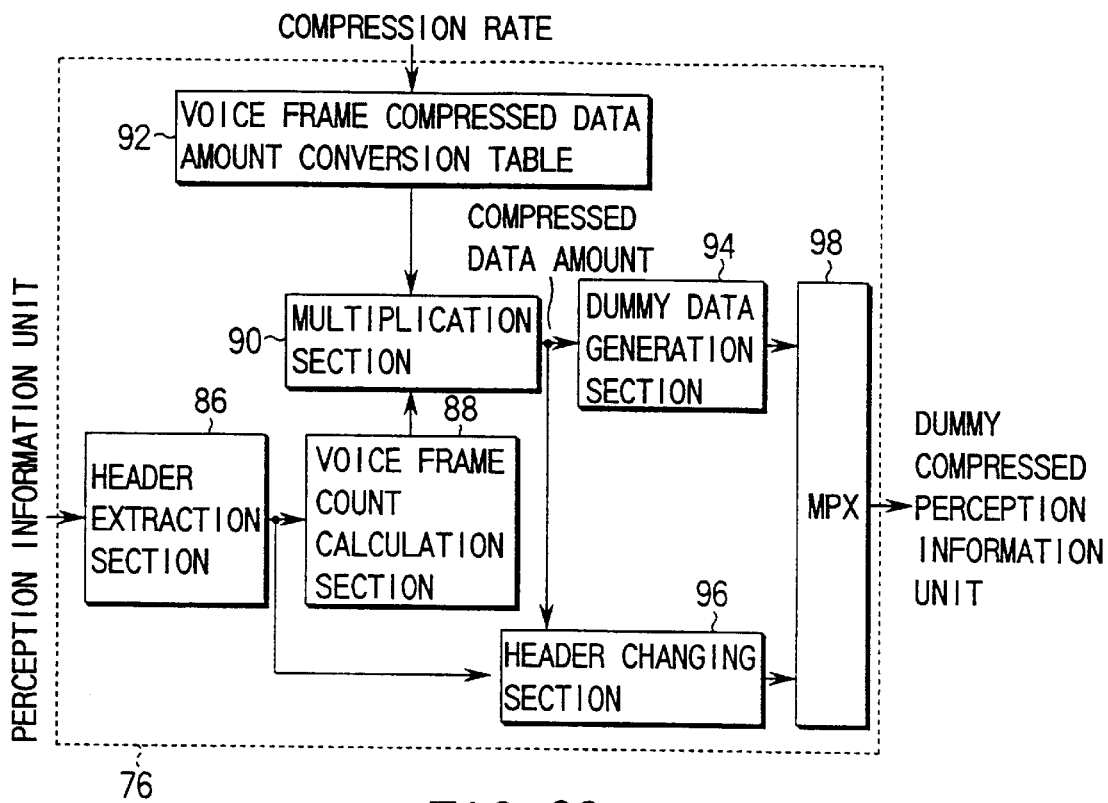
FIG. 20 is a block diagram showing the arrangement of a voice compressed data amount calculation section.

FIG. 20 is a block diagram showing the arrangement of the voice compressed data amount calculation section 76 in the compressed data amount calculation section 32. The voice compressed data amount calculation section 76 comprises a header extraction section 86, a voice frame count calculation section 88, a multiplication section 90, a voice frame compressed data amount conversion table 92, a dummy data generation section 94, a header changing section 96, and a multiplexer 98.

The perception information unit (voice data) supplied from the selection section 74 is supplied to the header extraction section 86 so that the header is extracted by the header extraction section 86. The extracted header is supplied to the voice frame count calculation section 88. The voice frame count calculation section 88 calculates the number of voice frames from information in the supplied header and inputs the calculated number of voice frames to the multiplication section 90.

The compression rate is input from the user setting section 24 to the voice frame compressed data amount conversion table 92. The voice frame compressed data amount conversion table 92 stores the number of bytes of a certain voice frame, e.g., data sampled at 30 msec, in correspondence with the compression rate. The voice frame compressed data amount conversion table 92 outputs the number of bytes corresponding to the compression rate supplied from the user setting section 24 to the multiplication section 90.

The multiplication section 90 multiplies the number of voice frames calculated by the voice frame count calculation section 88 by the number of bytes from the voice frame compressed data amount conversion table 92, thereby calculating the compressed data amount. The calculated compressed data amount is supplied to the dummy data generation section 94. The dummy data generation section 94 generates dummy data on the basis of the compressed data amount and outputs the dummy data corresponding to the compressed data amount to the multiplexer 98.

The compressed data amount calculated by the multiplication section 90 is also supplied to the header changing section 96. The header changing section 96 also receives the header extracted by the header extraction section 86. Therefore, the header changing section 96 rewrites data representing the information amount in the header to the compressed data amount, thus changing the header. The changed header is output to the multiplexer 98. The multiplexer 98 synthesizes the header from the header changing section 96 with the dummy data corresponding to the compressed data amount from the dummy data generation section 94 and outputs the dummy compressed perception information unit as shown in FIG. 4.

Figure 21:
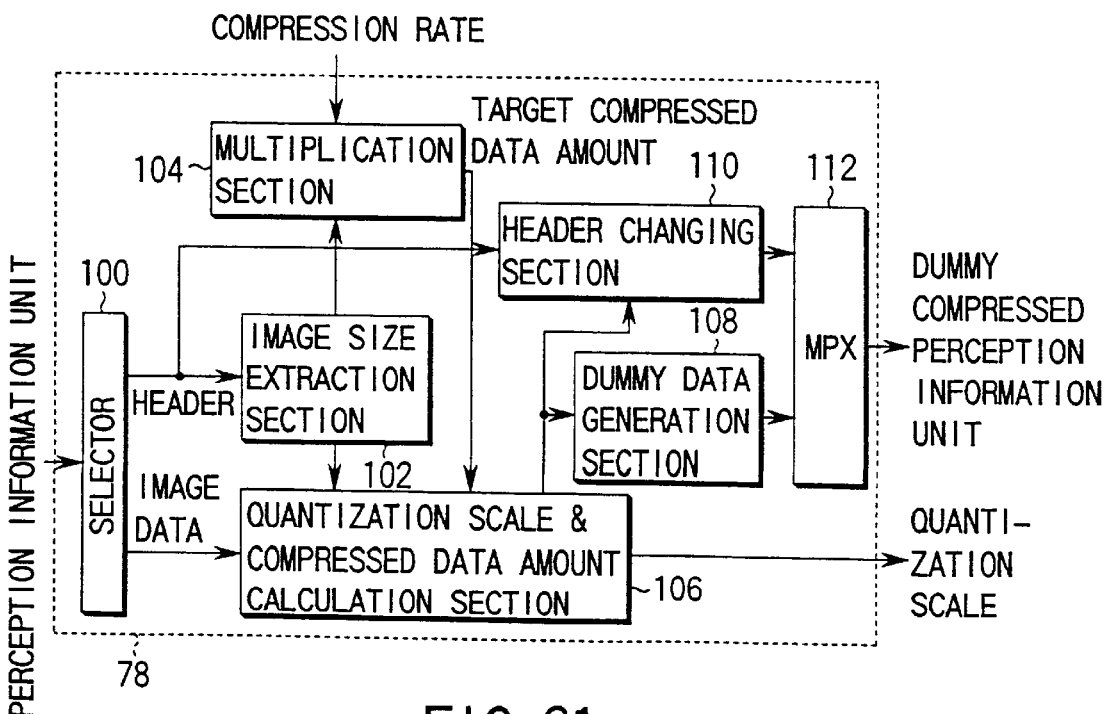
FIG. 21 is a block diagram showing the arrangement of an image compressed data amount calculation section.

FIG. 21 is a block diagram showing the arrangement of the image compressed data amount calculation section 78 in the compressed data amount calculation section 32. The image compressed data amount calculation section 78 comprises a selector 100, an image size extraction section 102, a multiplication section 104, a quantization scale & compressed data amount calculation section 106, a dummy data generation section 108, a header changing section 110, and a multiplexer 112.

The perception information unit (image data) supplied from the selection section 74 is supplied to the selector 100 and separated into a header and image data by the selector 100. The header is supplied to the image size extraction section 102. The image size extraction section 102 extracts an image size of, e.g., 256×256 pixels written in the supplied header and outputs the extracted image size to the multiplication section 104. The multiplication section 104 receives a compression rate, i.e., information representing the number of bits per pixel from the user setting section 24. The multiplication section 104 multiplies the image size by the compression rate to calculate a target compressed data amount. The calculated target compressed data amount is supplied to the quantization scale & compressed data amount calculation section 106.

The image data selected by the selector 100 and the image size extracted by the image size extraction section 102 are input to the quantization scale & compressed data amount calculation section 106. The quantization scale & compressed data amount calculation section 106 calculates a quantization scale and a compressed data amount in a manner to be described later. The calculated quantization scale is directly output from the image compressed data amount calculation section 78. In this case, the compressed data amount is supplied to the dummy data generation section 108 and the header changing section 110. The dummy data generation section 108 generates dummy data corresponding to the supplied compressed data amount and outputs the dummy data to the multiplexer 112. The header selected by the selector 100 is supplied to the header changing section 110. The header changing section 110 rewrites data representing the information amount in the header to the compressed data amount to change the header, and outputs the changed header to the multiplexer 112. The multiplexer 112 synthesizes the header from the header changing section 110 with the dummy data corresponding to the compressed data amount from the dummy data generation section 108 and outputs the dummy compressed perception information unit as shown in FIG. 4.

Figure 22:
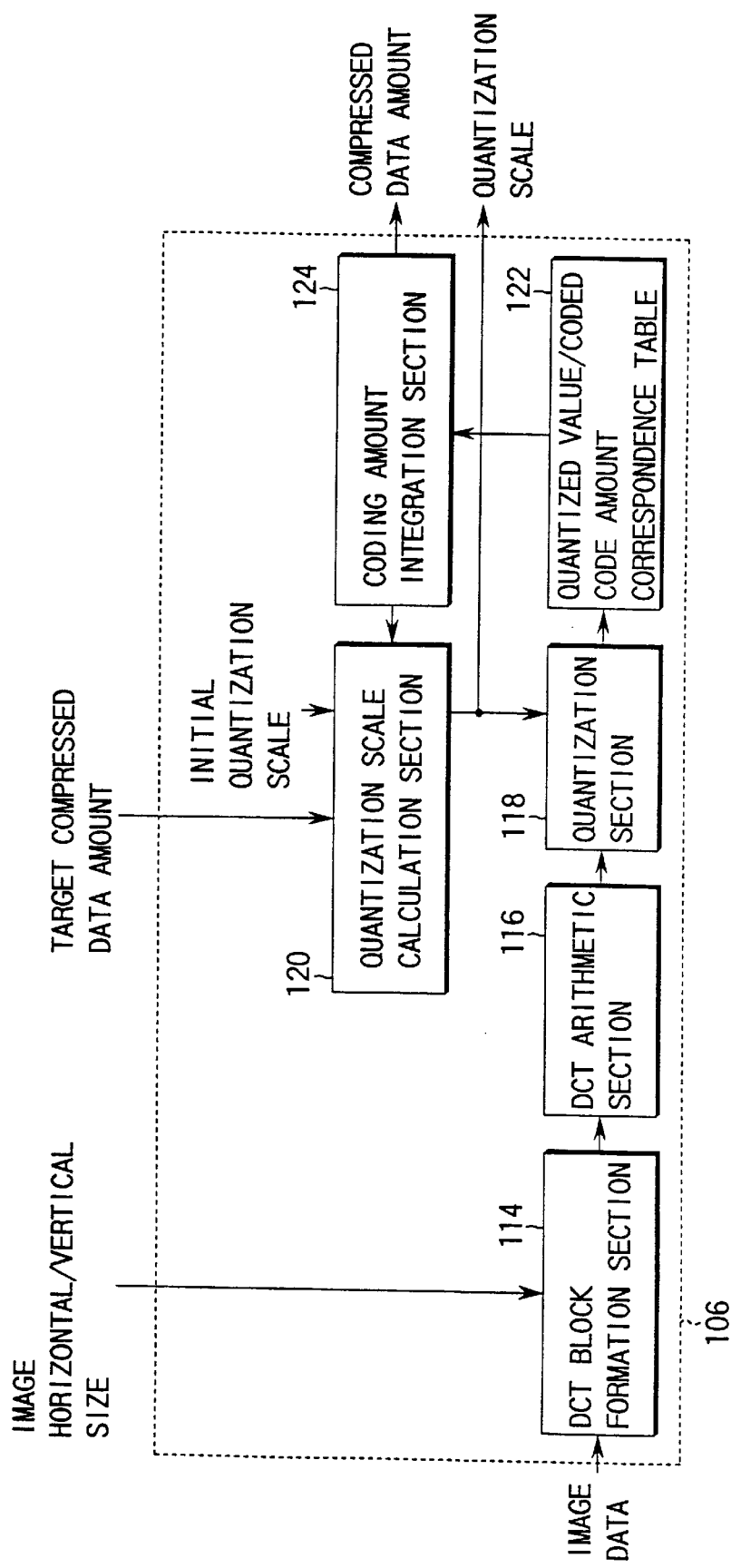
FIG. 22 is a block diagram showing the arrangement of a quantization scale & compressed data amount calculation section.

FIG. 22 is a block diagram showing the structure of the quantization scale & compressed data amount calculation section 106. The quantization scale & compressed data amount calculation section 106 is constituted by a DCT (Discrete Cosine Transform) block formation section 114, a DCT arithmetic section 116, a quantization section 118, a quantization scale calculation section 120, a quantized value/coded code amount correspondence table 122, and a coding amount integration section 124.

Figure 23:
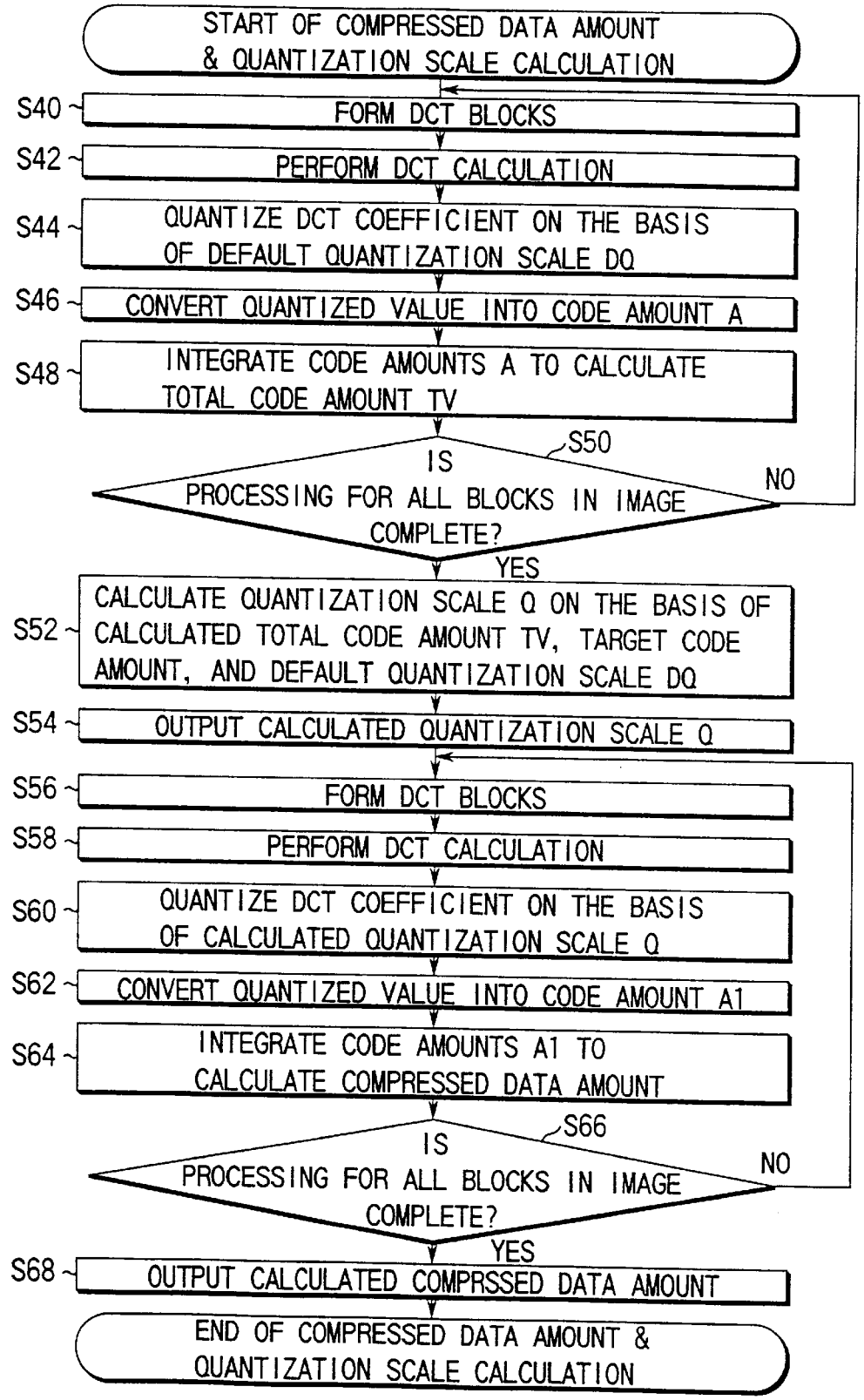
FIG. 23 is a flow chart of quantization scale & compressed data amount calculation processing.

The flow of processing of the quantization scale & compressed data amount calculation section 106 will be briefly described below on the basis of a flow chart shown in FIG. 23. Details of quantization scale calculation processing (steps S40 to S54 in the flow chart of FIG. 23) are disclosed in U.S. Pat. No. 5,073,820 by the present assignee, and a detailed description thereof will be omitted.

First, the DCT block formation section 114 forms DCT blocks from the input image from the selector 100 on the basis of the image size supplied from the image size extraction section 102 (step S40), and the DCT arithmetic section 116 performs DCT calculation (step S42). The quantization section 118 quantizes the DCT coefficient obtained by the DCT arithmetic section 116 in accordance with an initial quantization scale DQ supplied from the quantization scale calculation section 120 (step S44). The quantized value/coded code amount correspondence table 122 converts the quantized value into a corresponding code amount A of the Huffman code (step S46). The coding amount integration section 124 calculates a compressed data amount TV of the entire image (step S48). It is determined whether DCT blocks, which have not been processed, remain in the image (step S50). If any DCT blocks remain, the flow returns to step S40. If no DCT blocks remain, the quantization scale calculation section 120 calculates a quantization scale Q corresponding to the necessary compression rate on the basis of the calculated compressed data amount TV of the entire image, the target compressed data amount, and the initial quantization scale DQ (step S52) and outputs the quantization scale Q (step S54).

Thereafter, the DCT block formation section 114 forms DCT blocks from the input image again (step S56), and the DCT arithmetic section 116 performs DCT calculation (step S58). The quantization section 118 quantizes the obtained DCT coefficient in accordance with the quantization scale Q calculated by the quantization scale calculation section 120 (step S60). The quantized value/coded code amount correspondence table 122 converts the quantized value into a corresponding code amount A1 of the Huffman code (step S62). The coding amount integration section 124 calculates a compressed data amount TV1 of the entire image (step S64). It is determined whether DCT blocks, which have not been processed, remain in the image (step S66). If any DCT blocks remain, the flow returns to step S56. If no DCT blocks remain, the coding amount integration section 124 outputs the calculated compressed data amount TV1 of the entire image (step S68).

The compressed data generation section 34 connected to the output of the section 106 to perform image compression processing upon receiving the quantization scale output from the quantization scale & compressed data amount calculation section 106 in the image compressed data amount calculation section 78, has the image data compression section 84 using DCT such as JPEG. Therefore, the compressed data generation section 34 quantizes the DCT coefficient after DCT calculation on the basis of the quantization scale Q calculated by the quantization scale & compressed data amount calculation section 106 and codes all the calculated quantized values.

In the above description, the quantization scale & compressed data amount calculation section 106 of this embodiment calculates the quantization scale used by the compressed data generation section 34 in accordance with the technique disclosed in U.S. Pat. No. 5,073,820. However, the compressed data amount calculation section may calculate the statistics (activity) of the image to calculate the quantization scale.

In the above description, image compression coding processing of this embodiment is performed using DCT. However, similar processing can be performed using any one of other orthogonal transform schema or wavelet transform.

Figure 24:
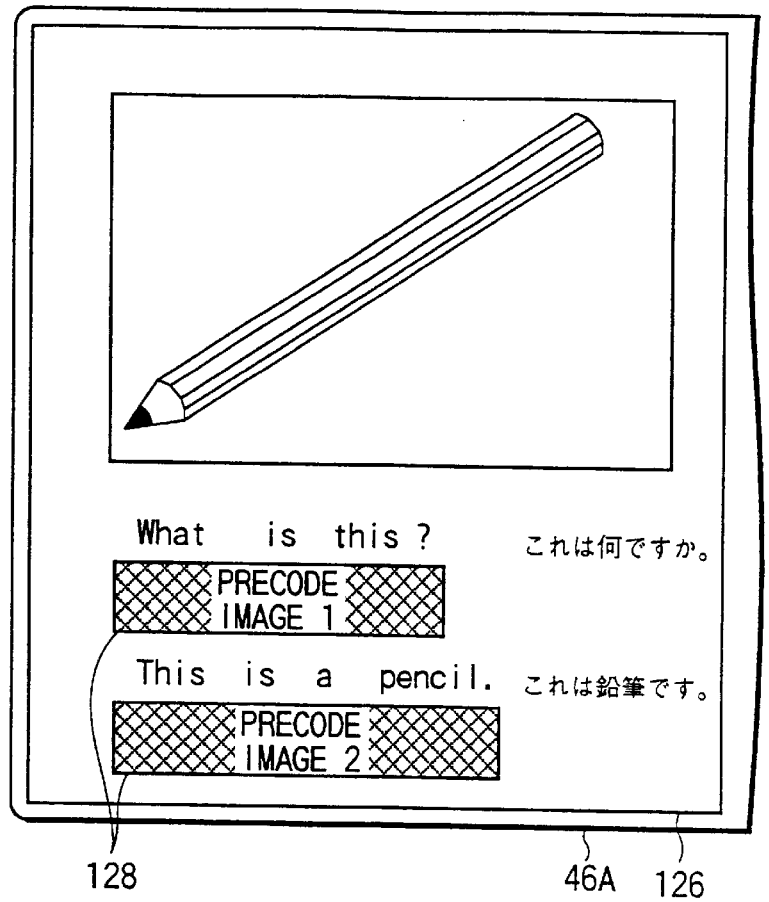
FIG. 24 is a view showing a layout window.

FIG. 24 shows an example of a layout window 126 displayed on a display screen 46A of the display section 46. An image or characters to be printed/recorded on a paper sheet are arranged on the layout window 126, and precode images 128 prepared in the above way are also arranged on the layout window 126. The user positions the precode images 128 while observing the layout window. If the precode image has an undesired size, the precode size can be changed by changing the compression rate or the like.

The precode image 128 can be represented by a simple frame as shown in FIG. 8. However, an icon or characters representing information in the precode image may be simultaneously displayed, as shown in FIG. 24.

The second embodiment of the present invention will be described below.

Figure 26:
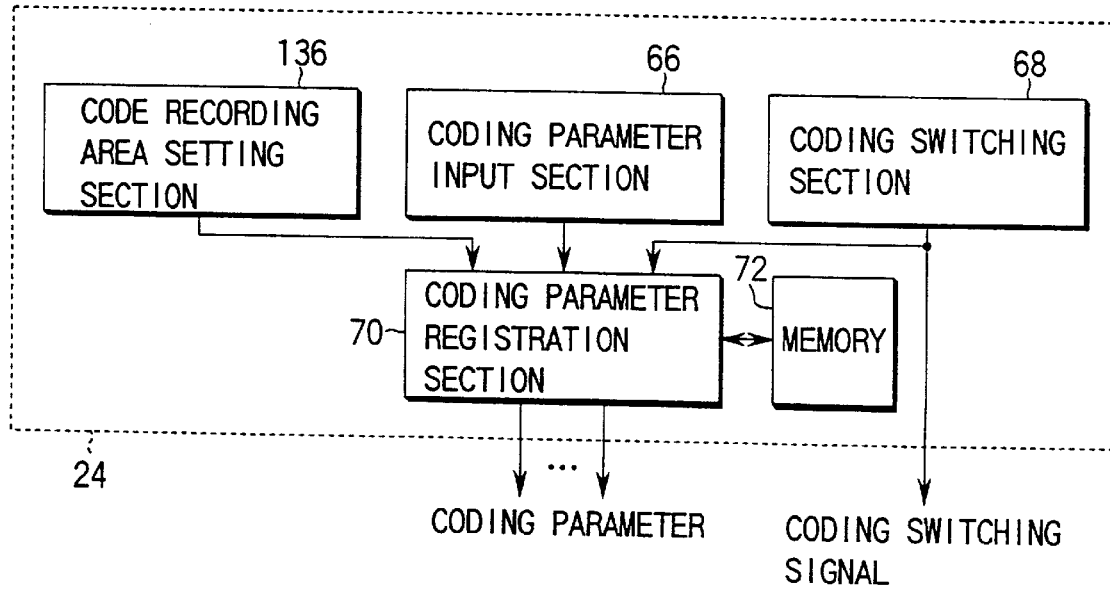
FIG. 26 is a block diagram showing the arrangement of a user setting section.
Figure 25:
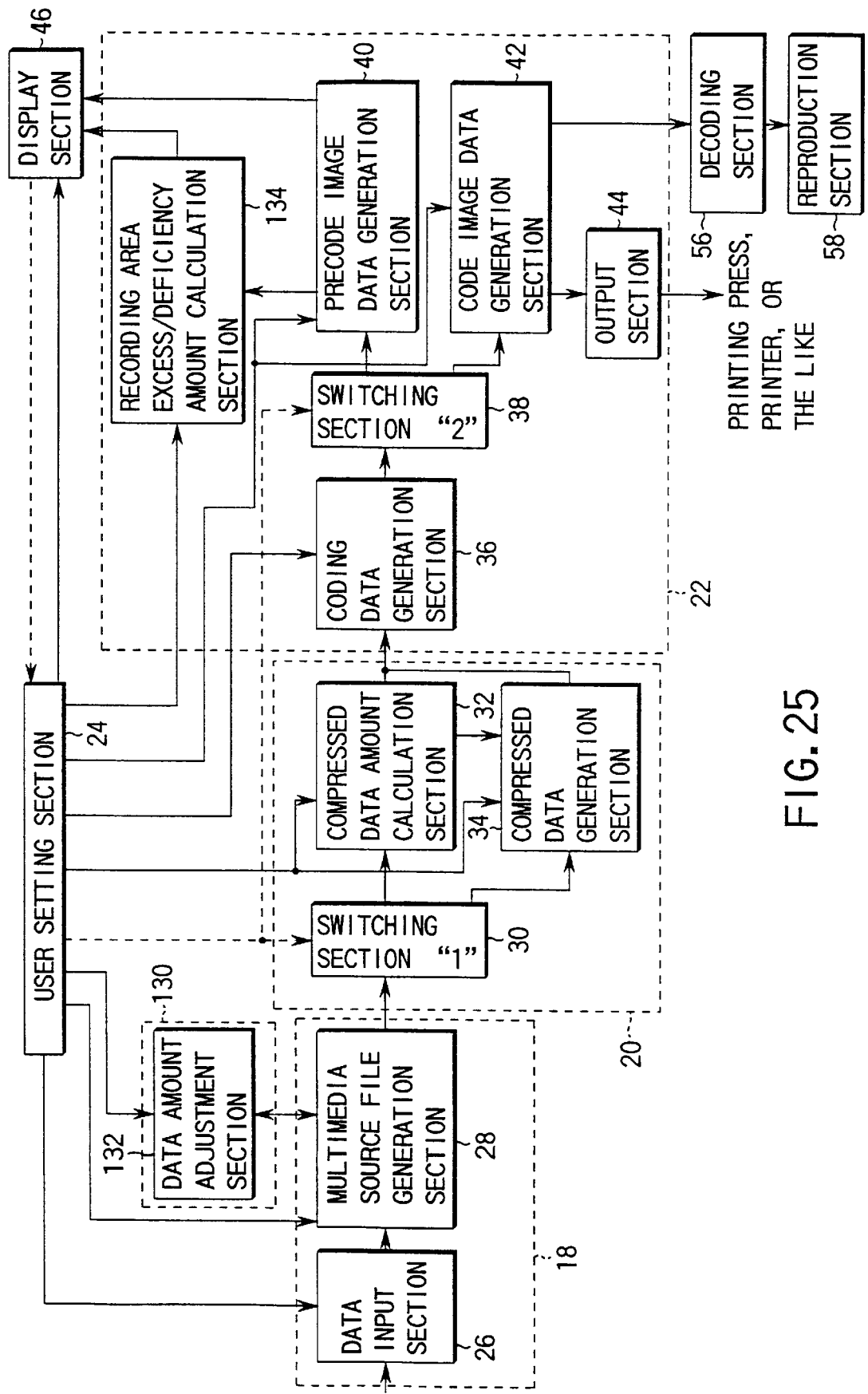
FIG. 25 is a block diagram showing the arrangement of the second embodiment.

FIG. 25 is a block diagram showing the arrangement of a code image data output apparatus according to the second embodiment. In the code image data output apparatus of this embodiment, a data amount adjustment section 132 as an adjustment section 130 is added to the arrangement of the above-described first embodiment shown in FIG. 2, and a recording area excess/deficiency amount calculation section 134 is added to a code conversion section 22. In addition, a code recording area setting section 136 is added to a user setting section 24, as shown in FIG. 26.

Figure 27:
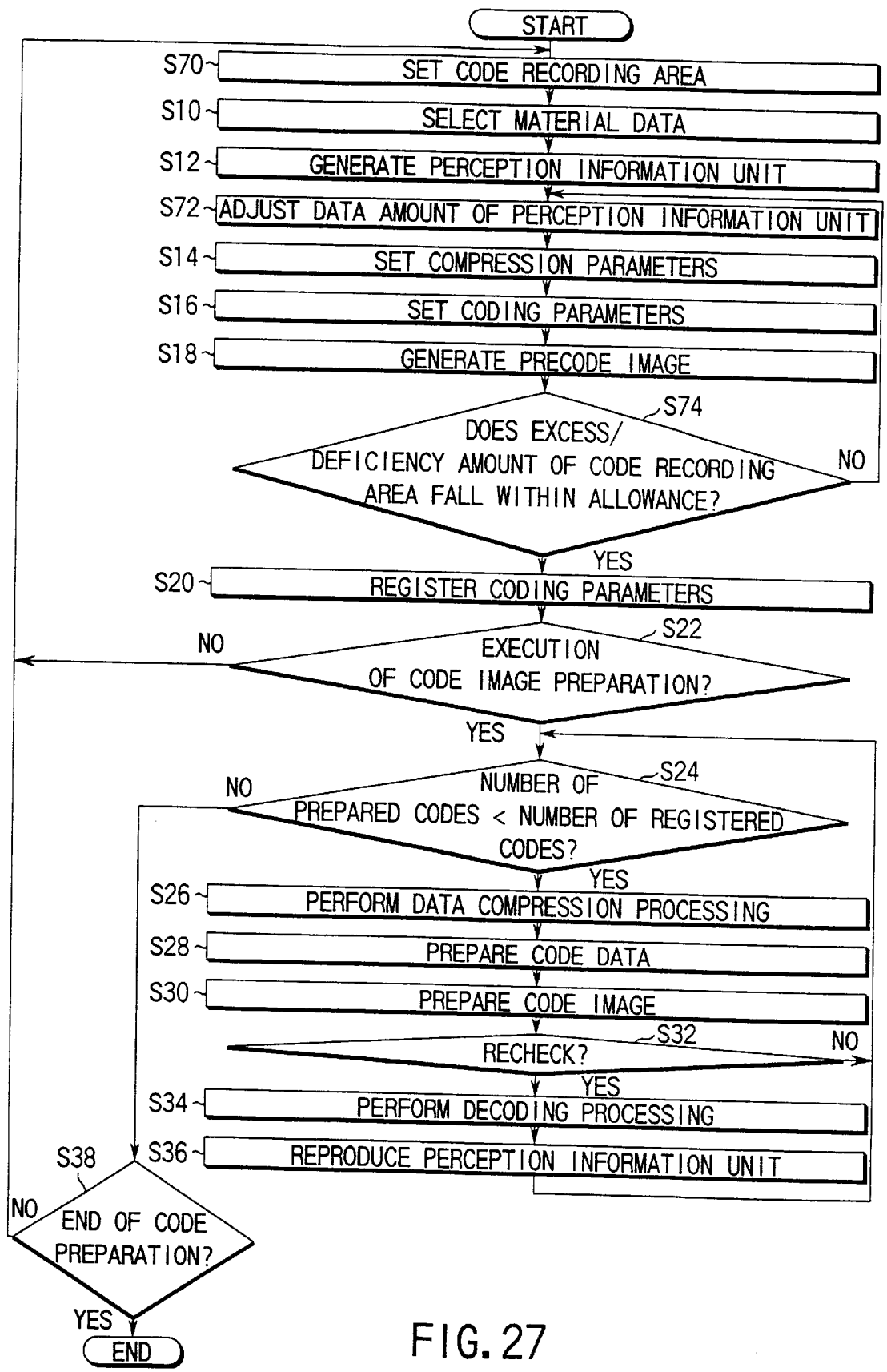
FIG. 27 is a flow chart of the operation of the second embodiment.

FIG. 27 is a flow chart of the operation of the second embodiment. The same reference numerals as in FIG. 13 in the first embodiment denote the same processing operations in FIG. 27.

Figure 28:
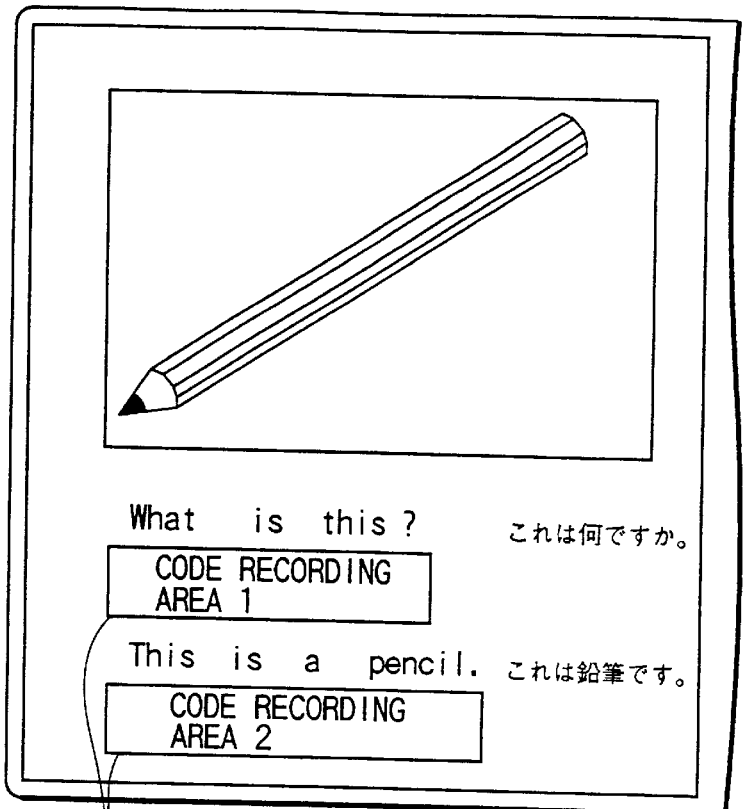
FIG. 28 is a view showing a layout window in the second embodiment.

The user sets a code recording area 138 on the layout window by the code recording area setting section 136 in the user setting section 24, as shown in FIG. 28 (step S70). As in the first embodiment, the user selects material data by the user setting section 24 (step S10) to generate a perception information unit (step S12).

In the second embodiment, thereafter, a data amount adjustment section 132 adjusts the data amount of the perception information unit (step S72). This data amount adjustment need not always be performed in the initial processing, i.e., in the first-time processing and instead may be performed after the flow returns to step S72 in accordance with the determination result in step S74 (to be described later), i.e., only in and after the second-time processing.

Next, as in the first embodiment, the user setting section 24 sets a compression parameter (step S14) and coding parameters (step S16), and a precode image is generated (step S18).

Figure 29:
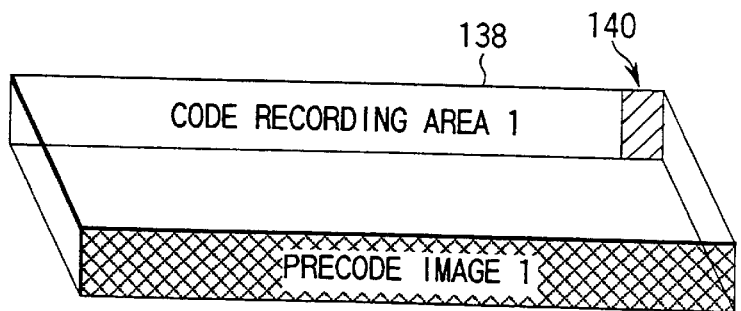
FIG. 29 is a view showing the relationship between code recording area "1" and precode image "1"
Figure 30:
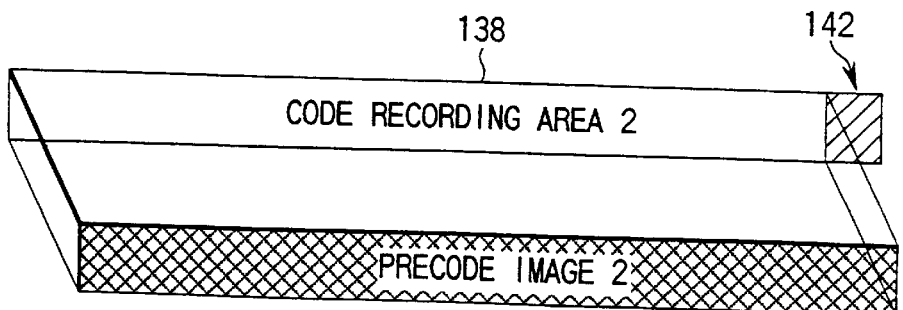
FIG. 30 is a view showing the relationship between code recording area "2" and precode image "2"
Figure 31:
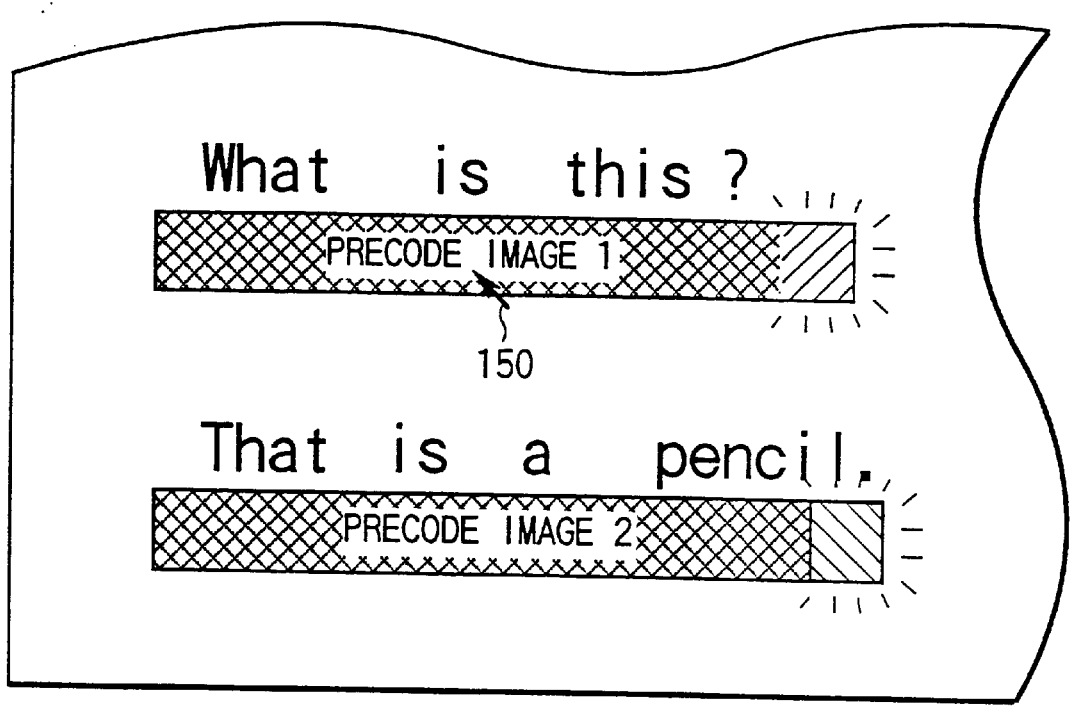
FIG. 31 is a view for explaining a displaying technique according to an excess/deficiency in a precode image with respect to a code recording area.

In the second embodiment, the recording area excess/deficiency amount calculation section 134 causes a display section 46 to display the code recording area 138 set by the code recording area setting section 136 in the user setting section 24 in correspondence with the generated precode image. More specifically, when a precode image 128 is generated after setting of the code recording area 138, as in this embodiment, the generated precode image 128 may become larger than the set code recording area 138 to form an excessively recorded area 140, as shown in FIG. 29, or the set code recording area 138 may become larger than the generated precode image 128 to form an unrecorded blank area 142, as shown in FIG. 30. For this reason, the difference between the code recording area 138 and the actual precode image 128 is made visible on the display window. For example, only a portion corresponding to the excess/deficiency amount is caused to blink, as shown in FIG. 31, or displayed in a different color (for example, the excessively recorded area 140 is displayed in red, and the unrecorded blank area 142 is displayed in blue). An alarm sound may be generated, as a matter of course.

The user determines whether the excess/deficiency amount of the code recording area falls within the allowance while observing the display window (step S74). If NO in step S74, the flow returns to step S72 such that the data amount of the perception information unit is adjusted by the data amount adjustment section 132. When the perception information unit is voice data, a silent portion is cut. For image data, an unnecessary portion is deleted, or enlargement/reduction processing is performed.

If the user determines in step S74 that the excess/deficiency amount of the code recording area falls within the allowance, the flow advances to step S20 to perform the same processing as in the first embodiment, e.g., registration of the coding parameters at that time in a memory 72 in the user setting section 24.

Figure 32:
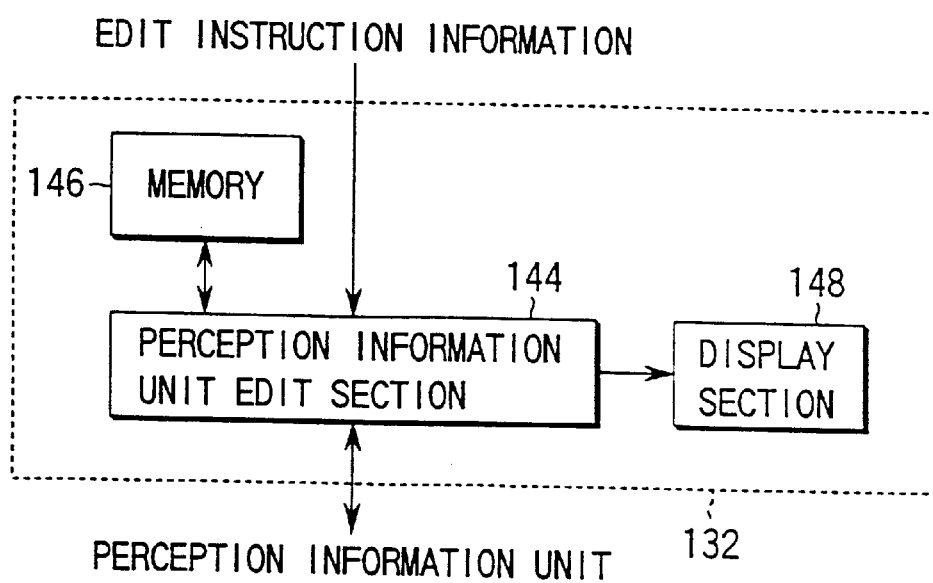
FIG. 32 is a block diagram showing the arrangement of a data amount adjustment section.

As shown in FIG. 32, the data amount adjustment section 132 comprises a perception information unit edit section 144, a memory 146, and a display section 148 (actually, the display section 46 also serves as the display section 148). The perception information unit generated by a multimedia source file generation section 28 is input to the perception information unit edit section 144 and temporarily stored in the memory 146 by the perception information unit edit section 144. Upon receiving edit instruction information from the user setting section 24, the perception information unit edit section 144 reads out the perception information unit from the memory 146 and edits the perception information unit. The edited contents are displayed on the display section 148.

FIG. 33 is a view showing the actual user interface portion of the data amount adjustment section 132. When a mouse cursor 150 is double-clicked on precode image "1", as shown in FIG. 31, a voice edit dialogue 152 as shown in FIG. 33 is displayed on the display section 148. A box-shaped area 154 in the voice edit dialogue 152 represents a portion having a voice signal with an amplitude of a predetermined value or more, i.e., a sound portion. A portion 156 indicated only by a horizontal line means that the amplitude is smaller than the predetermined value, i.e., a silent portion. For precode image "1" with an excessively recorded area, the data amount to be coded is decreased by, e.g., cutting the silent portion, and the precode image corresponding to the code image can also be made small. In the example shown in FIG. 33, a hatched silent area 158 is selected and cut.

Inversely, for precode image "2" smaller than the set code recording area shown in FIG. 31, a silent portion is selected and extended by, e.g., a "copy & paste" operation.

When the user clicks a "precede" button on the voice edit dialogue, the edited perception information unit is supplied from the perception information unit edit section 144 to a compression coding section 20 through the multimedia source file generation section 28. As described above, an adjusted precode image is generated by the compression coding section 20 and the code conversion section 22 and displayed on the display section 46. When the precode image falls within a predetermined range desired by the user, the user clicks an "OK" button on the voice edit dialogue. With this operation, the flow advances to actual code image generation processing. The edited voice data can be confirmed before coding by clicking a "play" button.

FIG. 34 is a view showing an image edit dialogue 160 for image data. In this case as well, the perception information unit can be edited by cutting a hatched unnecessary portion 162 or performing a mouse operation on a slider-shaped enlargement/reduction ratio setting portion 164 such that the precode image falls within a predetermined range desired by the user.

When the unnecessary portion 162 is to be cut, the image need not always be left in a square shape, as in this example. In, e.g., JPEG compression, since a block consisting of 8×8 pixels is processed, a stepped portion can be cut without any problem.

The third embodiment of the present invention will be described next.

Figure 35:
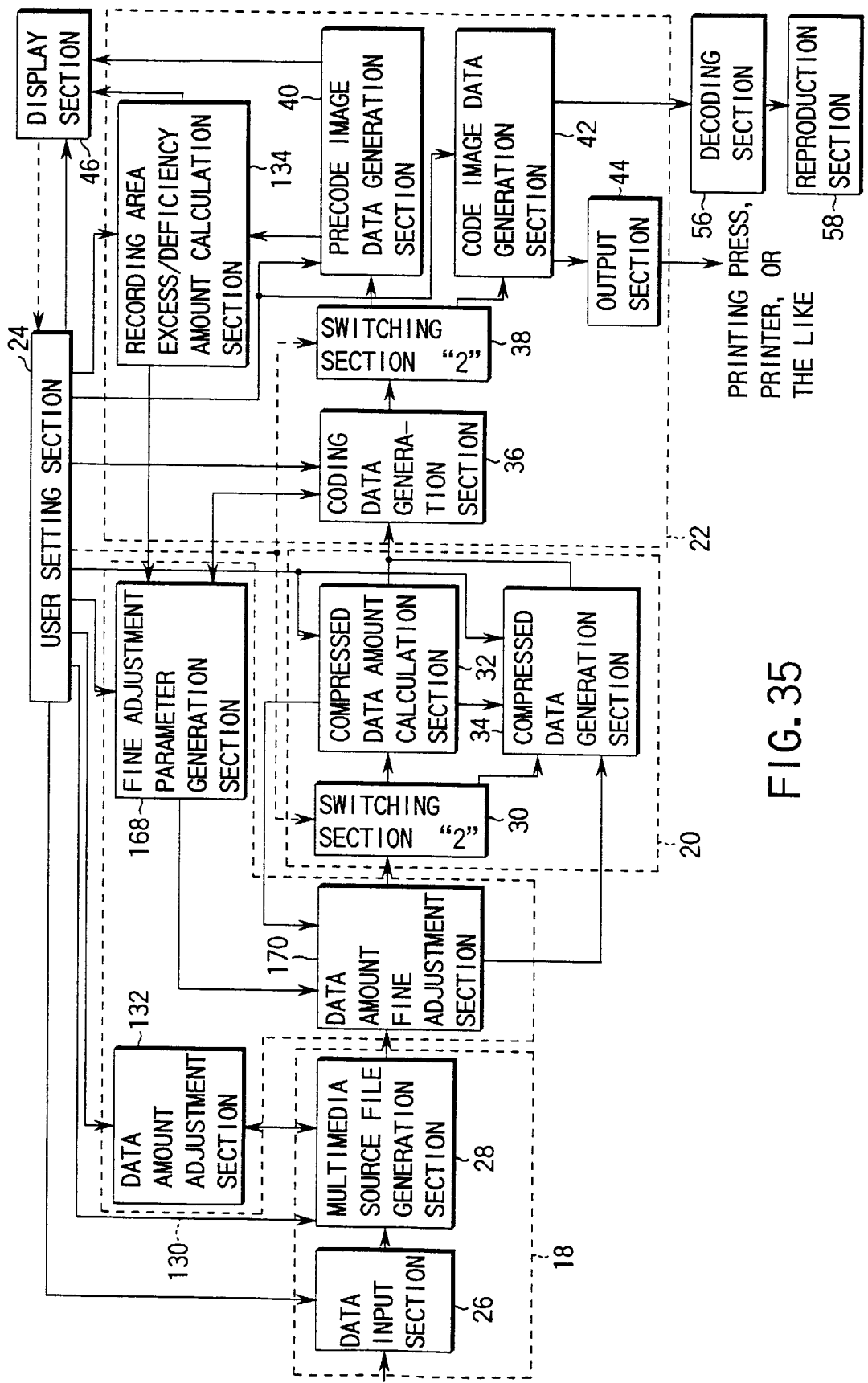
FIG. 35 is a block diagram showing the arrangement of the third embodiment.

FIG. 35 is a block diagram showing the arrangement of a code image data output apparatus according to the third embodiment. In the code image data output apparatus of this embodiment, a fine adjustment parameter generation section 168 and a data amount fine adjustment section 170 are added to an adjustment section 130 in the arrangement of the above-described second embodiment shown in FIG. 25. More specifically, in the third embodiment, data amount adjustment in the second embodiment is performed as coarse adjustment, and thereafter, fine adjustment can be performed without substantially changing the contents of a perception information unit such that the perception information unit matches a code recording area.

Figure 36:
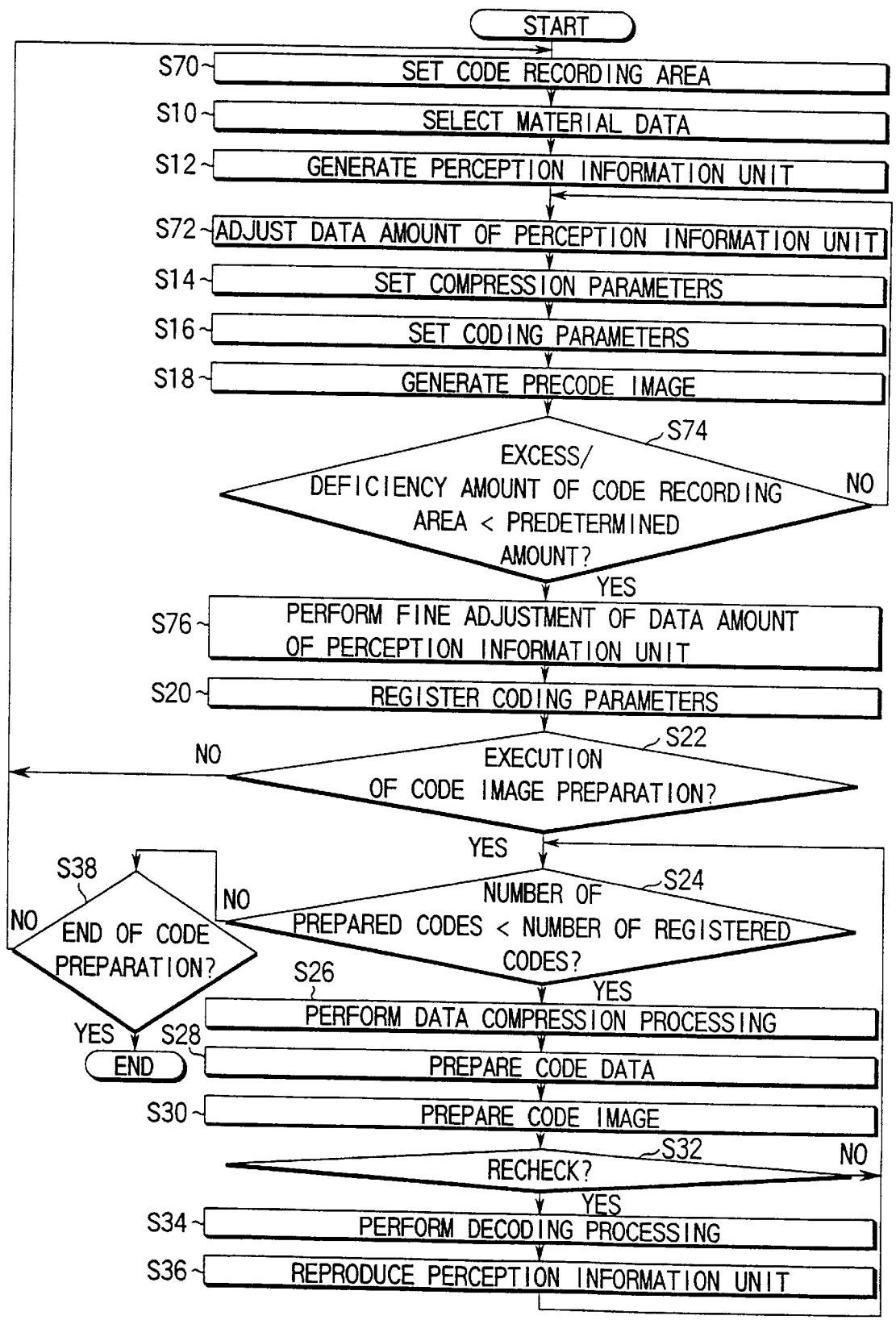
FIG. 36 is a flow chart of the operation of the third embodiment.

FIG. 36 is a flow chart of the operation of the third embodiment. The same reference numerals as in FIG. 27 in the second embodiment denote the same processing operations in FIG. 36.

First, as in the second embodiment, the user sets a code recording area 138 on the layout window (step S70) and selects material data (step S10) to generate a perception information unit (step S12). A data amount adjustment section 132 adjusts the data amount of the perception information unit (step S72). Next, a compression parameter is set (step S14), coding parameters are set (step S16), and a precode image is generated (step S18). A recording area excess/deficiency amount calculation section 134 causes a display section 46 to display the code recording area 138 set by a code recording area setting section 136 in a user setting section 24 in correspondence with the generated precode image. The user determines whether the excess/deficiency amount of the code recording area falls within the allowance while observing the display window (step S74). If NO in step S74, the flow returns to step S72 to adjust the data amount of the perception information unit.

In the third embodiment, if the user determines or it is automatically determined in step S74 that the excess/deficiency amount of the code recording area falls within the allowance, and in this case, within the finely adjustable range, the data amount of the perception information unit is finely adjusted by the fine adjustment parameter generation section 168 and the data amount fine adjustment section 170 (step S76). Processing from step S20 is the same as in the first embodiment.

Figure 37:
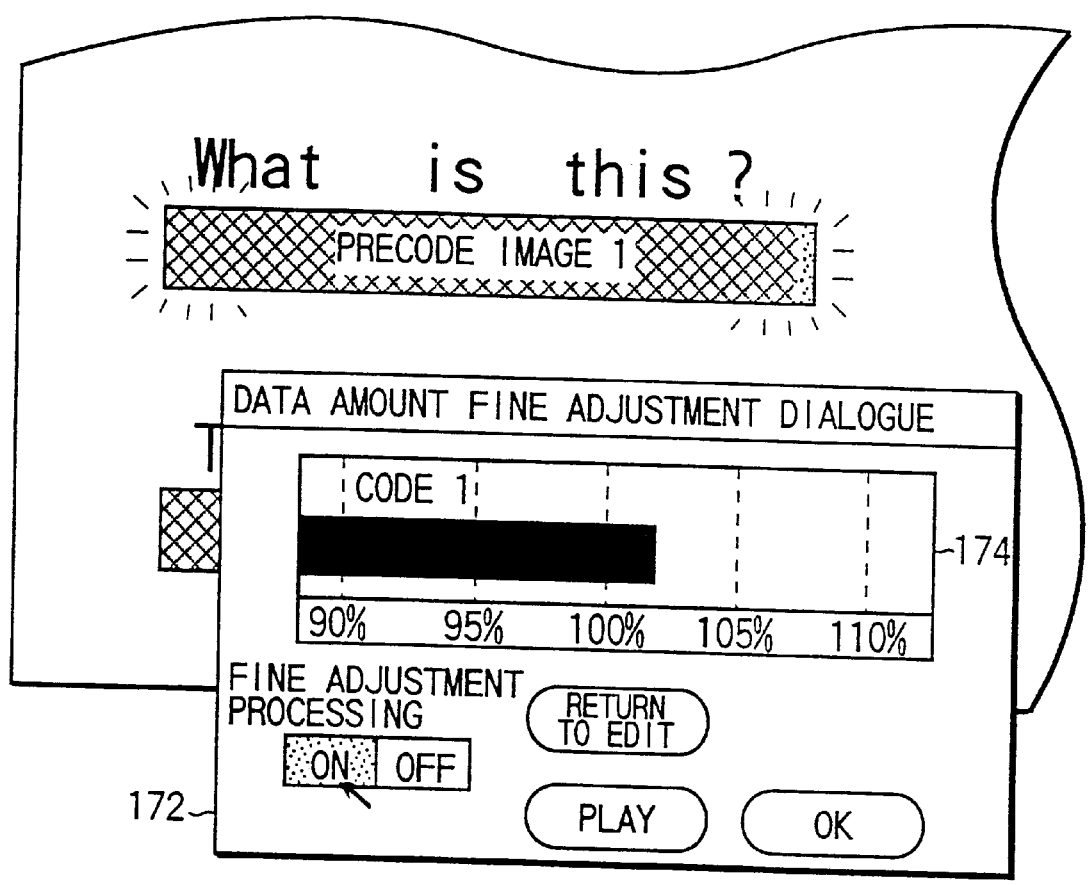
FIG. 37 is a view showing a data amount fine adjustment dialogue.

When the precode image generated by a precode image data generation section 40 falls within the range where the excess/deficiency amount of the code recording area can be finely adjusted, the recording area excess/deficiency amount calculation section 134 preferably causes the display section 46 to display the excess/deficiency portion in a form different from that described in the second embodiment by, e.g., blinking the entire precode image or displaying the precode image in another color. In addition, a data amount fine adjustment dialogue 172 as shown in FIG. 37 may be automatically displayed. The data amount fine adjustment dialogue 172 has a portion 174 where the ratio of the current precode image data to the actual recording area is indicated. In this embodiment, the finely adjustable range is 90% to 110%. When the user clicks an "ON" button for fine adjustment processing on the data amount fine adjustment dialogue 172, the flow advances to step S76 to finely adjust the data amount of the perception information unit.

Figure 38:
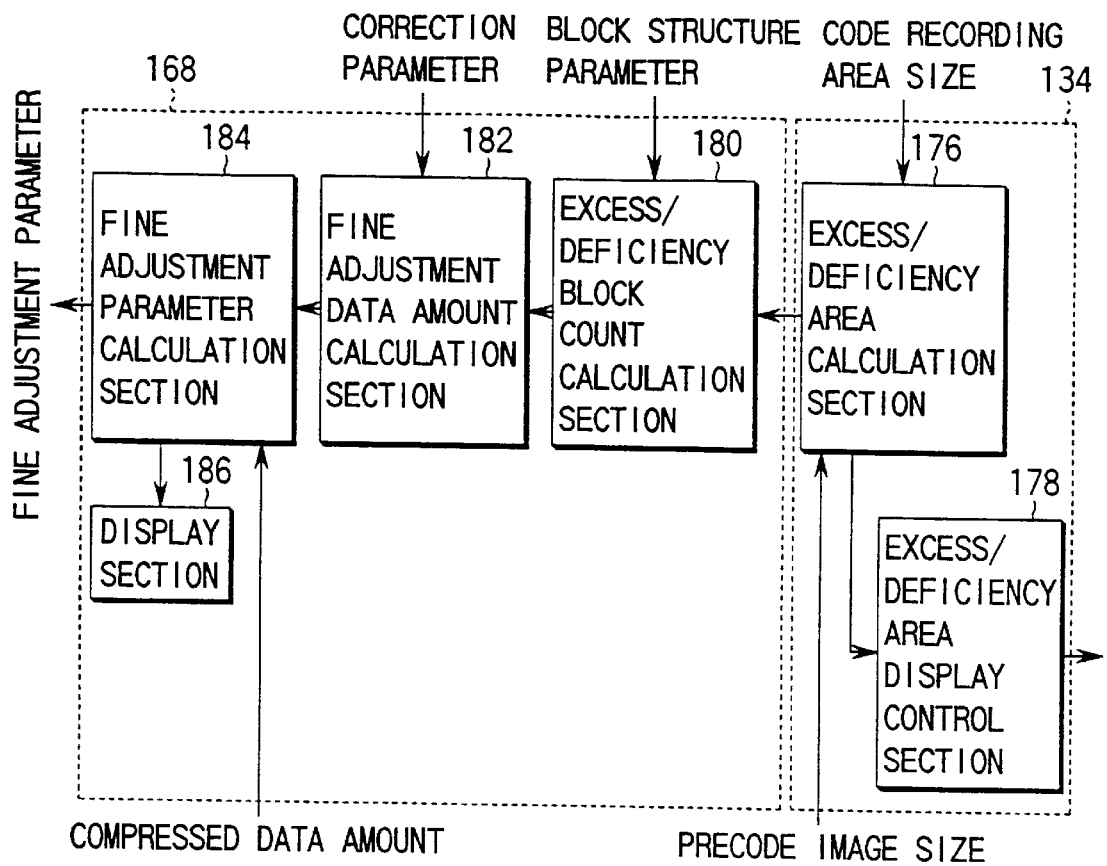
FIG. 38 is a block diagram showing the arrangements of a fine adjustment parameter generation section and a recording area excess/deficiency amount calculation section.

FIG. 38 is a block diagram showing the arrangements of the recording area excess/deficiency amount calculation section 134 and the fine adjustment parameter generation section 168. The recording area excess/deficiency amount calculation section 134 comprises an excess/deficiency area calculation section 176 and an excess/deficiency area display control section 178. The fine adjustment parameter generation section 168 comprises an excess/deficiency block count calculation section 180, a fine adjustment data amount calculation section 182, a fine adjustment parameter calculation section 184, and a display section 186 (actually, the display section 46 also serves as the display section 186).

In the recording area excess/deficiency amount calculation section 134, the precode image size from the precode image data generation section 40 and the code recording area size from the code recording area setting section 136 in the user setting section 24 are input to the excess/deficiency area calculation section 176. The excess/deficiency area calculation section 176 calculates the excess/deficiency amount from the precode image size and the code recording area size. The calculated excess/deficiency amount is supplied to the excess/deficiency area display control section 178. The excess/deficiency area display control section 178 controls the display of the excess/deficiency portion of the precode image or the entire precode image and the display of the data amount fine adjustment dialogue 172 on the basis of the supplied excess/deficiency amount.

The area calculated by the excess/deficiency area calculation section 176 is supplied to the excess/deficiency block count calculation section 180 in the fine adjustment parameter generation section 168. The excess/deficiency block count calculation section 180 receives block structure parameters from the user setting section 24 and calculates the number of blocks corresponding to the excess/deficiency area on the basis of the block structure parameters. The calculated number of blocks is input to the fine adjustment data amount calculation section 182. The fine adjustment data amount calculation section 182 receives correction parameters from the user setting section 24 and calculates the data amount to be finely adjusted, which corresponds to the supplied number of blocks excluding the correction parity portion, in accordance with the correction parameters. The calculated data amount corresponding to the excess/deficiency amount is supplied to the fine adjustment parameter calculation section 184. A compressed data amount is input from a coding data generation section 36 to the fine adjustment parameter calculation section 184. The compressed data amount is compared with the data amount corresponding to the excess/deficiency amount calculated by the fine adjustment data amount calculation section 182, thereby calculating the percentage of the excess/deficiency amount with respect to the compressed data amount. The calculated percentage is output to the data amount fine adjustment section 170 as a fine adjustment parameter and simultaneously displayed on the display section 186. More specifically, the percentage is displayed as a fine adjustment parameter in the form of a bar graph, as shown in FIG. 37.

Figure 39:
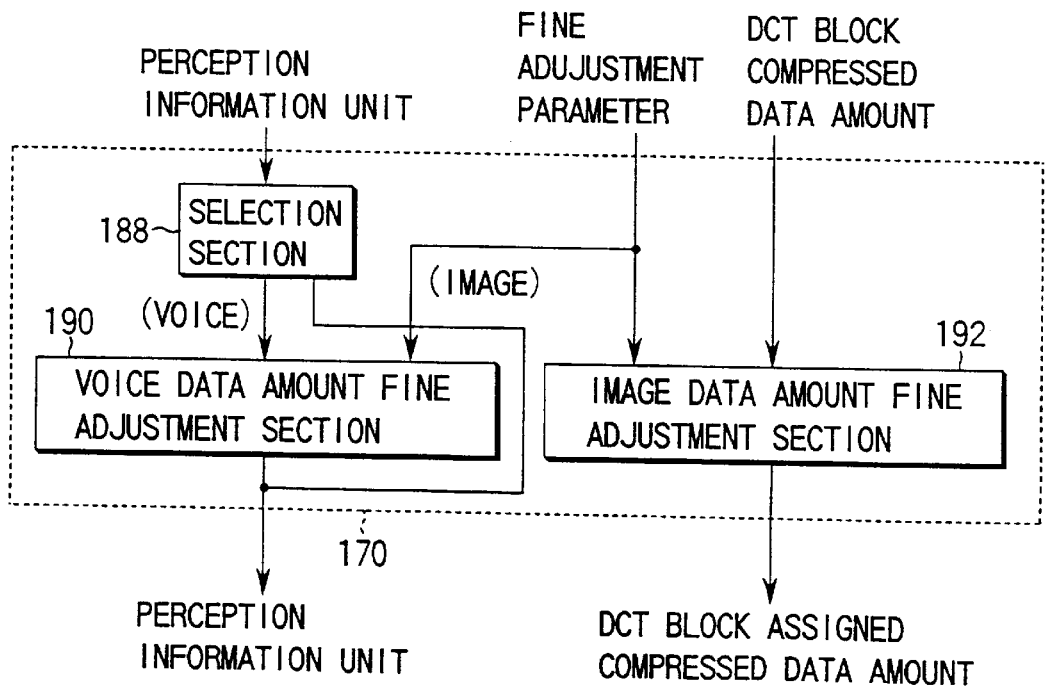
FIG. 39 is a block diagram showing the arrangement of a data amount adjustment section.

FIG. 39 is a block diagram of the data amount fine adjustment section 170. The data amount fine adjustment section 170 is constituted by a selection section 188, a voice data amount fine adjustment section 190, and an image data amount fine adjustment section 192.

Upon receiving the perception information unit from a multimedia source file generation section 28, the selection section 188 selects whether the input perception information unit is voice data or image data. Image data is directly output to a compression coding section 20. Voice data is supplied to the voice data amount fine adjustment section 190. The voice data amount fine adjustment section 190 receives the fine adjustment parameter from the fine adjustment parameter calculation section 184 and performs, on the basis of the fine adjustment parameter, fine adjustment (to be described later) for the perception information unit supplied from the selection section 188. The finely adjusted perception information unit is output to the compression coding section 20.

The image data amount fine adjustment section 192 receives the fine adjustment parameter from the fine adjustment parameter calculation section 184 and a DCT block compressed data amount from an image compressed data amount calculation section 78 in a compressed data amount calculation section 32. On the basis of these data, the image data amount fine adjustment section 192 generates a DCT block assigned compressed data amount and outputs the DCT block assigned compressed data amount to the compressed data generation section 34 in the compression coding section 20.

Figure 40:
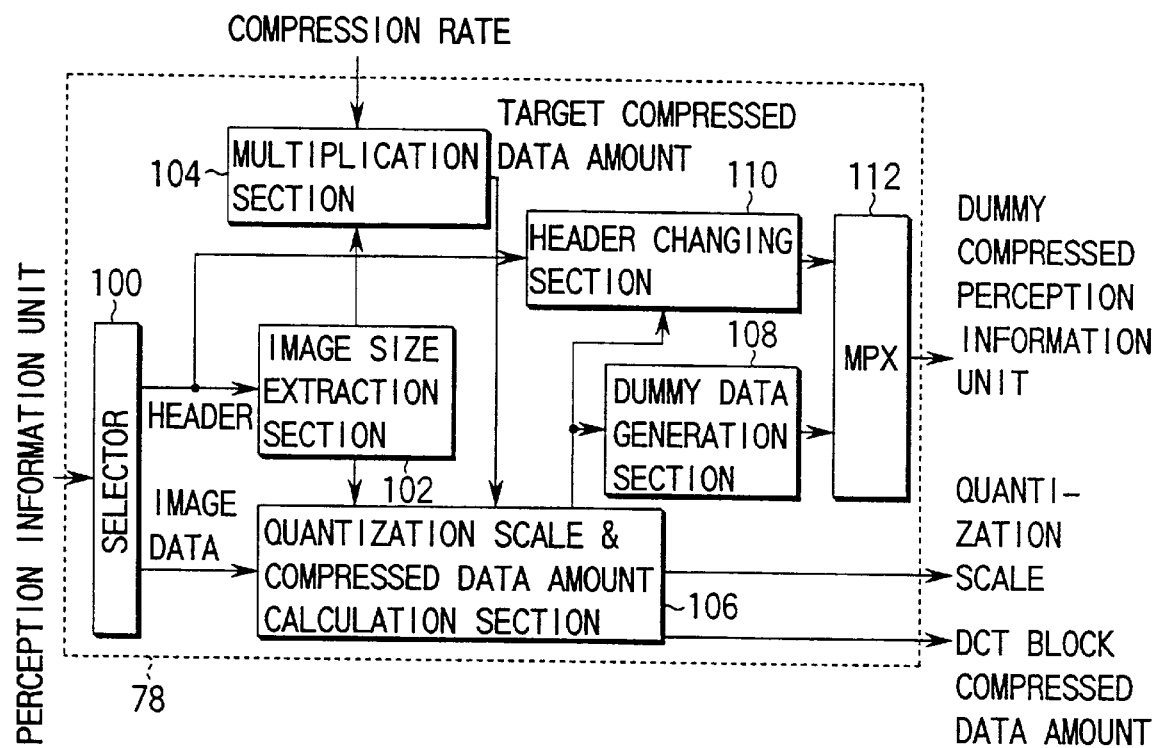
FIG. 40 is a block diagram showing the arrangement of an image compressed data amount calculation section.

In the third embodiment, a quantization scale & compressed data amount calculation section 106 in the image compressed data amount calculation section 78 outputs a compressed data amount in units of DCT units to be supplied to the image data amount fine adjustment section 192 in addition to the quantization scale corresponding to the desired compression rate, as shown in FIG. 40.

Figure 41:
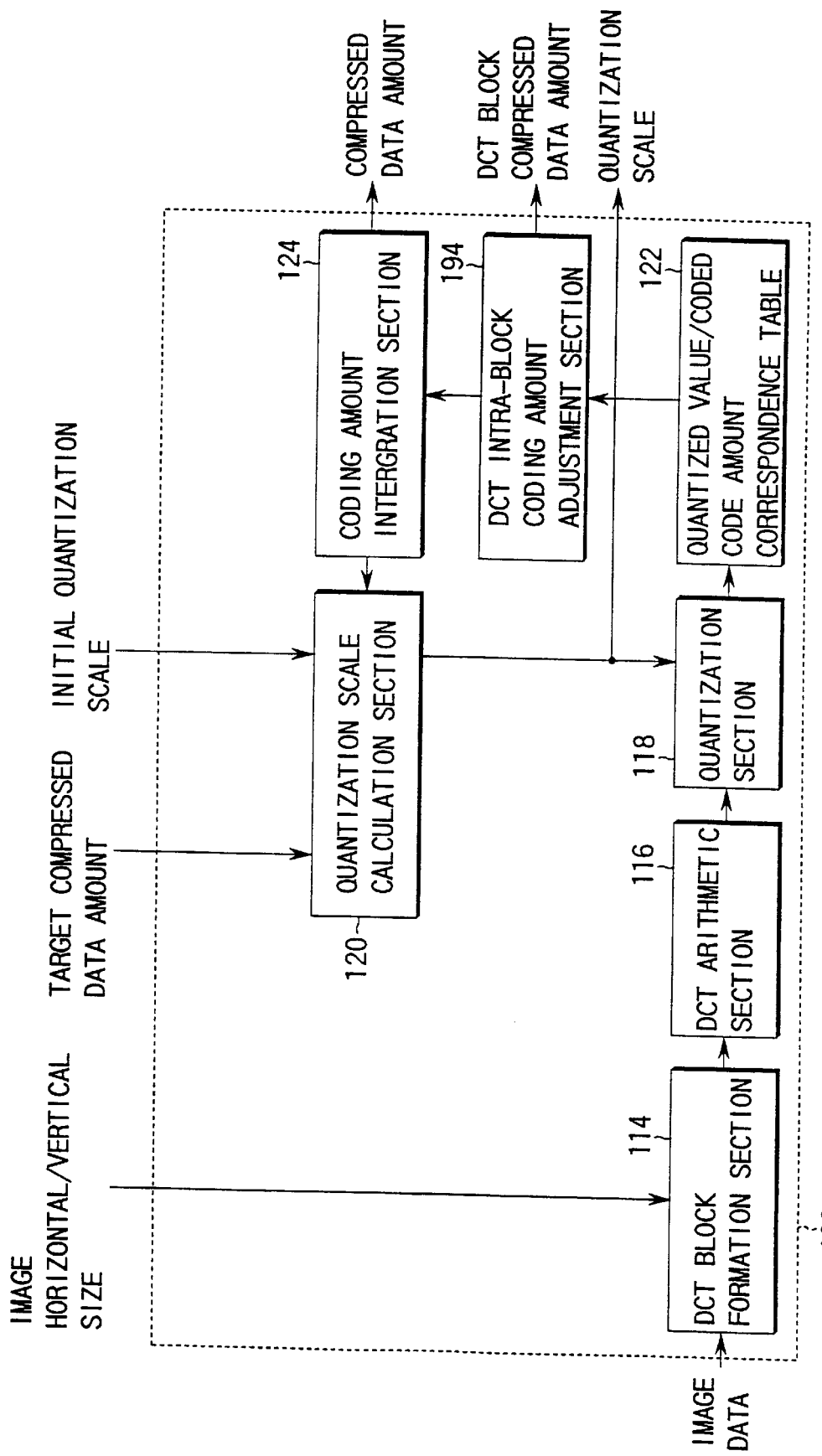
FIG. 41 is a block diagram showing the arrangement of a quantization scale & compressed data amount calculation section.

In this case, the quantization scale & compressed data amount calculation section 106 has an arrangement shown in FIG. 41. More specifically, a DCT intra-block coding amount adjustment section 194 is arranged between a quantized value/coding code amount correspondence table 122 and a coding amount integration section 124 in the arrangement shown in FIG. 21 in the first embodiment.

Details of calculation processing of the quantization scale and the DCT block compressed data amount by the quantization scale & compressed data amount calculation section 106 are disclosed in U.S. Pat. No. 5,073,820, and a detailed description thereof will be omitted. The flow of processing will be briefly described on the basis of a flow chart shown in FIG. 42. However, a flow chart in FIG. 43 associated with the first coding processing in U.S. Pat. No. 5,073,820 will be described first to help understanding of the flow chart in FIG. 42. The same reference numerals as in FIG. 23 in the first embodiment denote the same processing operations in FIG. 43.

First, DCT blocks are formed from the input image (step S40). DCT calculation is performed (step S42). The DCT coefficient is quantized in accordance with an initial quantization scale (default quantization scale) DQ (step S44). The quantized value is converted into a corresponding code amount A of the Huffman code (step S46). The DCT intra-block coding amount adjustment section 194 integrates the code amount A in units of DCT blocks to calculate a compressed data amount BV in units of DCT blocks (step S78). The coding amount integration section 124 integrates the compressed data amounts BV calculated by the DCT intra-block coding amount adjustment section 194 to calculate a compressed data amount TV of the entire image (step S80). It is determined whether DCT blocks, which have not been processed, remain in the image (step S50). If any DCT blocks remain, the flow returns to step S40.

If all the DCT blocks in the image have been processed, a quantization scale Q corresponding to the necessary compression rate is calculated on the basis of the calculated compressed data amount (total code amount) TV of the entire image, the target compressed data amount (target code amount), and the initial quantization scale (default quantization scale) DQ (step S52) and output (step S54). In addition, an assigned compressed data amount ABV is calculated in units of DCT blocks on the basis of the calculated compressed data amount TV of the entire image, the target compressed data amount, and the compressed data amount BV for each DCT block (step S82) and output (step S84).

The calculated quantization scale Q and the assigned compressed data amount ABV for each DCT block are used for the second coding processing, so that the compressed data amount can be highly precisely controlled.

Figure 42:
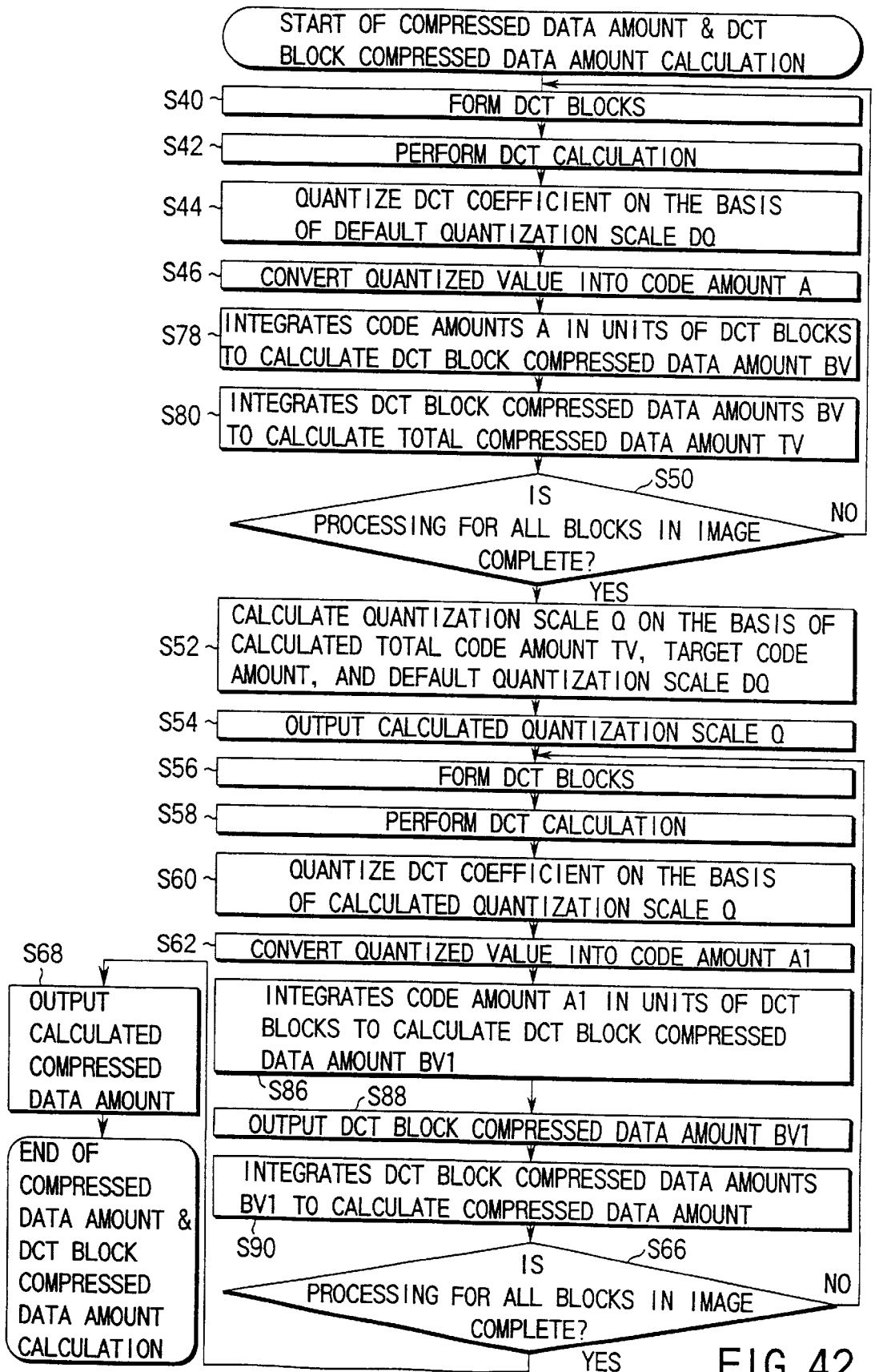
FIG. 42 is a flow chart of compressed data amount & DCT block compressed data amount calculation processing.

FIG. 42 is a flow chart showing processing of the quantization scale & compressed data amount calculation section 106 shown in FIG. 41, as described above.

Figure 43:
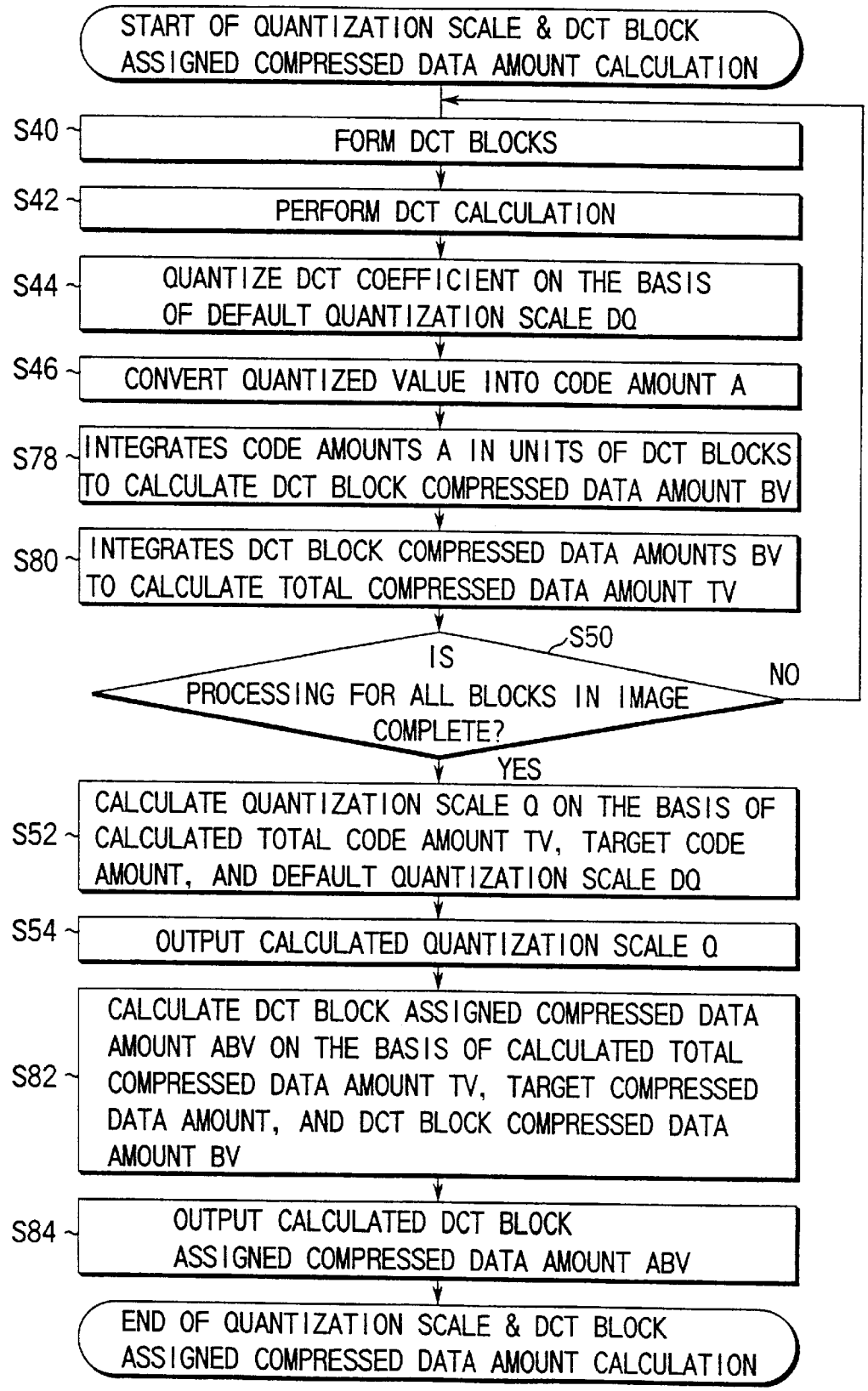
FIG. 43 is a flow chart of quantization scale & DCT block assigned compressed data amount calculation processing.

Processing in steps S40, S42, S44, S46, S78, S80, S50, S52, and S54 is the same as that shown in FIG. 43. A compressed data amount BV1 for each DCT block and a compressed data amount TV1 of the entire image are calculated again on the basis of the calculated quantization scale Q, and these amounts are used to finely adjust the data amount.

More specifically, the compressed data amount BV1 for each DCT block and the compressed data amount TV1 are calculated in the following manner. First, DCT blocks are formed from the input image (step S56). DCT calculation is performed (step S58). The DCT coefficient is quantized in accordance with the calculated quantization scale Q (step S60). The quantized value is converted into a corresponding code amount A1 of the Huffman code (step S62). The code amounts A1 are integrated in units of DCT blocks to calculate the compressed data amount BV1 for each DCT block (step S86), and the compressed data amount BV1 is output (step S88). The DCT block compressed data amounts BV1 are integrated to calculate the compressed data amount TV1 of the entire image (step S90). It is determined whether DCT blocks, which have not been processed, remain in the image (step S66). If any DCT blocks remain, the flow returns to step S56. If no DCT blocks remain, the calculated compressed data amount TV1 of the entire image is output (step S68).

The image data amount fine adjustment section 192 in this embodiment calculates the assigned compressed data amount for each DCT block in actual coding processing on the basis of the DCT block compressed data amount calculated by the image compressed data amount calculation section 78 in units of DCT blocks. This processing corresponds to steps S82 and S84 in the first coding processing of the prior art described in FIG. 43.

Figure 44:
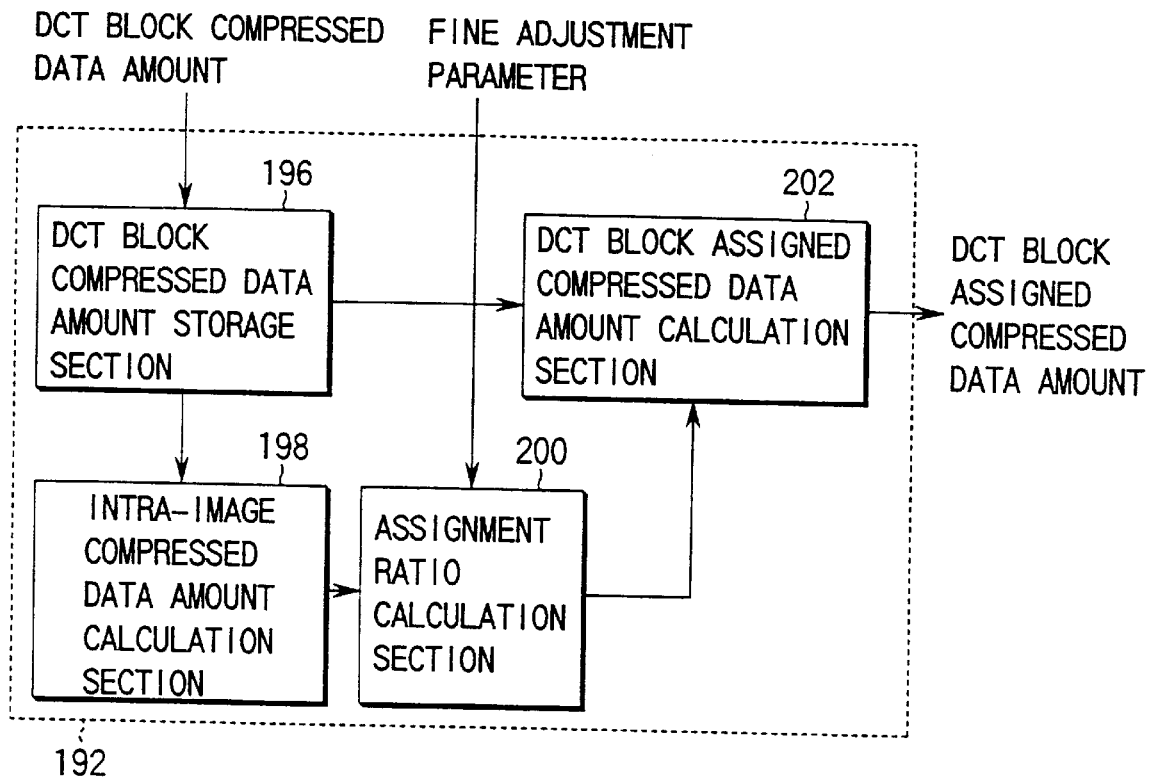
FIG. 44 is a block diagram showing the arrangement of an image data amount fine adjustment section.

More specifically, the image data amount fine adjustment section 192 comprises a DCT block compressed data amount storage section 196, an intra-image compressed data amount calculation section 198, an assignment ratio calculation section 200, and a DCT block assigned compressed data amount calculation section 202, as shown in FIG. 44. The DCT block compressed data amount input from the image compressed data amount calculation section 78 is temporarily stored in the DCT block compressed data amount storage section 196. The stored DCT block compressed data amount is input to the intra-image compressed data amount calculation section 198. The intra-image compressed data amount calculation section 198 integrates the input DCT block compressed data amounts corresponding to the number of blocks, thereby calculating the compressed data amount in the image. The calculated compressed data amount is input to the assignment ratio calculation section 200. The assignment ratio calculation section 200 receives the fine adjustment parameter generated by the fine adjustment parameter generation section 168. The assignment ratio calculation section 200 calculates the assignment ratio for each block on the basis of the compressed data amount and the fine adjustment parameter. More specifically, the assignment ratio is obtained by multiplying the compressed data amount in the image by 100 and dividing the multiplied compressed data amount by the fine adjustment parameter. The assignment ratio is input to the DCT block assigned compressed data amount calculation section 202. The DCT block assigned compressed data amount calculation section 202 multiplies the assignment ratio by the compressed data amount for each block from the DCT block compressed data amount storage section 196 to calculate the compressed data amount to be assigned to each block, and outputs the compressed data amount to the compressed data generation section 34 as an assigned block compressed data amount.

Figure 45:
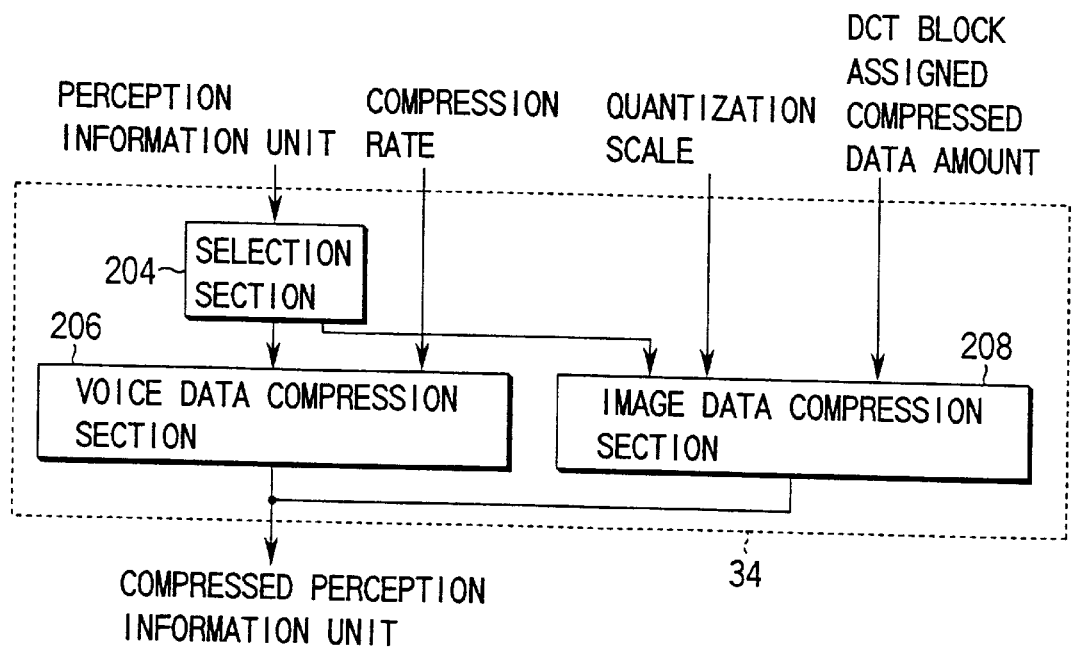
FIG. 45 is a block diagram showing the arrangement of a compressed data generation section.
Figure 46:
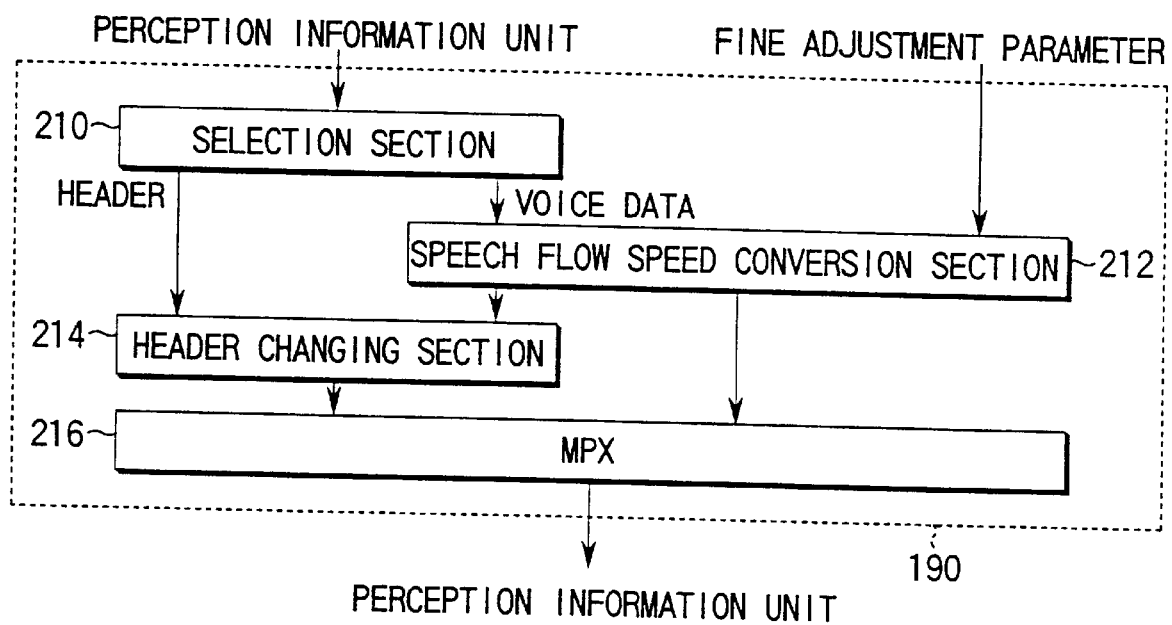
FIG. 46 is a block diagram showing the arrangement of a voice data amount fine adjustment section.

The compressed data generation section 34 is constituted by a selection section 204, a voice data compression section 206, and an image data compression section 208, as shown in FIG. 45. The image data compression section 208 performs coding in units of DCT blocks on the basis of the DCT block assigned compressed data amount output from the DCT block assigned compressed data amount calculation section 202 as a parameter associated with compression coding. Processing in the image data compression section 208 corresponds to the second coding processing (not shown) using the quantization parameter Q and the assigned compressed data amount ABV for each DCT block, as disclosed in U.S. Pat. No. 5,073,820.

The compressed data amount calculation section 32, the data amount fine adjustment section 170, and the compressed data generation section 34 in the third embodiment have been described above on the basis of U.S. Pat. No. 5,073,820. However, the compressed data amount calculation section and the data amount fine adjustment section can also be constituted to calculate the statistics (activity) of the image, thereby calculating the quantization scale and the block assigned code amount.

In the above embodiment, the target compressed data amount is calculated from the compression rate (the number of bits per pixel) set by the user setting section and the image size. In this setting, a priority is placed on the image quality such that a desired image quality can be selected by the user for the loaded image. However, for the target compressed data amount, the priority may be placed on the amount of data to be recorded as a code.

More specifically, the number of recordable code blocks is calculated on the basis of the code recording area set by the user setting section, and the recordable data amount is calculated from the number of blocks. The remaining net data amount excluding the correction code parity and the header is obtained as the target compressed data amount. According to this method, the code image can be quickly recorded in the set code image recording area without interposing any data amount coarse adjustment process of, e.g., cutting an unnecessary blank portion of the image.

The flow of processing of finely adjusting a voice data amount as a perception information unit will be described below.

The voice data amount fine adjustment section 190 in the data amount fine adjustment section 170 comprises a selection section 210, a speech flow speed conversion section 212, a header changing section 214, and a multiplexer 216.

The selection section 210 selects the header portion or the voice data portion from the data of the perception information unit input from the multimedia source file generation section 28 and outputs the header portion or the voice data portion. The header portion is supplied to the header changing section 214, and the voice data portion is supplied to the speech flow speed conversion section 212. The speech flow speed conversion section 212 converts the speech flow speed of the voice data supplied from the selection section 210 on the basis of the fine adjustment parameter input from the fine adjustment parameter generation section 168 and outputs the voice data. The multiplexer 216 synthesizes the voice data whose speech flow speed is converted with the header information from the header changing section 214 and outputs the perception information unit which has undergone data amount fine adjustment.

The output perception information unit is subjected to analysis/synthesis coding such as CELP (Code Excited Linear Prediction) in which compression processing is performed using a fixed rate, or ADCPM by the voice data compression section 206 in the compressed data generation section 34, which is connected to the output of the section 202, thus generating compressed data.

Figure 47:
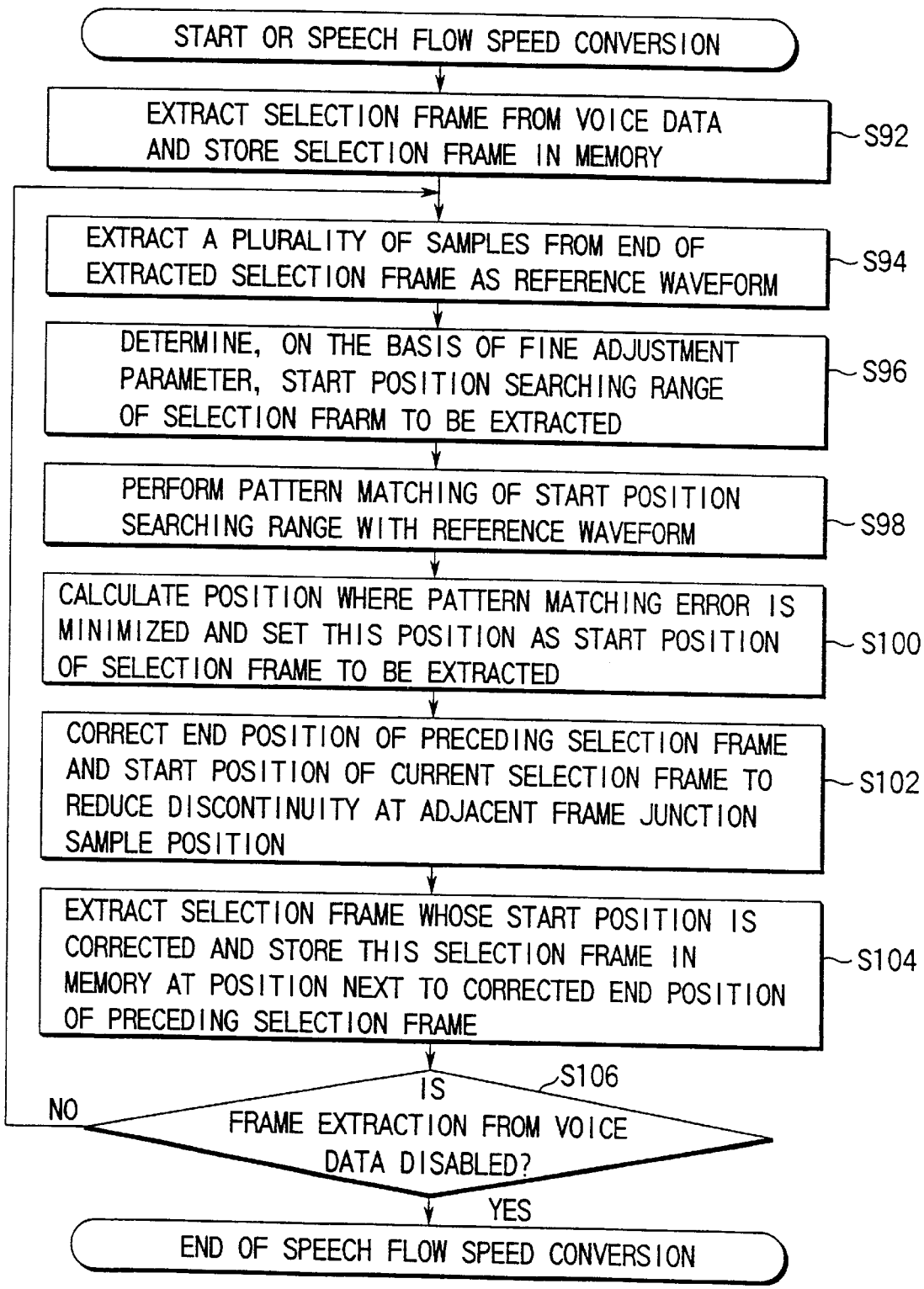
FIG. 47 is a flow chart of speech flow speed conversion processing.

As the speech flow speed conversion section 212, a technique disclosed in Jpn. Pat. Appln. KOKOKU Publication No. 60-2680 (corresponding to U.S. Pat. No. 4,648,369) can be used, and a detailed description thereof will be omitted. The flow of processing will be briefly described with reference to FIG. 47.

First, a selection frame is extracted from the input voice data and stored in an internal memory (not shown) (step S92). A plurality of samples are extracted from the end of the extracted selection frame as a reference waveform (step S94). Subsequently, the start position searching range of a selection frame to be extracted is determined on the basis of the fine adjustment parameter (step S96). The start position searching range is pattern-matched with the reference waveform (step S98). A position where the error due to pattern matching is minimized is calculated and defined as the start position of the selection frame to be extracted (step S100). To minimize the discontinuity at the adjacent selection frame junction sampling position, the end of the preceding selection frame and the start position of the current selection frame are corrected (step S102). The current selection frame whose start position is corrected is extracted from the voice data and stored at a memory position next to the corrected preceding selection frame end position (step S104). It is determined whether a frame can be extracted from the remaining voice data (step S106). If a frame can be extracted, the flow returns to step S94. Otherwise, speech flow speed conversion processing is ended.

Figure 48:
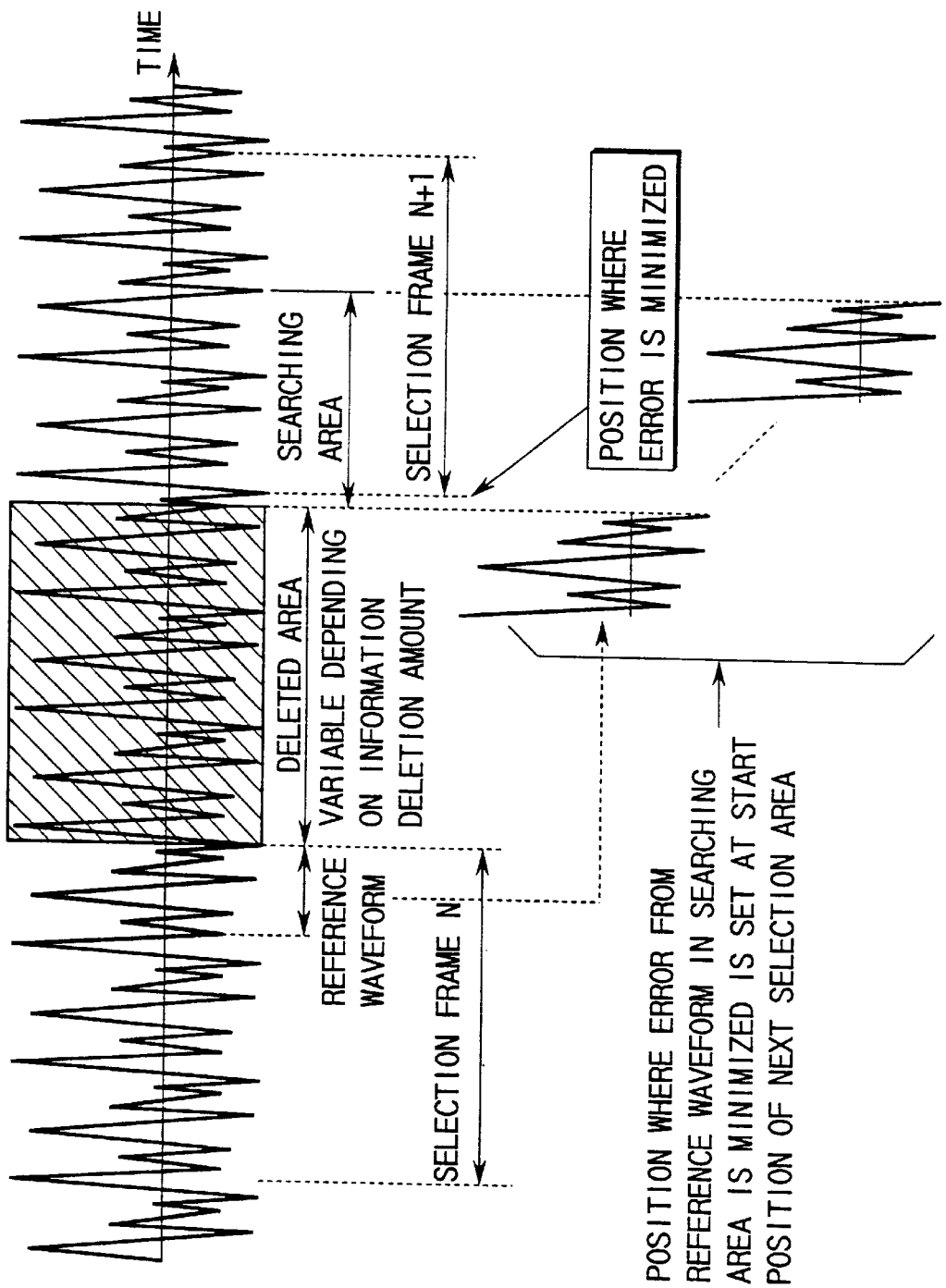
FIG. 48 is a view showing the concept of fine adjustment in a direction for decreasing voice data in processing in steps S98 and S100 in the flow chart of FIG. 47.
Figure 49:
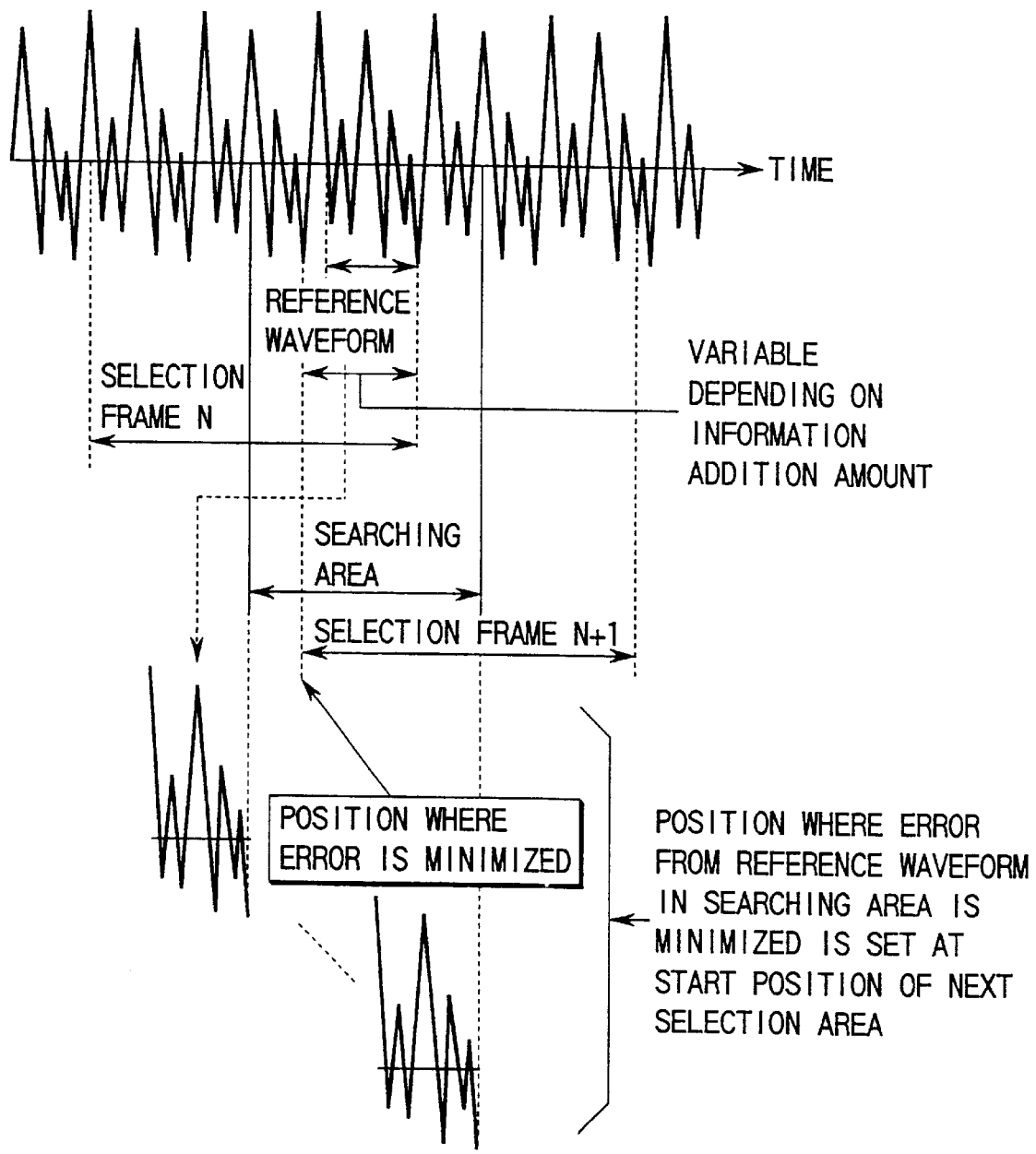
FIG. 49 is a view showing the concept of fine adjustment in a direction for increasing voice data in processing in steps S98 and S100 in the flow chart of FIG. 47.
Figures 50, 52:
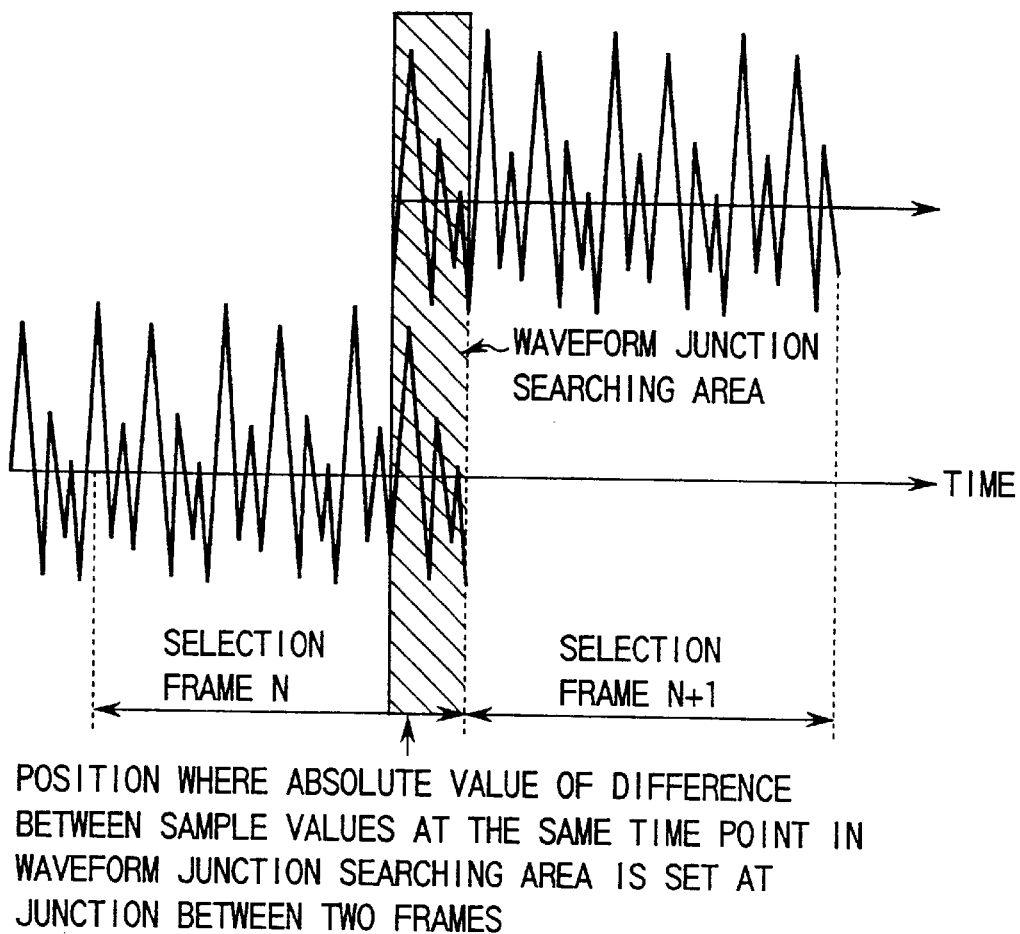
FIG. 50 is a view showing the concept of processing in step S102 in the flow chart of FIG. 47.
FIG. 52 is a view showing a multimedia source file obtained when a multimedia source file synthesis section synthesizes perception information units.

FIGS. 48 and 49 are views showing the concept of processing in steps S98 and S100. Particularly, FIG. 48 shows fine adjustment in a direction for decreasing the voice data, and FIG. 49 shows fine adjustment in a direction of increasing the voice data. FIG. 50 is a view showing the concept of processing in step S102.

The speech flow speed conversion section in the voice data amount fine adjustment section 190 in the third embodiment has been described above on the basis of Jpn. Pat. Appln. KOKOKU Publication No. 60-2680. However, similar data amount fine adjustment can be performed using speech flow speed conversion for extracting the pitch of voice data and deleting/repeating the voice data in units of pitches.

The fourth embodiment of the present invention will be described next.

Figure 51:
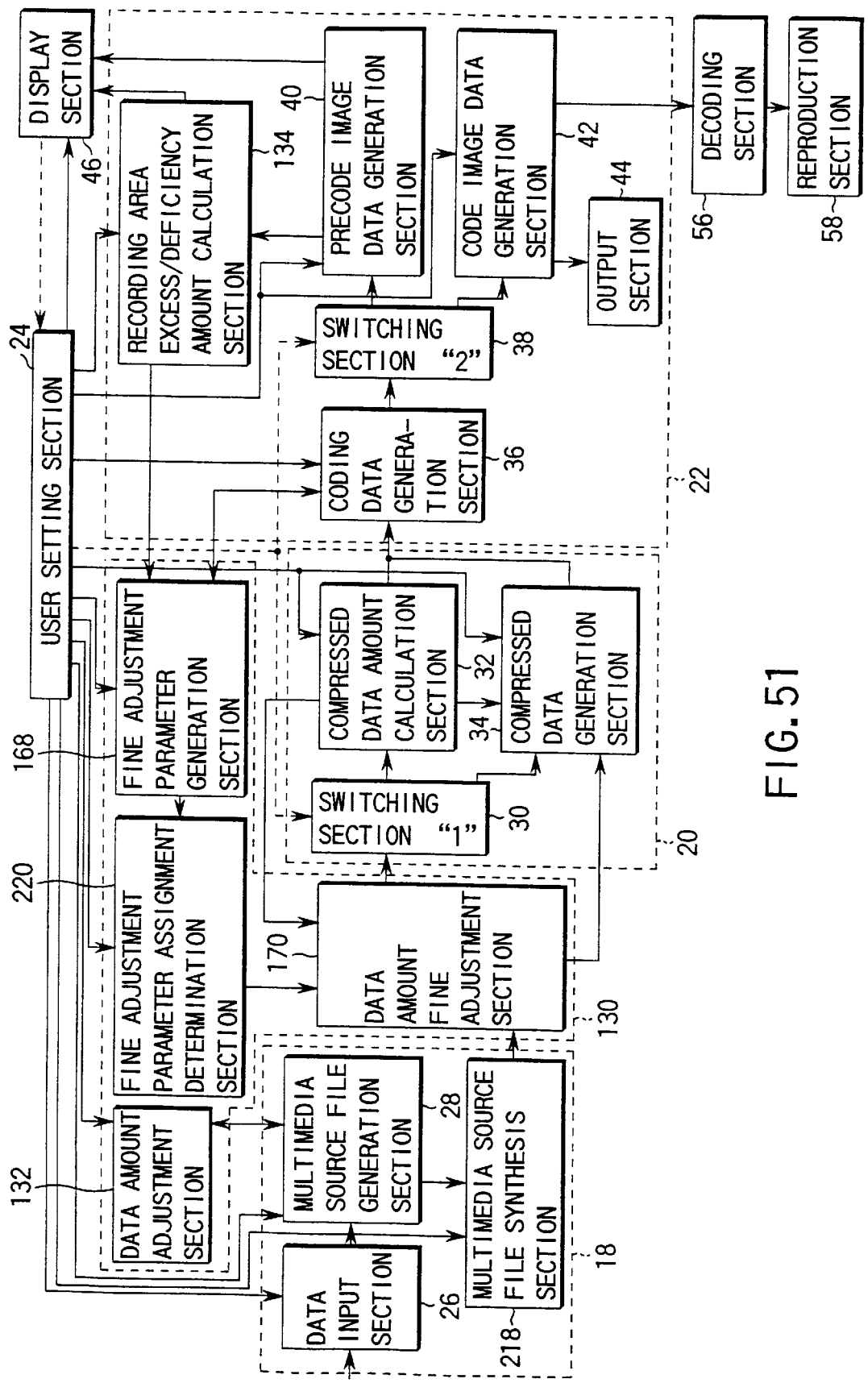
FIG. 51 is a block diagram showing the arrangement of the fourth embodiment.

FIG. 51 is a block diagram showing the arrangement of a code image data output apparatus according to the fourth embodiment. In the code image data output apparatus of this embodiment, a multimedia source file synthesis section 218 is added to an input section 18 in the arrangement shown in FIG. 35 in the above-described third embodiment, and additionally, a fine adjustment parameter assignment determination section 220 is added to an adjustment section 130.

In the above-described first to third embodiments, the multimedia source file has one perception information unit. The fourth embodiment copes with a multimedia source file formed by synthesizing a plurality of perception information units. Accordingly, in this embodiment, the multimedia source file synthesis section 218 synthesizes perception information units 1 to N, as shown in FIG. 52, and outputs the multimedia source file to a data amount fine adjustment section 170. In addition, the fine adjustment parameter assignment determination section 220 determines the assignment ratio of each of the plurality of perception information units.

Figure 53:
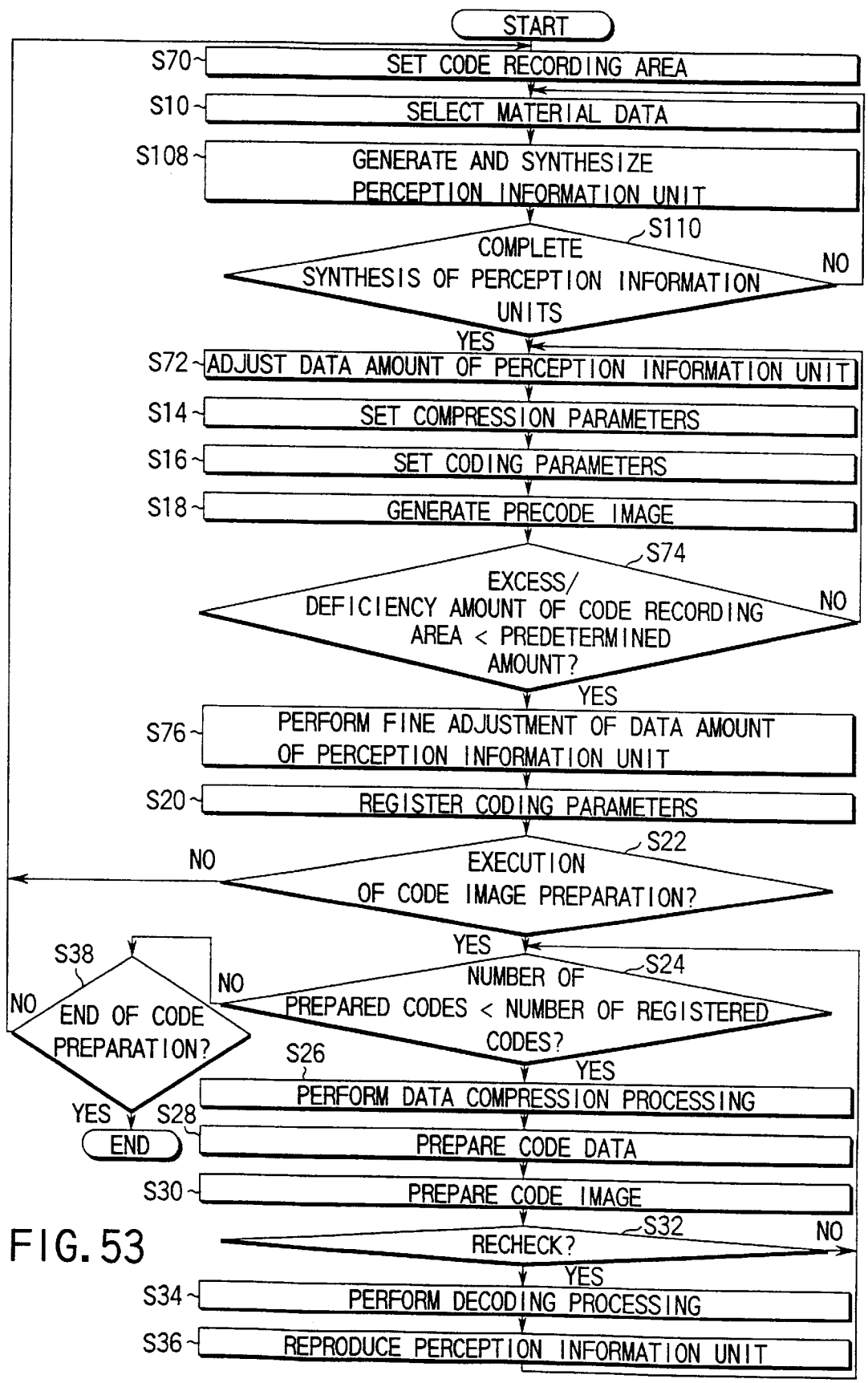
FIG. 53 is a flow chart of the operation of the fourth embodiment.

FIG. 53 is a flow chart of the operation of the fourth embodiment. The same reference numerals as in FIG. 36 in the third embodiment denote the same processing operations in FIG. 53, and a detailed description thereof will be omitted.

As in the third embodiment, the user sets a code recording area 138 on the layout window (step S70) and selects material data (step S10). A multimedia source file generation section 28 generates perception information units, and the multimedia source file synthesis section 218 synthesizes the generated perception information units (step S108). The user determines whether synthesis of perception information units is to be ended (step S110). If NO in step S110, the flow returns to step S10 to select new material data.

If YES in step S110, a data amount adjustment section 132 adjusts the data amount of each perception information unit (step S72). A compression parameter is set (step S14), coding parameters are set (step S16), and a precode image is generated (step S18). In this case, data amount adjustment and setting of the compression parameters are individually performed in units of individually registered perception information units.

The user determines whether the excess/deficiency amount of the code recording area falls within the allowance (step S74). If NO in step S74, the flow returns to step S72 to adjust the data amount of each perception information unit.

If the user determines or it is automatically determined in step S74 that the excess/deficiency amount of the code recording area falls within the allowance, the data amount of each perception information unit is finely adjusted (step S76). This processing is also individually performed in units of perception information units.

Processing from step S20 is the same as that in the first embodiment.

Figure 54:
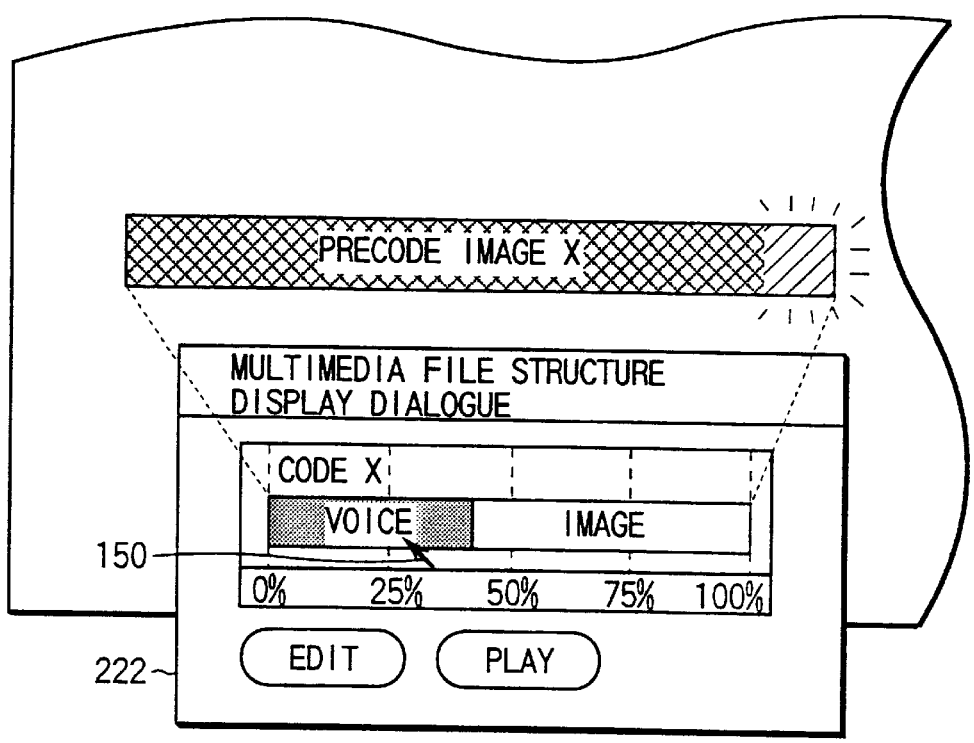
FIG. 54 is a view showing a multimedia file structure display dialogue.

FIG. 54 is a view showing the user interface portion of the data amount adjustment section 132 in the fourth embodiment. When the mouse cursor is double-clicked on a precode image X, a multimedia file structure display dialogue 222 is displayed on a display section 46. The multimedia file structure display dialogue 222 is displayed only when the precode image is constituted by a plurality of perception information units to display the ratio of the data amounts of the perception information units in the precode image. FIG. 54 shows that the precode image includes one voice perception information unit and one image perception information unit.

When the user desires voice edit processing, a mouse cursor 150 is clicked on the voice portion in the multimedia file structure display dialogue 222 to select voice data amount adjustment. In addition, an "edit" button is clicked to display a voice edit dialogue 152 as shown in FIG. 33, so that processing of, e.g., cutting a silent portion can be performed, as described above.

Figure 55:
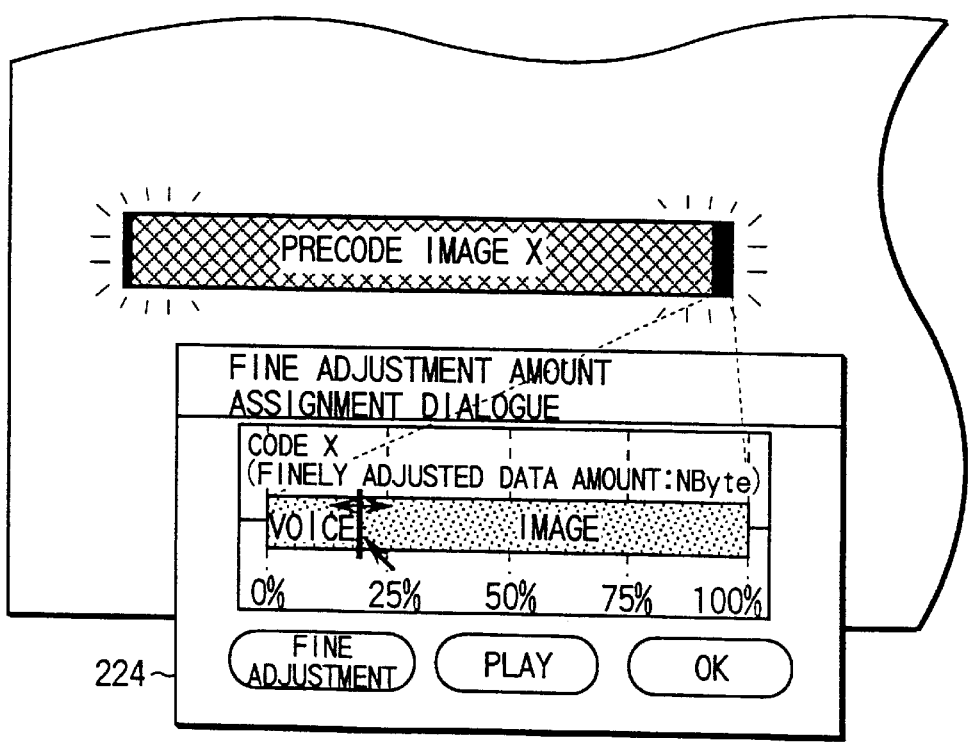
FIG. 55 is a view showing a fine adjustment assignment dialogue.
Figure 56:
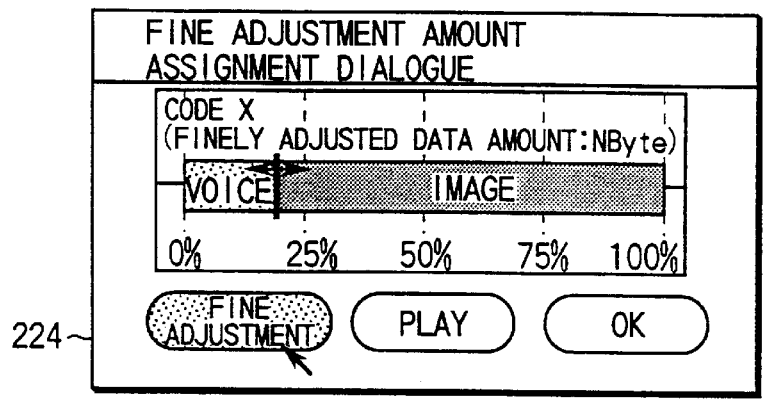
FIG. 56 is a view showing the fine adjustment assignment dialogue.

When the excess/deficiency amount is made smaller than a predetermined amount by such edit processing, the display changes to a fine adjustment amount assignment dialogue 224 as shown in FIG. 55, as described above. In the fine adjustment amount assignment dialogue 224, the excess/deficiency amount for fine adjustment is displayed as 100%, and the user can select the percentages of voice data and image data by dragging the boundary between the voice data and the image data. This processing is performed by the fine adjustment parameter assignment determination section 220. As shown in FIG. 56, when voice data is selected, and a "fine adjustment" button is clicked, a fine adjustment parameter assigned to the voice data by the fine adjustment parameter assignment determination section 220 is supplied to the data amount fine adjustment section 170 to perform fine adjustment processing by, e.g., speech flow speed conversion as described above. The finely adjusted voice data can be reproduced by depressing a "play" button and checked by the user.

The fifth embodiment of the present invention will be described next.

Figure 57:
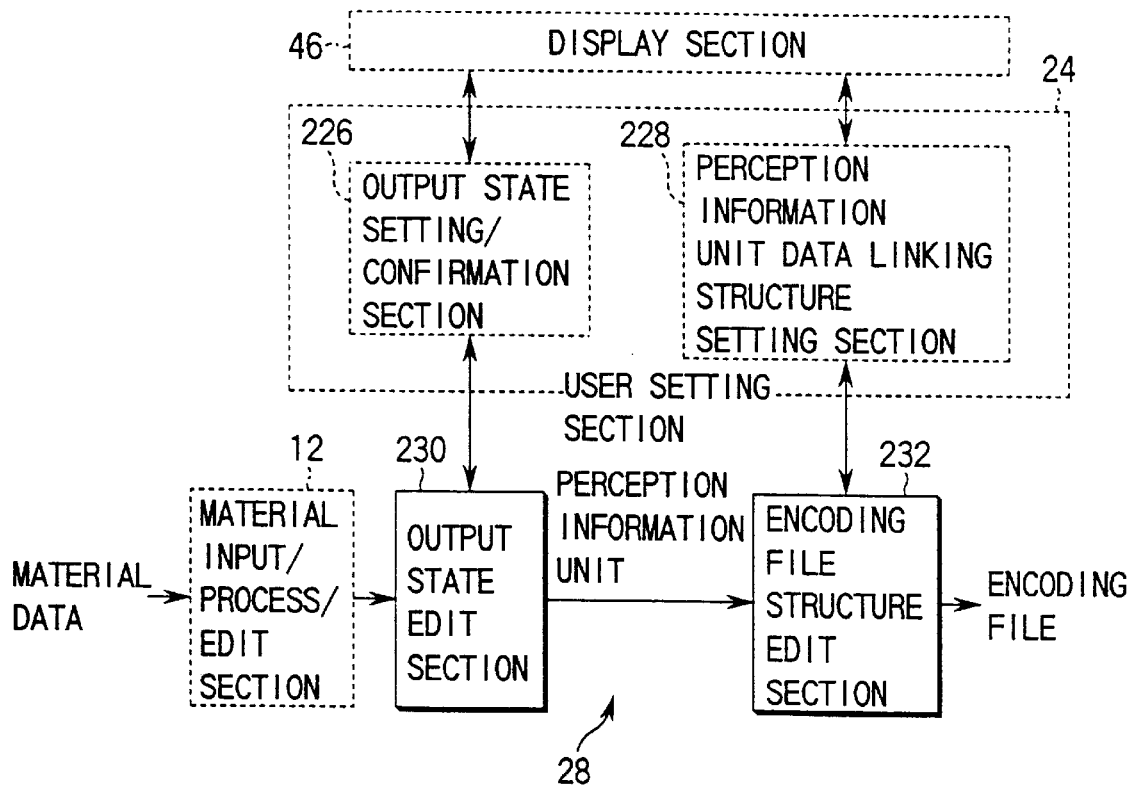
FIG. 57 is a block diagram showing the structure of a multimedia source file generation section in the fifth embodiment.

FIG. 57 is a block diagram showing the structures of a user setting section 24 and a multimedia source file generation section 28 in this embodiment. In this embodiment, the user setting section 24 includes an output state setting/confirmation section 226 and a perception information unit data linking structure setting section 228. The multimedia source file generation section 28 includes an output state edit section 230 and an encoding file structure edit section 232.

The output state edit section 230 edits the output state of a processed material which is input from a material input/process/edit section 12 for processing material data, and outputs a generated perception information unit to the encoding file structure edit section 232. The encoding file structure edit section 232 generates an encoding file from the input perception information unit and outputs the encoding file.

Figure 58:
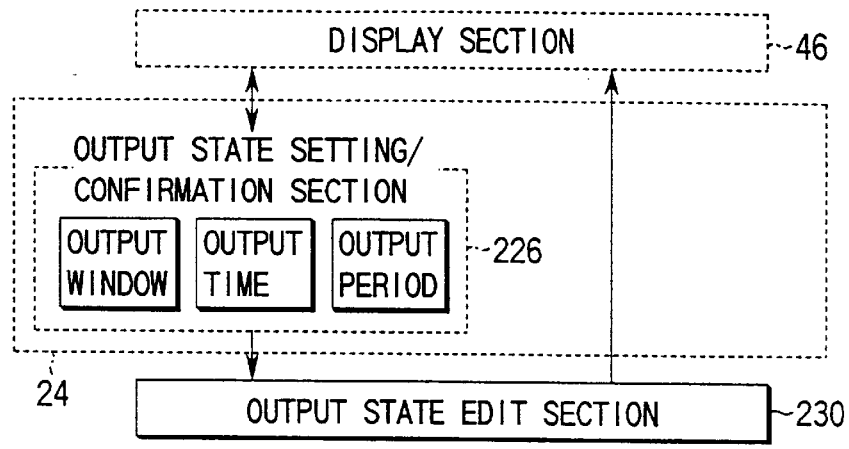
FIG. 58 is a block diagram for explaining the function of an output state setting/confirmation section.

The operation of the output state edit section 230 is performed in accordance with the operation of the output state setting/confirmation section 226 in the user setting section 24. The output state setting/confirmation section 226 can set or confirm an output window, an output time, and an output period, as shown in FIG. 58. Output window setting processing will be described. When a code image of, e.g., image data recorded on a sheet surface is read and reproduced by a reproduction device, the image can be displayed on a window opened on a window such as a CRT connected to the reproduction device. In this case, since a plurality of windows can be formed, a window and a position where the image is to be output can be selected. In setting an output time, a timing for outputting voice or image data is selected. In setting an output period, a continuation time period of the data output at the selected timing is set.

Figure 59:
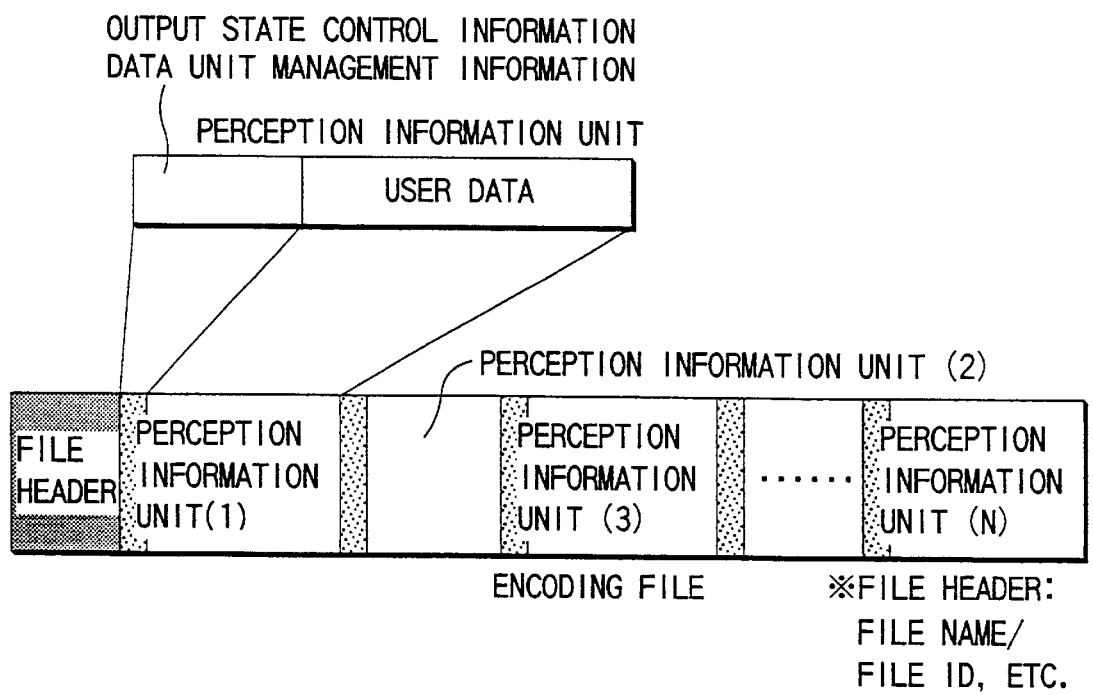
FIG. 59 is a view showing the relationship between perception information units and an encoding file.

The perception information unit output from the output state edit section 230 includes a header portion and a user data portion, as shown on the upper side of FIG. 59. Output state control information is written in the header portion. In accordance with setting by the perception information unit data linking structure setting section 228, perception information units are linked by the encoding file structure edit section 232, as shown on the lower side of FIG. 59, to generate an encoding file. A file header is added to the start position of the encoding file. A fine name or a file ID is written in the file header. In addition, various kinds of information associated with the data structure, e.g., the ID number of the perception information unit and data representing the linked state and the position of the perception information unit in the linked state are written in the header portion of each perception information unit as data unit management information in accordance with setting by the perception information unit data linking structure setting section 228.

Figure 61:
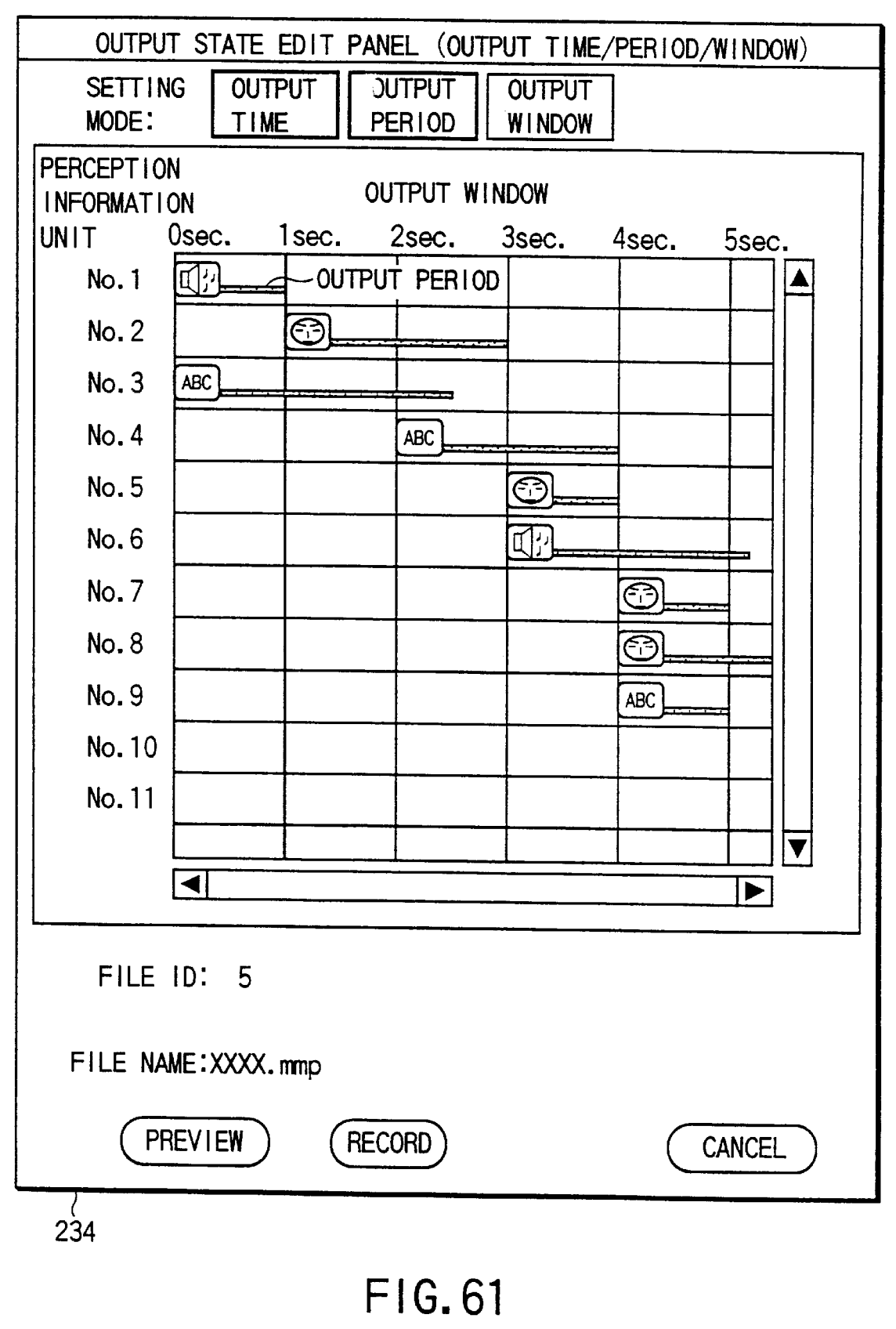

FIGS. 60 and 61 are views showing an output state edit panel 234 displayed on a display section 46 by the output state setting/confirmation section 226. Particularly, FIG. 60 shows an output window setting mode, and FIG. 61 shows an output time or output period setting mode.

In the output window setting mode shown in FIG. 60, the user can drag and drop an icon representing the contents of each perception information unit to a desired output window by the mouse operation to set the output window to which the perception information unit is to be output. In FIG. 60, an "ABC" icon represents text data; a face mark icon, image data; and a speaker mark icon, voice data.

In the output time or output period setting mode shown in FIG. 61, an "output time" button is clicked first to set the output time setting mode. When an icon representing the contents of each perception information unit is dragged and dropped to a desired output time by the mouse operation, the output time at which the perception information unit is to be output can be set. When an "output period" button is clicked, the output period setting mode is set. When an icon representing the contents of each perception information unit is dragged by the mouse operation to the desired output end time to extend a bar representing the output period, the output period of the perception information unit can be set. When no specific output period is set for voice data or moving image data, the data is output for the time of the data. For example, voice data of 2 seconds is output for a period of 2 seconds. However, when the output period is set for reproduction of a code by a reproduction device, and original data is longer than the set output period, reproduction is stopped halfway. When the original data is shorter than the set period, the data is repeatedly reproduced.

When a "preview" button is clicked on the output state edit panel 234, the edit result can be previewed. When a "record" button is clicked, the edit result can be determined. More specifically, information according to the edit result is written in the header portion of each perception information unit by the output state edit section 230 and output to the encoding file structure edit section 232.

Figure 62:
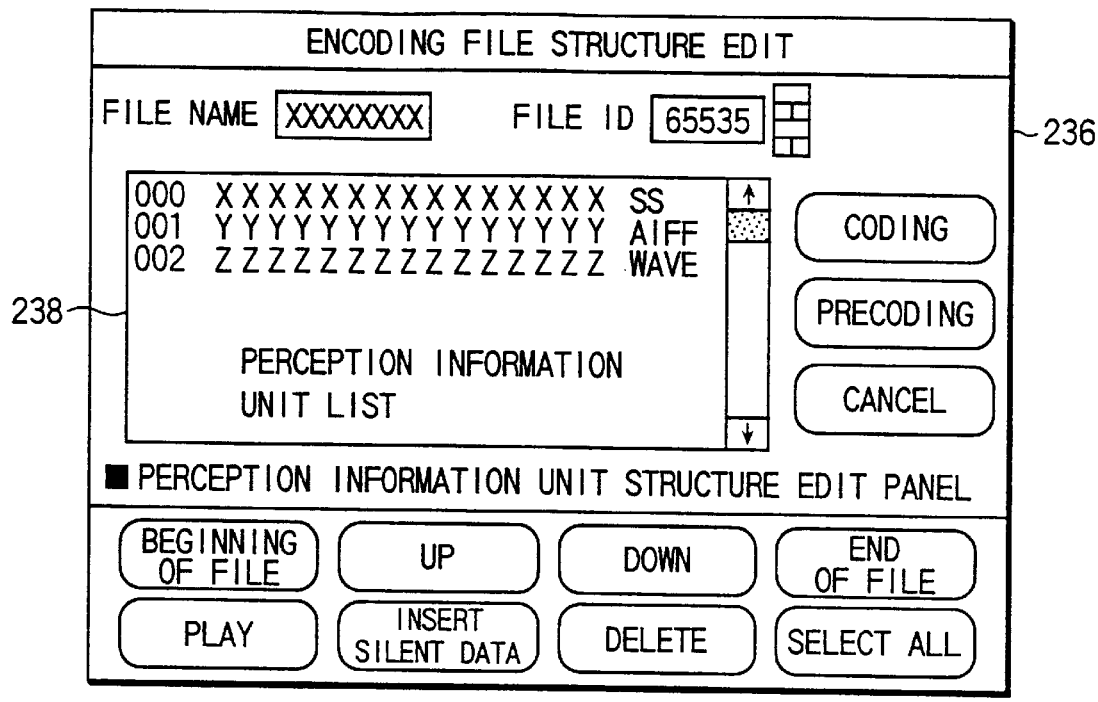
FIG. 62 is a view showing an encoding file structure edit window.

FIG. 62 is a view showing an encoding file structure edit dialogue 236 displayed on the display section 46 by the perception information unit data linking structure setting section 228.

In this encoding file structure edit dialogue 236, perception information units as edit targets are listed in a perception information unit list 238 at the center. These perception information units are designated in the pull-down list of file IDs and registered in the perception information unit list 238. Alternatively, the perception information units may be registered in the list 238 by the drag and drop operation with the mouse from an independently displayed file list, as a matter of course. In the perception information unit list 238, "000", "001", and the like are reference numbers. "XXX . . . ", "YYY . . . ", and the like are file names, i.e., the names of perception information units of materials. "SS", "AIFF", and the like are extensions representing formats or the like.

After the perception information units are registered in the perception information unit list 238, the order of the registered perception information units is edited to form an encoding file as shown in FIG. 59. More specifically, a perception information unit in the perception information unit list 238 is clicked with the mouse and selected. Next, a "beginning of file" button, an "up" button, a "down" button, or an "end of file" button on the encoding file structure edit dialogue 236 is clicked to move the perception information unit.

In the encoding file structure edit dialogue 236, when a "play" button is clicked after selection of the perception information unit, the data can be reproduced and confirmed. When a plurality of continuous voice perception information units are selected and reproduced/confirmed, and it is found that the continuity between the perception information units is unsatisfactory, a "silent portion insertion" button can be clicked to set and insert a silent portion between the perception information units.

When a "preceding" button is clicked on the encoding file structure edit dialogue 236, an encoding file according to the edit result in this dialogue is generated by the encoding file structure edit section 232. The encoding file is supplied to a compression coding section 20 at the next stage as described above to start precode image generation processing. When a "coding" button is clicked, code image generation can be started.

Figure 63:
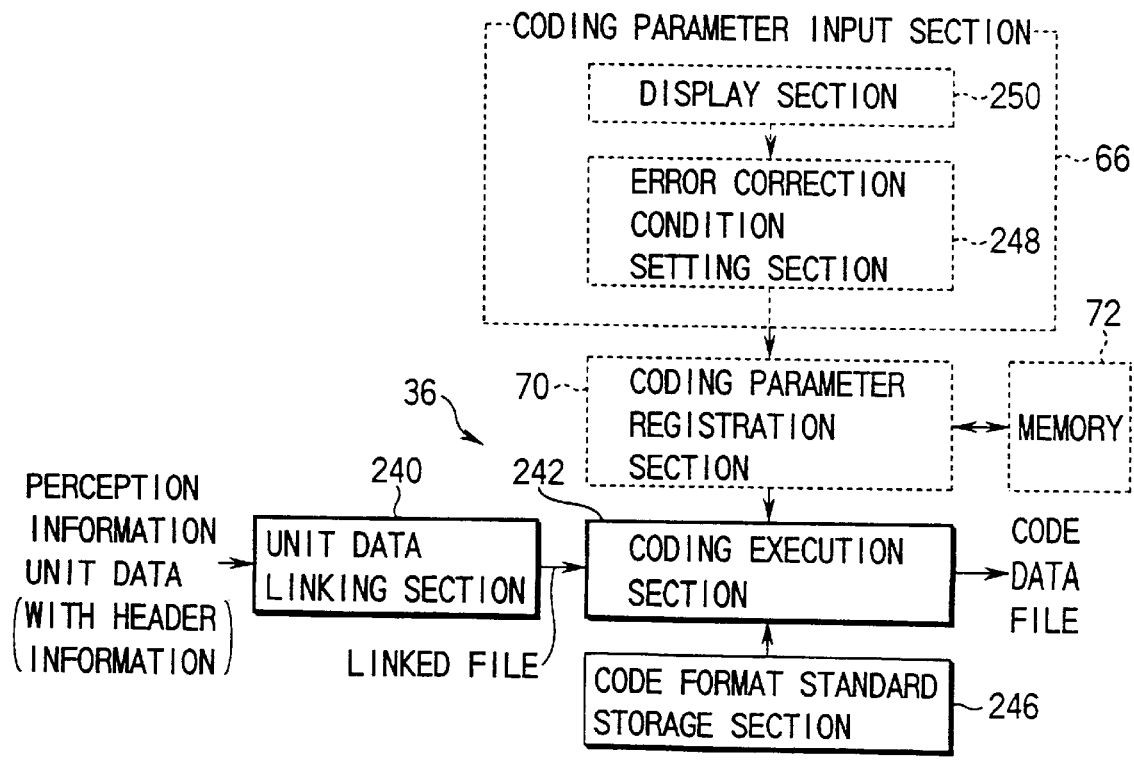
FIG. 63 is a block diagram showing the structure of a coding data generation section.

A coding data generation section 36 will be described next. In this embodiment, the coding data generation section 36 comprises a unit data linking section 240, a coding execution section 242, and a code format standard storage section 246, as shown in FIG. 63.

Perception information unit data (or dummy compressed perception information unit data in precode image generation) from the compression coding section 20 is input to the unit data linking section 240 to generate a linked file. The compression coding section 20 outputs the perception information units one by one at random. The unit data linking section 240 temporarily links the perception information units to form one file in which the plurality of perception information units are linked to each other. This generated file will be called a linked file. When only one perception information unit is output from the compression coding section 20, the unit data linking section 240 outputs the perception information unit as a linked file, as a matter of course.

Figure 64:
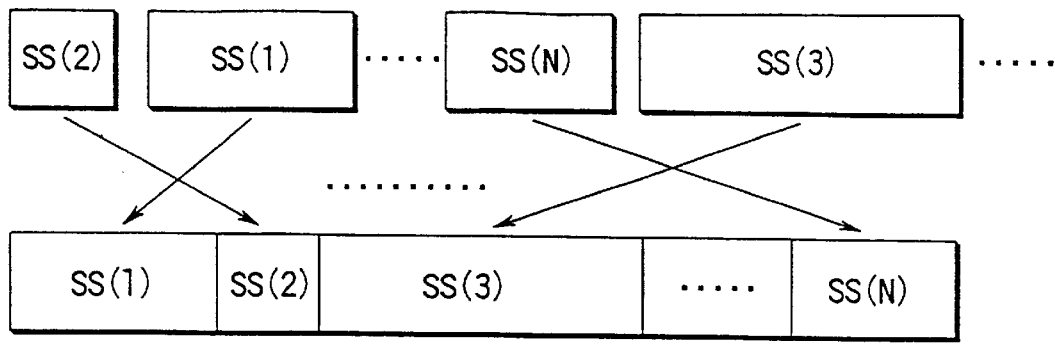
FIG. 64 is a view for explaining the structure of a linked file.

The linked file has a structure as shown in FIG. 64. As shown from the left to the right on the upper side of FIG. 64 in a time-serial manner, the perception information units are input at random in the order of, e.g., perception information unit No. 2 (SS(2)), perception information unit No. 1 (SS (1)), . . . . These perception information units are arranged in the order of ID numbers, as shown on the lower side of FIG. 64, thereby generating a linked file.

The linked file is input to the coding execution section 242. Coding is executed, and a coding file is output. The coding execution section 242 executes coding processing in accordance with coding parameters including error correction conditions set by the user setting section 24 and format standard information supplied from the code format standard storage section 246. The coding parameters are set by the user through a coding parameter input section 66 including an error correction condition setting section 248 and a display section 250 (actually, the display section 46 also serves as the display section 280) in the user setting section 24. The coding parameters are temporarily stored in a memory 72 by a coding parameter registration section 70, read out by the coding parameter registration section 70, and supplied to the coding execution section 242. The code format standard storage section 246 stores in advance format standard information used for coding. This format standard information is supplied to the coding execution section 242.

Figure 65:
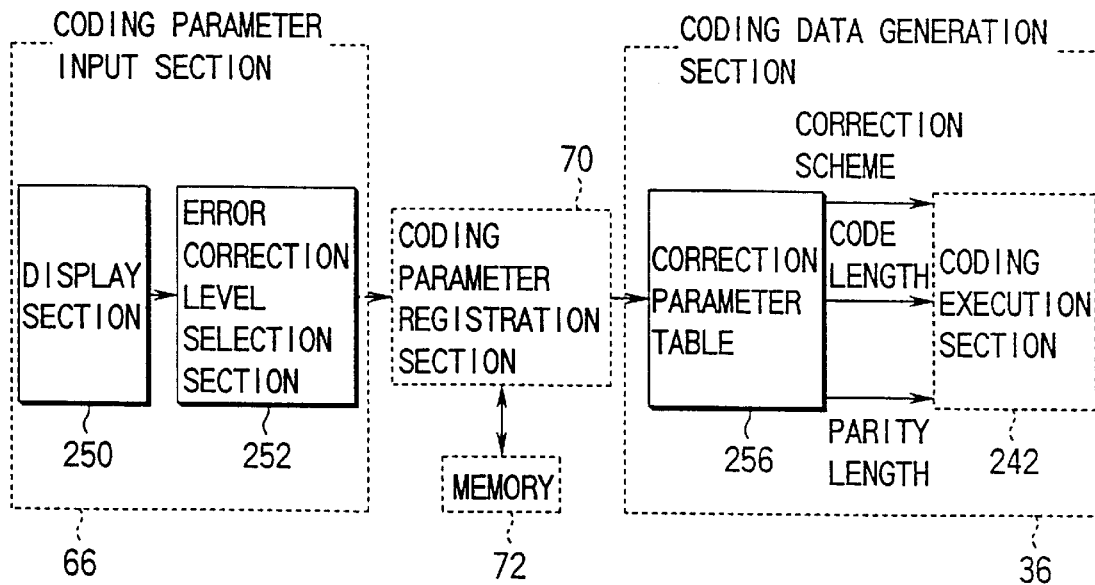
FIG. 65 is a block diagram for explaining the structures of a coding parameter input section and a coding data generation section for setting an error correction condition.
Figure 66:
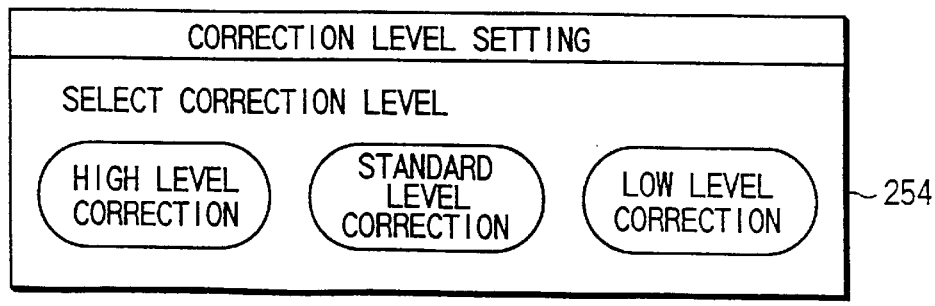
FIG. 66 is a view showing a correction level setting window.

The error correction condition setting section 248 can be constituted as an error correction level selection section 252, as shown in FIG. 65. The error correction level selection section 252 can cause the display section 250 to display a correction level setting window 254 as shown in FIG. 66 and select one of three correction levels by the mouse click operation. The selected correction level value is stored in the memory 72 by the coding parameter registration section 70. The coding data generation section 36 has a correction parameter table 256 storing correction schema, code lengths, and parity lengths in correspondence with the three correction levels. When the coding parameter registration section 70 reads out the correction level value from the memory 72 and inputs the correction level to the correction parameter table 256, the correction parameter table 256 notifies the coding execution section 242 of a correction scheme, a code length, and a parity length, which correspond to the correction level value.

Figure 67:
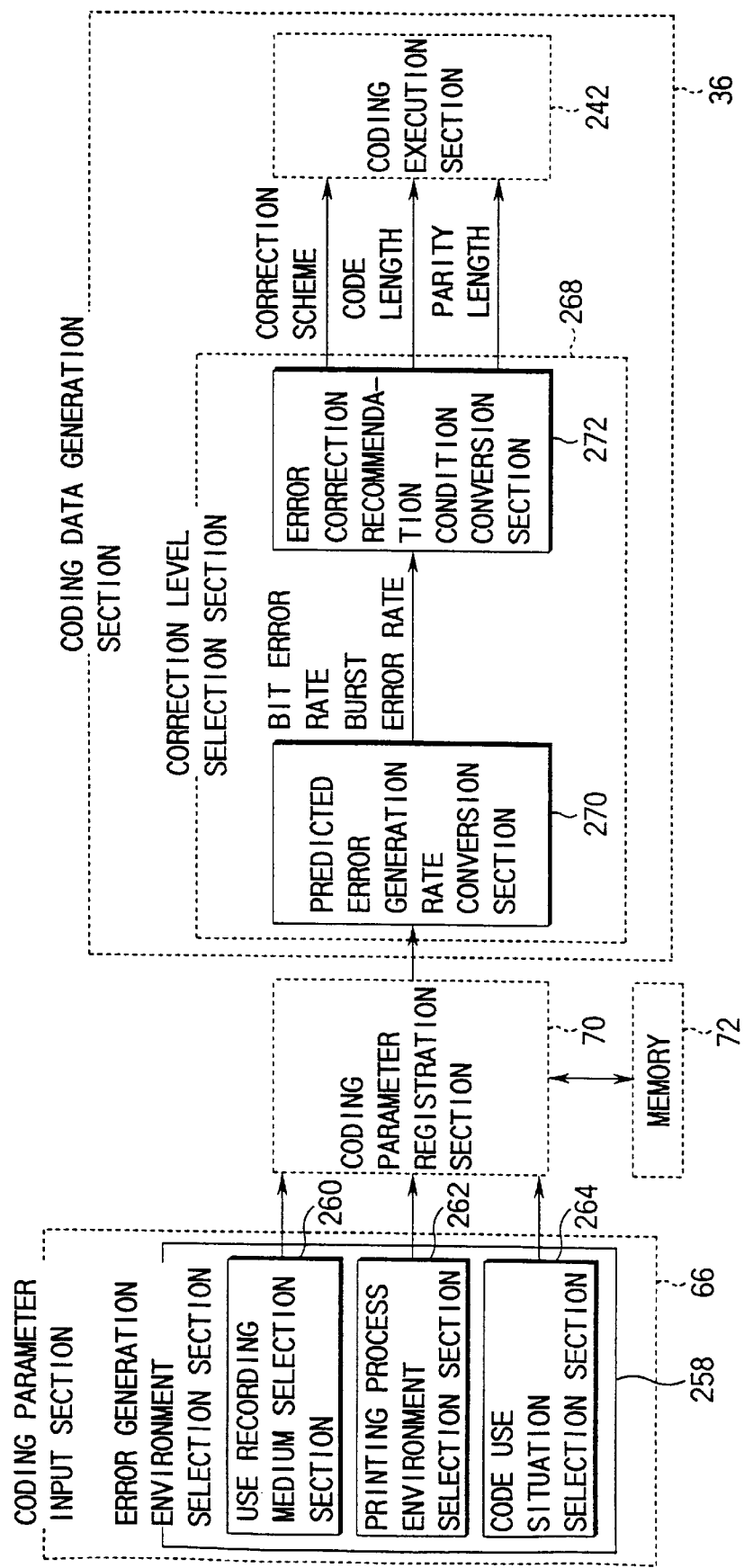
FIG. 67 is a block diagram for explaining another structure of each of the coding parameter input section and the coding data generation section for setting an error correction condition.

The error correction condition setting section 248 can also include an error generation environment selection section 258, as shown in FIG. 67. The error generation environment selection section 258 comprises a use recording medium selection section 260, a printing process environment selection section 262, and a code use situation selection section 264. The error generation environment selection section 258 can cause the display section 250 to display a correction level setting window 266 as shown in FIG. 68 and select one of four use environments by the mouse click operation. A value representing a selected use environment is stored in the memory 72 by the coding parameter registration section 70. The use recording medium selection section 260 selects a paper sheet on which a code image is to be printed/recorded. The printing process environment selection section 262 selects a print shop and a printing press, or a maker and a printer. The code use situation selection section 264 selects the application purpose of the code image printed/recorded on the paper sheet.

The coding data generation section 36 has a correction level selection section 268. The correction level selection section 268 is constituted by a predicted error generation rate conversion section 270 and an error correction recommendation condition conversion section 272. The predicted error generation rate conversion section 270 predicts the rate of generated errors from a combination of the selection values for the use environment, which are read out from the memory 72 by the coding parameter registration section 70 and supplied, on the basis of foresight information. The predicted error generation rate conversion section 270 calculates a bit error rate and a burst error rate on the basis of the prediction and supplies the calculated error rates to the error correction recommendation condition conversion section 272. The error correction recommendation condition conversion section 272 calculates a preferable correction level corresponding to the error rates, converts the correction level into parameters necessary for actual execution of error correction, i.e., a correction scheme, a code length, and a parity length, and notifies the coding execution section 242 of them. Error rates supplied to the error correction recommendation condition conversion section 272 are not limited to the bit error rate and the burst error rate. An error generation pattern and an error rate in the pattern may also be used.

The error correction condition setting section 248 may further include an interleave setting range selection section 274, as shown in FIG. 69. Interleaving means data shuffling for mainly coping with a burst error.

Figure 70:
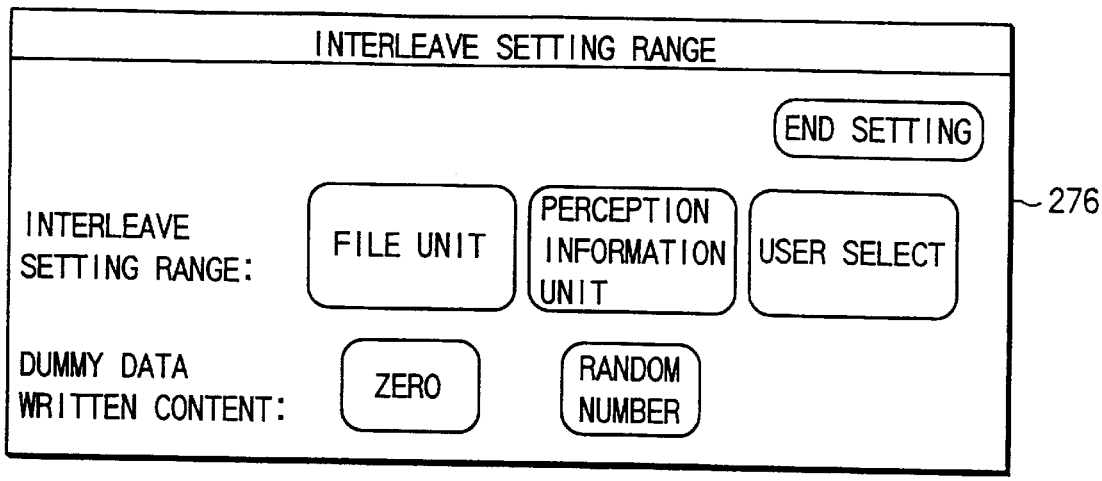
FIG. 70 is a view showing an interleave setting range window.

The interleave setting range selection section 274 can cause the display section 250 to display an interleave setting range window 276 as shown in FIG. 70 and select an interleave setting range and contents written in dummy data by the mouse click operation. Selected values are stored in the memory 72 by the coding parameter registration section 70, and read out from the memory 72 by the coding parameter registration section 70. The coding execution section 242 is notified of interleave length information corresponding to the selected values as a coding parameter.

Figure 71:
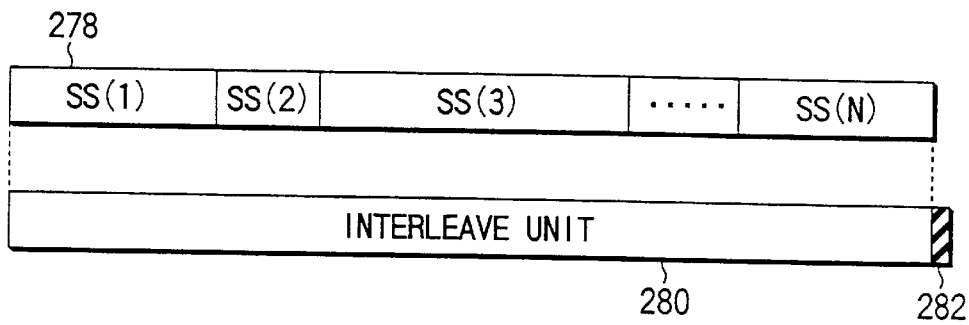
FIG. 71 is a view showing the relationship in data structure between a linked file and an interleave setting range for which a file is set.

The interleave setting range on the interleave setting range window 276 can be selected from three values, i.e., a file unit, a perception information unit, and arbitrary user selection. As the contents written in dummy data, zero or a random number can be selected. FIG. 71 is a view showing the relationship in the logical data structure between a linked file 278 and an interleave setting range (interleave unit) 280 for which the file unit is set. The linked file 278 is constituted by linking perception information units, as described above, and the entire file unit is set as the interleave unit 280. In this case, the total data size of the linked file 278 changes depending on information. That is, the total data size is not fixed. Since the interleave unit 280 must be set as a range corresponding to the multiple of a predetermined discrete value, a fractional portion is generated, as indicated by a hatched portion in FIG. 71. Therefore, dummy data 282 must be inserted to this portion. As the contents of this dummy data 282, zero or a random number is set.

Figure 72:
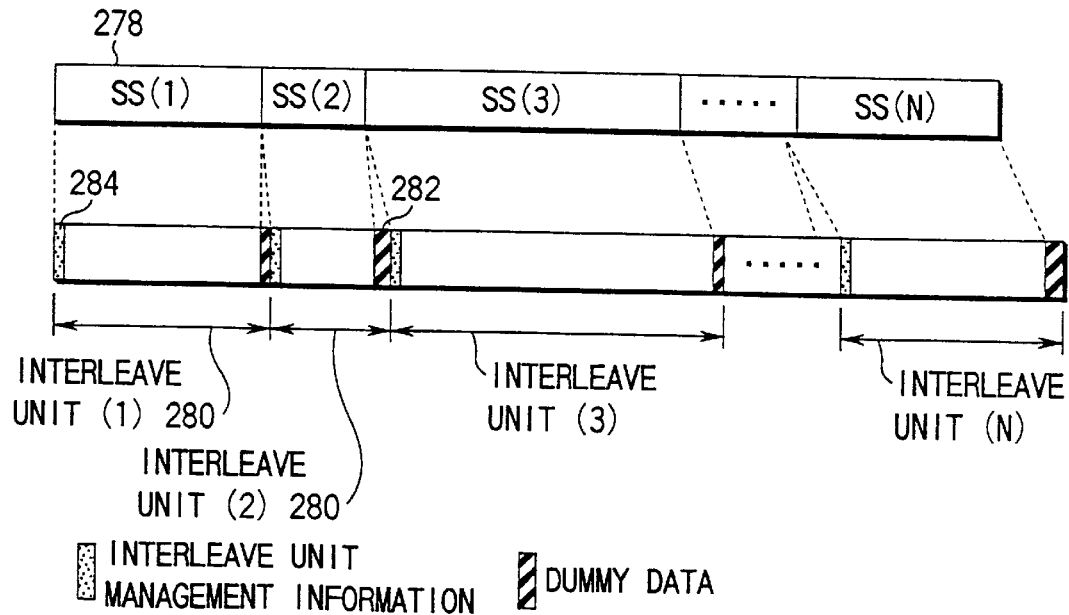
FIG. 72 is a view showing the relationship in data structure between a linked file and the interleave setting range for which a perception information unit is set.

Similarly, when the perception information unit is set as the interleave setting range, as shown in FIG. 72, the dummy data 282 must be inserted in correspondence with each perception information unit because the variable perception information unit is set as the interleave unit. In FIG. 72, reference numeral 284 denotes interleave unit management information corresponding to the header of each interleave unit 280. The interleave unit management information 284 represents the interleaved range.

Figure 73:
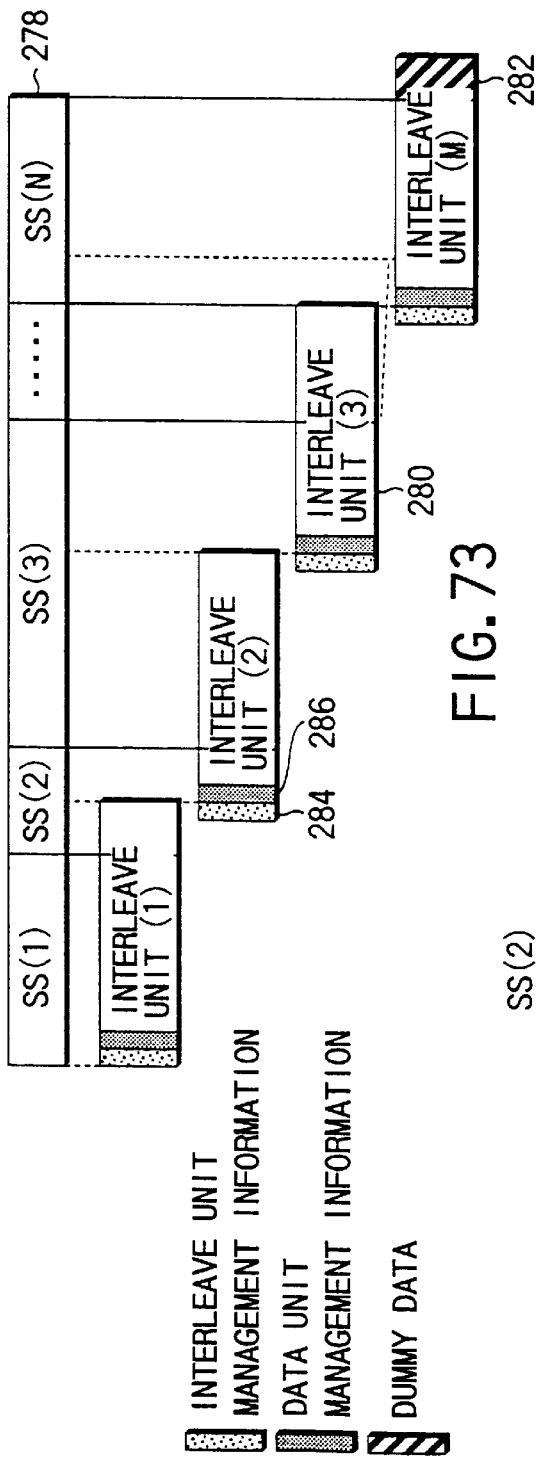
FIG. 73 is a view showing the relationship in data structure between the linked file and the interleave setting range which is fixed and set to a size desired by the user.

FIG. 73 is a view showing a state in which the interleave unit is fixed and set, as the interleave setting range, to a size desired by the user. The dummy data 282 is arranged next to a last interleave unit (M).

The user arbitrarily sets the interleave unit mainly due to the following two reasons. First, since interleave processing is performed to cope with a burst error, the interleave unit must be defined not depending on the perception information unit but in accordance with the error generation environment of a printing medium or a printing state. Accordingly, the degree of interleaving, i.e., the size of the interleave unit must be intentionally set. Second, since the interleave unit corresponds to a deinterleave unit which must be processed at once on the reproduction device side, the interleave unit cannot have a size larger than the memory capacity of the reproduction device. Therefore, when the memory capacity of the reproduction device can be specified, the interleave unit is efficiently set to have a size smaller than the memory capacity and as close to the memory capacity as possible.

Figure 74:
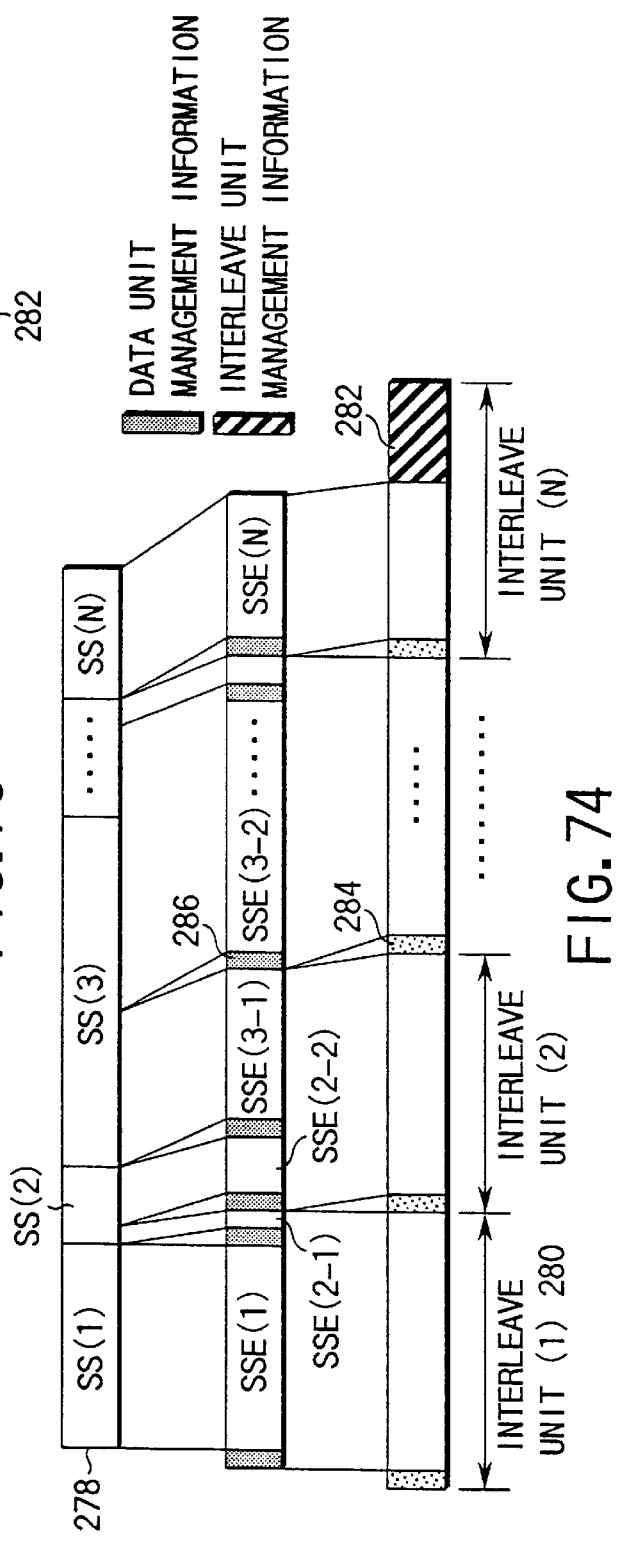
FIG. 74 is a view showing the relationship in data structure between the linked file and the interleave setting range for which a user-selected interleave setting range is set.

When the linked file 278 is to be divided into the user-selected interleave units, each perception information unit is divided. For this reason, the linking relationship between the divide data is described as data unit management information 286, as shown in FIG. 74, together with the interleave unit management information 284 as the header of each interleave unit 280.

If the amount of the dummy data 282 is known in advance, the dummy data 282 need not be inserted at the end and may be distributed to the respective interleave units, as a matter of course.

Figure 75:
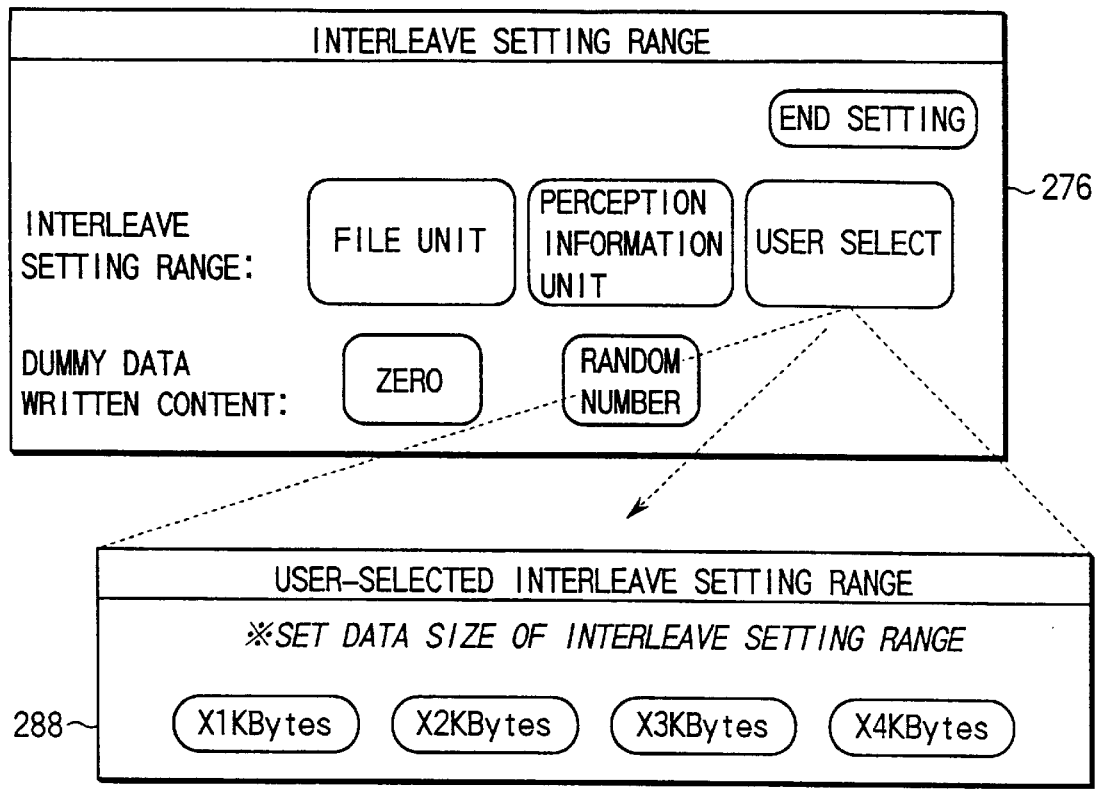
FIG. 75 is a view showing a user-selected interleave setting range setting window.

FIG. 75 is a view showing a user-selected interleave range setting range setting window 288 displayed when a "user select" button on the interleave setting range window 276 in FIG. 70 is clicked. On this window 288, the size can selected from four numbers of bytes, i.e., X1 kbytes, X2 kbytes, X3 kbytes, and X4 kbytes.

Figure 76:
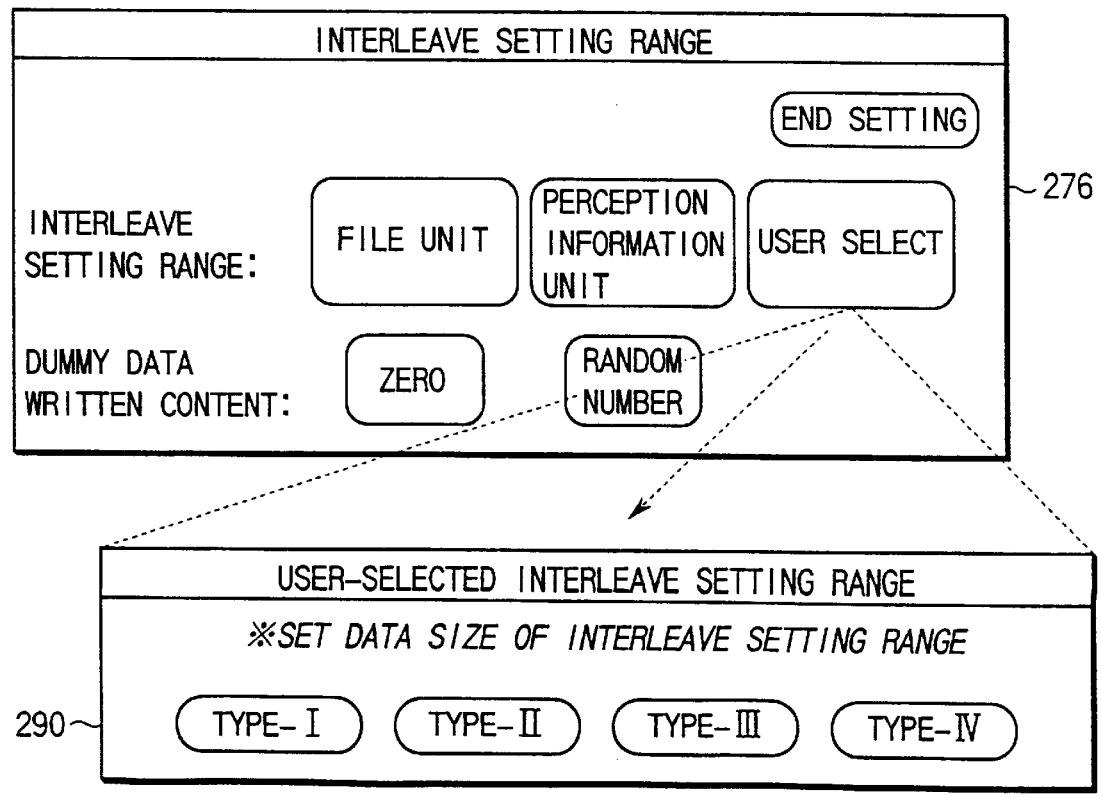
FIG. 76 is a view showing another example of the user-selected interleave setting range setting window.

FIG. 76 shows a user-selected interleave setting range selection window 290 as another example displayed when the "user select" button on the interleave setting range window 276. On this window 290, the scanner type, i.e., the type of a reproduction device is made to correspond to the maximum available interleave unit data size, and one of scanner types 1 to 4 is selected. The data size is set in correspondence with the memory capacity of the reproduction device, as described above for the second reason.

A precode image data generation section 40 will be described below.

Figure 77:
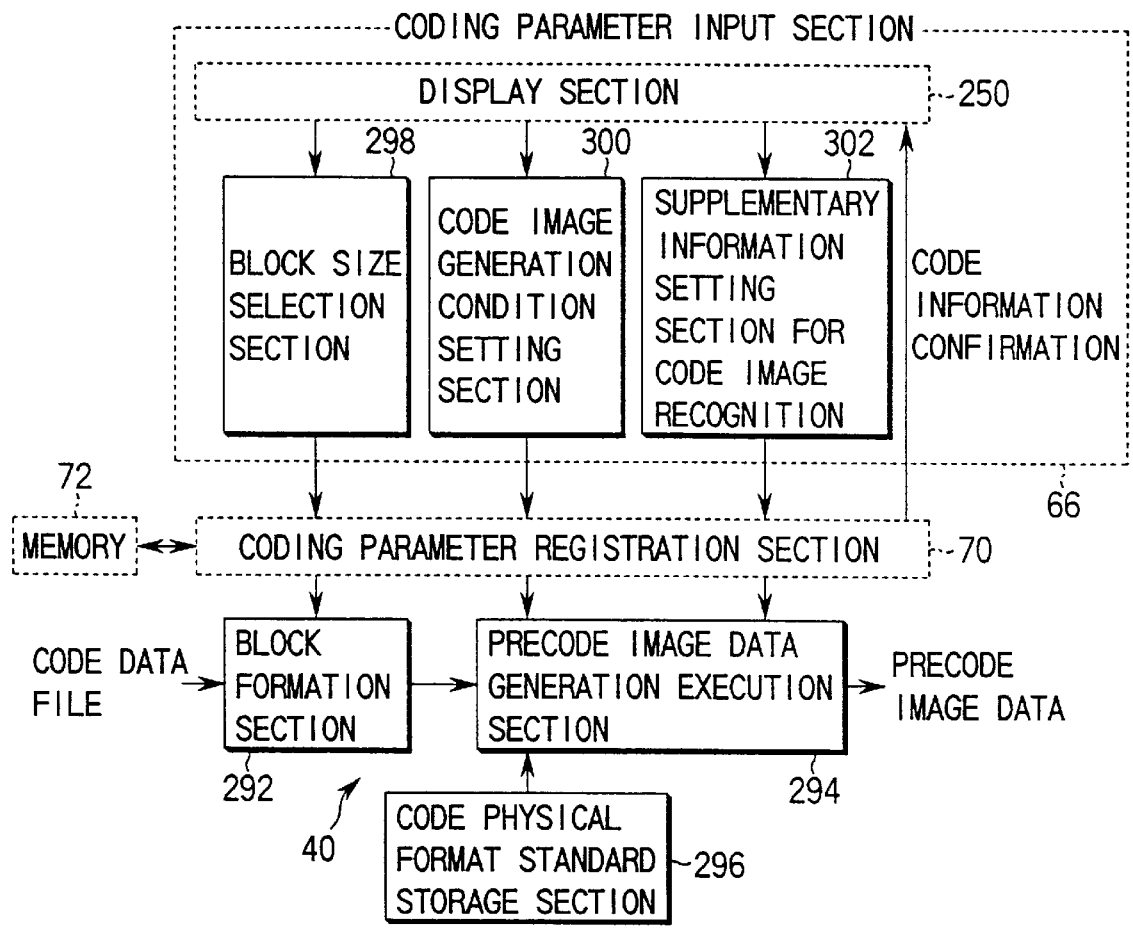
FIG. 77 is a block diagram for explaining the arrangement of a precode image data generation section.

FIG. 77 is a block diagram showing the arrangement of the precode image data generation section 40. The precode image data generation section 40 comprises a block formation section 292, a precode image data generation execution section 294, and a code physical format standard storage section 296.

A code data file is input from the coding data generation section 36 to the block formation section 292 through a switching section "2" 38. The block formation section 292 receives a block size as a coding parameter from the coding parameter registration section 70 in the user setting section 24 and divides the input code data file into block information units in accordance with a logical data size represented by the block size. The block size means the size of one block of a dot code, which is selected by the user through a block size selection section 298 arranged in a coding parameter input section 66 in the user setting section 24. The selected block size is registered in the memory 72 by the coding parameter registration section 70. The block size registered in the memory 72 is read out by the coding parameter registration section 70 and supplied to the block formation section 292.

On the basis of the block information unit from the block formation section 292, the precode image data generation execution section 294 generates precode image data in accordance with a code image generation condition and supplementary information for code image recognition, which are supplied from the coding parameter registration section 70 as coding parameters, and code physical format standard information supplied from the code physical format standard storage section 296. The code image generation condition and the supplementary information for code image recognition are selected by the user through a code image generation condition setting section 300 and a supplementary information for code image recognition setting section 302 arranged in the coding parameter input section 66. These set values are temporarily stored in the memory 72 by the coding parameter registration section 70, read out, and supplied to the precode image data generation execution section 294.

The code information including the coding parameters stored in the memory 72 is displayed on the display section 250 by the coding parameter registration section 70, so that the user can confirm the information.

FIG. 78 is a view showing a code image generation condition setting window 304 displayed on the display section 250 by the block size selection section 298 and the code image generation condition setting section 300.

For the image format, the output image format of the code image data is selected. For the block size, the size of one block of the dot code is set.

For the print resolution, the resolution of a printing press or a printer to be used is set. As shown in FIG. 79, in setting the print resolution, the inverted solid triangle in the left box may be clicked with the mouse to display the pull-down menu of some predetermined print resolutions such that one of the print resolutions can be selected. Alternatively, a numerical value may be directly input in the right box from the keyboard to set the print resolution.

Figure 80:
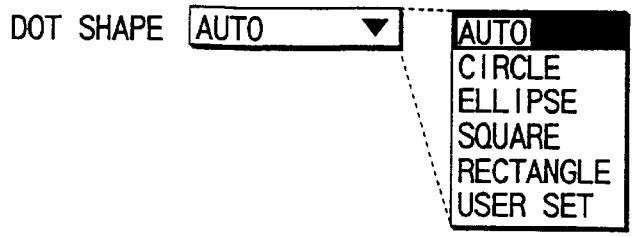
FIG. 80 is a view showing a dot shape setting window in the precode image generation condition setting window.

The dot shape means the shape of a data dot in a block user data area 54 of the block of the dot code. In setting the dot shape as well, the pull-down menu of some dot shapes can be displayed to select the dot shape, as shown in FIG. 80. In "user select" in the pull-down menu of dot shapes, a bitmap image the user has prepared in advance using a font editor or the like is selected.

The dot pitch means the interval between data dots and is set as the number of pixels corresponding to the minimum print resolution. The actual size in the setting is automatically calculated and simultaneously displayed on the right side. For example, "6" pixels are set, "63 $\mu$m" is displayed. As for the actual dot pitch setting method, the up or down arrow is clicked to increase or decrease the number of pixels one by one. Therefore, the dot pitch is set by clicking the up or down arrow until the desired value is obtained.

The dot size means the size of a data dot and can be individually set for the row and column directions.

Figure 81:
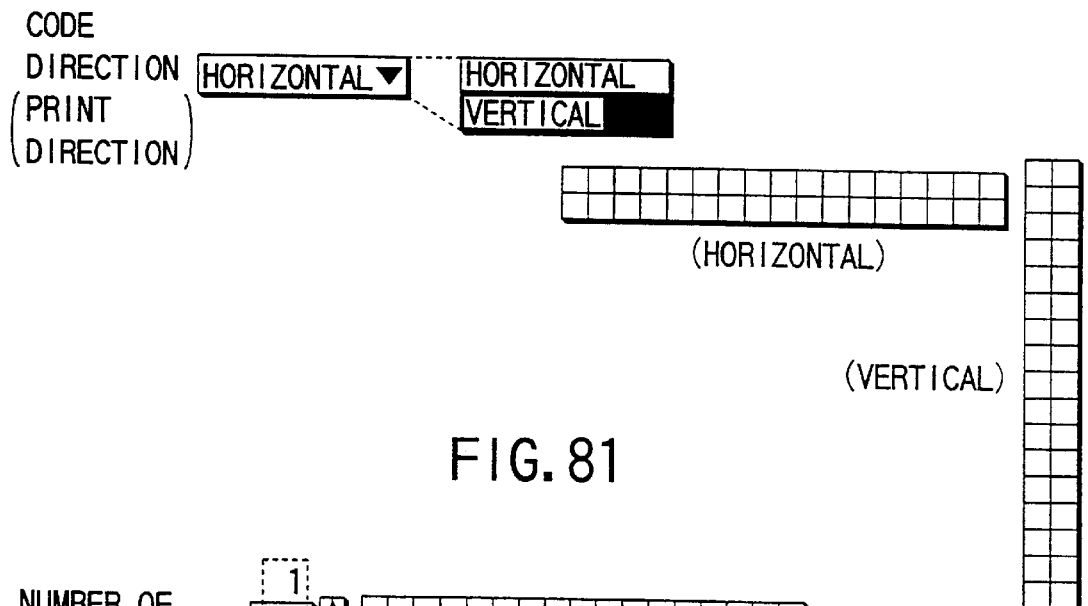
FIG. 81 is a view showing a code direction setting window in the precode image generation condition setting window.

The code direction means the code print direction. As shown in FIG. 81, a horizontal direction or a vertical direction can be selected.

Figure 82:
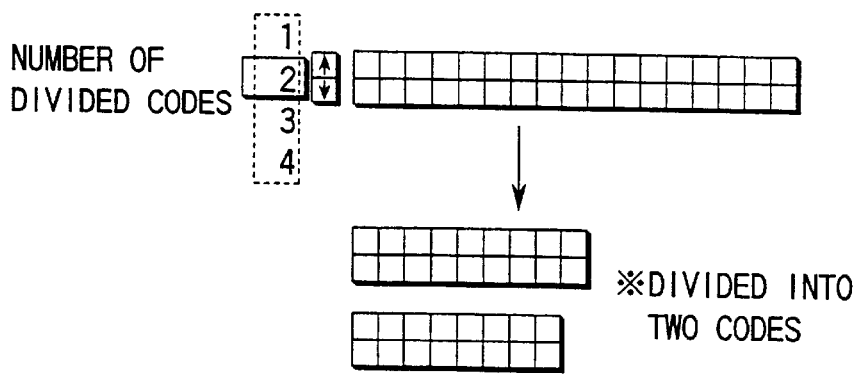
FIG. 82 is a view showing a code division count setting window in the precode image generation condition setting window.

For the number of divided codes, the number of divided and printed codes is selected, as shown in FIG. 82.

Figure 83:
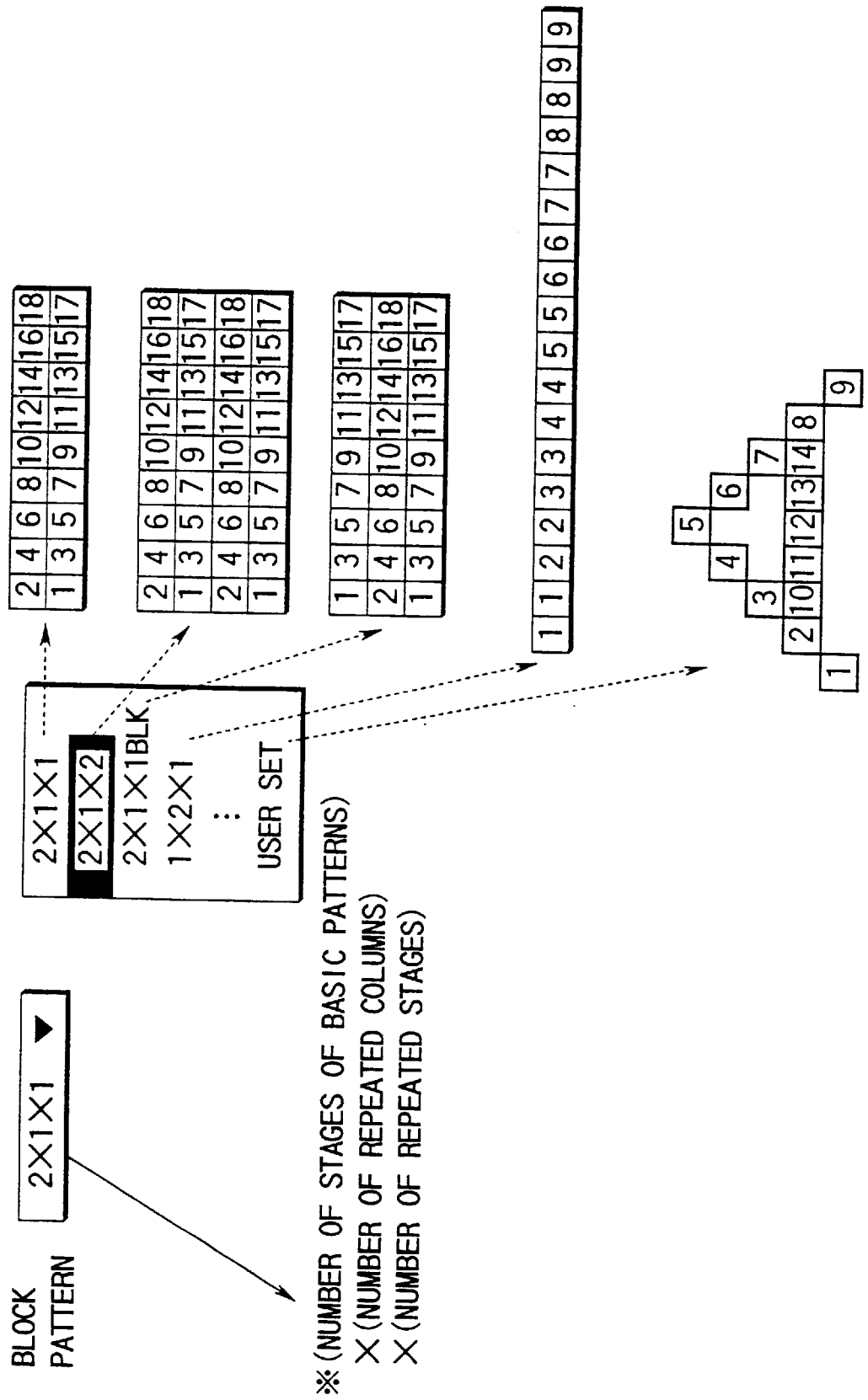
FIG. 83 is a view showing a block pattern setting window in the precode image generation condition setting window.

For the block pattern, (the number of stages of basic patterns)×(the number of repeated columns)×(the number of repeated stages) is set, as shown in FIG. 83. A number in each square on the right side of FIG. 83 represents a block address.

Figure 84:
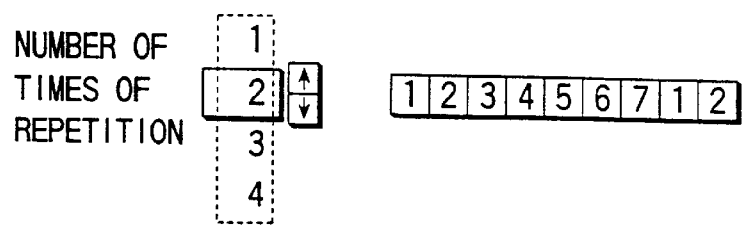
FIG. 84 is a view showing a block repetition count setting window in the precode image generation condition setting window.

For the number of times of repetition, the number of times of repetition of a block in the horizontal direction is set, as shown in FIG. 84. A number in each square on the right side of FIG. 84 represents a block address. When the number of times of repetition is set at 2, first two blocks 1 and 2 are repeated at the end.

For the issuer code, the name or ID number of the code issuer is input from the keyboard or the like.

Figures 85, 86:
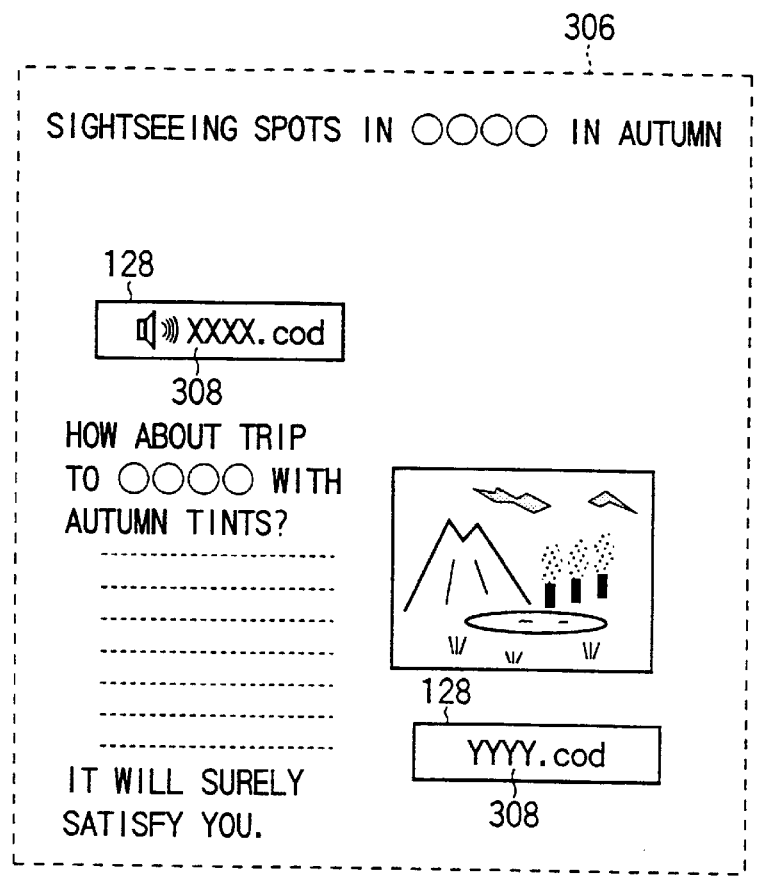
FIG. 85 is a view showing a layout page so as to explain supplementary information for code image recognition.
FIG. 86 is a view showing a code information confirmation display window.

When such various conditions are set, and a "set" button is clicked, a precode image is generated. For example, a precode image 128 is pasted on a layout window 306 as shown in FIG. 85 and displayed on the display section 46. A supplementary information 308 for code recognition set by the supplementary information for code image recognition setting section 302 is written in the precode image 128. When the supplementary information for code recognition is not set by the user, the name of the prepared code is automatically written.

When the precode image 128 is, e.g., double-clicked and selected on the layout window 306, a code information confirmation display window 310 as shown in FIG. 86 is displayed. When a "condition change" button on the code information confirmation display window 310 is clicked, the code image generation condition setting window 304 can be displayed again.

Figure 87:
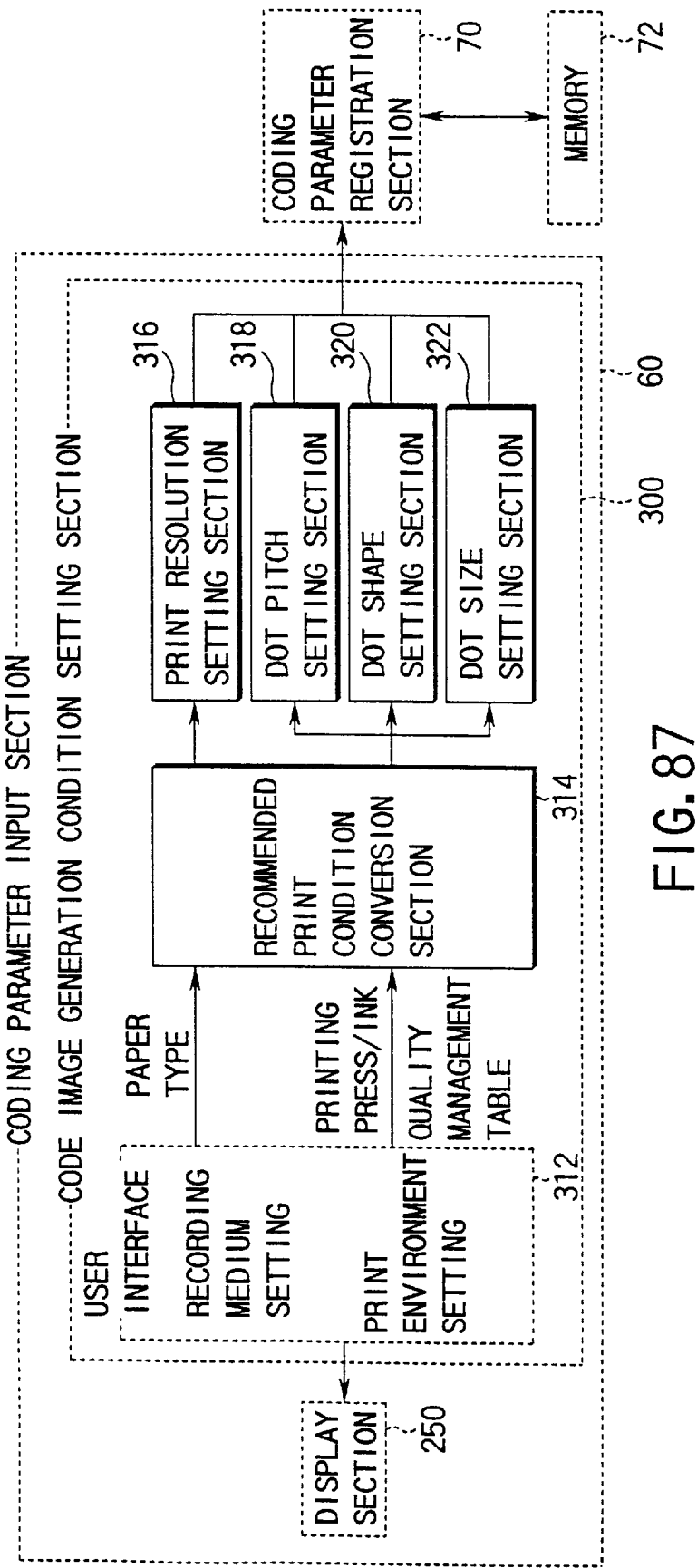
FIG. 87 is a block diagram showing another arrangement of the code image generation condition setting section.

The code image generation condition setting section 300 may also have a structure shown in FIG. 87.

A user interface 312 is caused to set the recording medium and a printing environment, and a recommended print condition conversion section 314 determines recommended print conditions for the set type of paper, printing press/ink, and quality management level. In accordance with the print conditions, a print resolution setting section 316 sets the print resolution, a dot pitch setting section 318 sets the dot pitch, a dot shape setting section 320 sets the dot shape, and a dot size setting section 322 sets the dot size. The set values are registered in the memory 72 by the coding parameter registration section 70.

A code image data generation section 42 will be described below.

Figure 88:
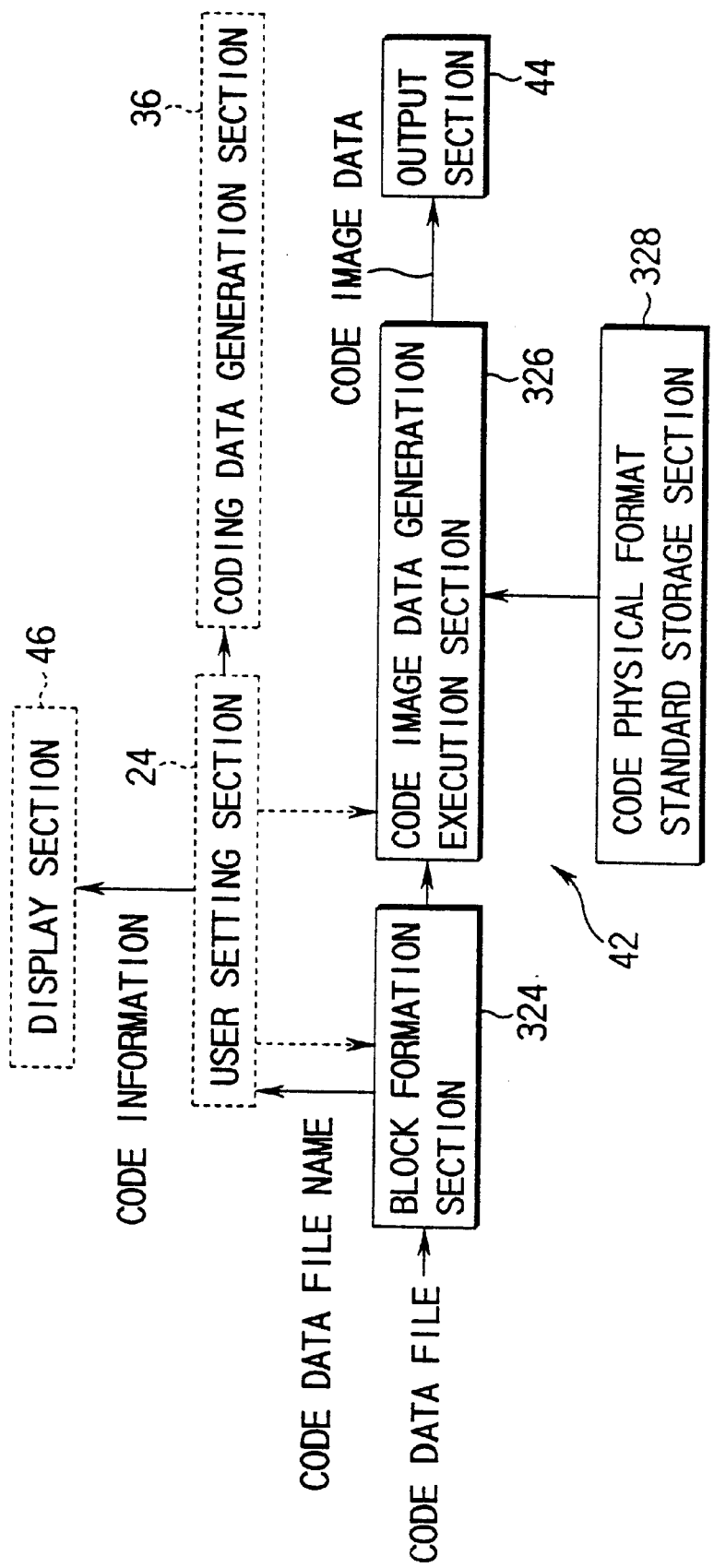
FIG. 88 is a block diagram showing the arrangement of a code image generation section.

FIG. 88 is a block diagram showing the structure of the code image data generation section 42. The code image data generation section 42 comprises a block formation section 324, a code image data generation execution section 326, and a code physical format standard storage section 328 (the code physical format standard storage section 296 may also serve as the code physical format standard storage section 328).

The code data file is input from the coding data generation section 36 to the block formation section 324 through the switching section "2" 38. The block formation section 324 is notified of the block size as a coding parameter for preceding, which is read out from the memory 72 in the user setting section 24, and divides the input code data file into block information units in accordance with the logical data size represented by the block size.

On the basis of the block information unit from the block formation section 324, the code image data generation execution section 326 generates actual code image data in accordance with the code image generation condition and the supplementary information for code image recognition as coding parameters for preceding, which are notified from the user setting section 24, and the code physical format standard information supplied from the code physical format standard storage section 328, and outputs the code image data to an output section 44.

The user setting section 24 is notified, by the block formation section 324, of the file name of the input code data file and displays code information corresponding to the code data file name on the display section 46, thereby causing the user to perform final check of the code data before actual code image data generation.

In generation of the precode, various coding parameters are stored in the memory 72 in units of code data files. For this reason, when the user setting section 24 searches the memory 72 for parameters on the basis of the code data file name supplied from the block formation section 324, and the block formation section 324 and the code image data generation execution section 326 are automatically notified of the corresponding coding parameters, code image data can be automatically generated at once by the above-described batch processing.

Figure 89:
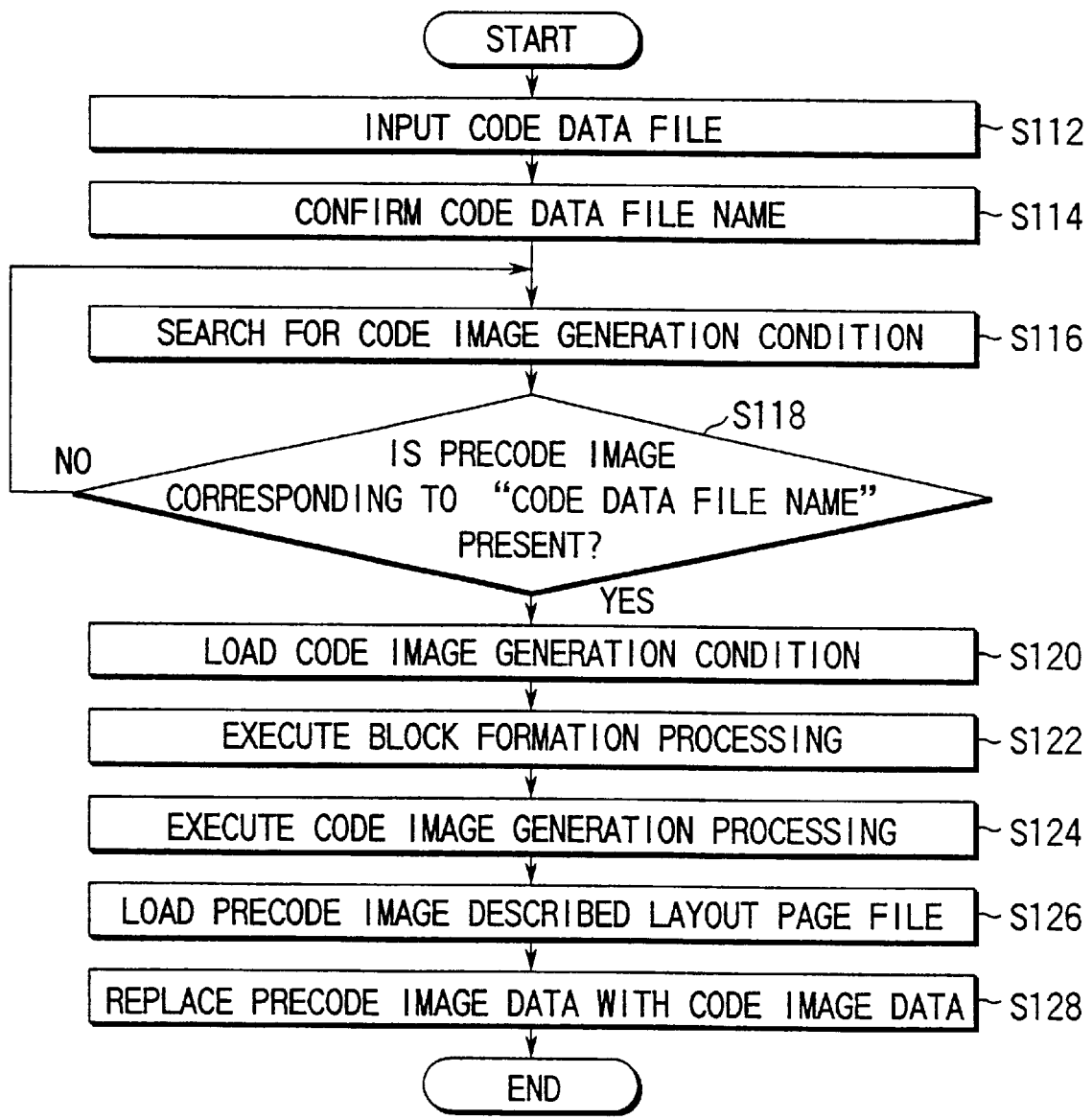
FIG. 89 is a basic flow chart of code image data generation processing.

More specifically, as shown in the flow chart of FIG. 89, a code data file is input (step S112), and the file name is confirmed (step S114). Code image generation conditions corresponding to the input code data file name are searched for (step S116). If a precode image corresponding to the input code data file is present (step S118), the code image generation conditions are loaded (step S120), supplied to the block formation section 324, and block formation processing is executed (step S122). In addition, the code image data generation execution section 326 is notified of the loaded precode image generation conditions and executes code image data generation processing (step S124). A precode image described layout page file is loaded (step S126), and the precode image is replaced with the actually generated code image data (step S128).

When the image data is replace with the precode image, and the precode image displayed on the display section 46 is also replaced with the code image, the user cannot grasp the contents. To prevent this, the precode image is displayed in a color on the display section 46. With this processing, the user can easily identify the code image data. The actually generated code image data is output to the output section 44, as a matter of course.

As has been described above on the basis of embodiments, according to the present invention, a code image data output apparatus and method for optically converting so-called multimedia information into optically readable code pattern image data, which enable quick and easy confirmation and adjustment of the size of code data and also allow a user to record desired or permitted information in a desired or permitted code size.

The present invention has been described above on the basis of embodiments. However, the present invention is not limited to the above-described embodiments, and various changes and modifications can be made within the spirit and scope of the present invention. The gist of the present invention will be summarized below.

(1) A code image data output apparatus which outputs code image data corresponding to multimedia information including at least one of voice information and image information to a recording device for recording the multimedia information on a recording medium as an optically readable code image, comprising:

input means (18) for inputting the multimedia information;

compression coding means (20) for compression-coding data corresponding to the multimedia information input by the input means (18); and code conversion means (22) for converting the data compression-coded by the compression coding means (20)

into code data, converting the code data into optically readable code image data according to a predetermined recording format, and outputting the code image data, characterized in that the compression coding means (20) includes data amount calculation means (32) for calculating, in advance before the code image is recorded, a data amount of the compression-coded data corresponding to the multimedia information input by the input means (18), and the code conversion means (22) includes precode generation means (40) for generating precode image data determined on the basis of the data amount calculated by the data amount calculation means (32) and outputting the precode image data before the code image is recorded.

Generally, in recording the code image, a desired balance structure is obtained for the positional relationship with other images simultaneously recorded on the same medium or the sizes of the images, and the code image size must be repeatedly confirmed until the structure is defined.

According to the present invention, the data amount after compression coding can be calculated by the data amount calculation means without executing compression coding processing before the code image is recorded, and the precode image data can be generated by the precode generation means without executing code conversion processing of generating the code image data before the code image is recorded. With this arrangement, the code image operator can immediately know the recorded state of the code image actually recorded on the medium.

Therefore, in the code image data output apparatus of the present invention, the code image size can be confirmed in a short time. In addition, code image generation at a high operation efficiency and edit processing for page layout with code images can be performed.

(2) The code image data output apparatus according to (1), characterized by further comprising data amount adjustment means (130, 132) for coarsely adjusting the amount of the data corresponding to the input multimedia information such that a precode image (128) based on the precode image data generated by the precode generation means (40) is recorded within a code image recording area (138) which is designated on the recording medium in advance.

To meet the basic requirement for recording the prepared code image in the recording area desired by the code operator, the code image size can be easily and effectively adjusted by the recorded data coarse adjustment function of the data amount adjustment means.

(3) The code image data output apparatus according to (2), characterized in that the data amount adjustment means (130, 132) includes data amount fine adjustment means (168, 170) for further finely adjusting the coarsely adjusted data amount.

The coarsely adjusted code image size can be adjusted in accordance with the desired recording area by the data amount fine adjustment function of the data amount fine adjustment means. For this reason, the code image size can be properly adjusted to the size satisfied or desired by the code operator.

(4) The code image data output apparatus according to (3), characterized in that after the data amount fine adjustment means (168, 170) finely adjusts the data amount, the compression coding means (20) compression-codes the data.

When compression coding is executed after data amount fine adjustment, data amount fine adjustment can be performed independently of the compression coding scheme. Therefore, the independence of the function can be increased.

A voice signal or an image signal as information and data obtained by compression-coding the voice signal or the image signal are generally constituted by a map in which the signal and the compressed data are made to correspond to each other in units of coding units defined according to the coding scheme. When the data amount is adjusted after compression coding, the data amount can be finely adjusted only in units of coding units defined by the coding scheme, or the dependency between the coding units is damaged, and reproduced information is unnaturally perceived. That is, data amount fine adjustment after compression coding is largely restricted in terms of the fine adjustment range or reproduction quality of the compression-coded data. On the other hand, when data amount fine adjustment is to be performed before compression coding, fine adjustment can be performed without placing any restriction on the compression-coded data. Therefore, more flexible fine adjustment is enabled, and the compression-coding scheme to be performed thereafter can be relatively flexibly selected.

(5) The code image data output apparatus according to (3) or (4), characterized in that the data amount fine adjustment means (168, 170) finely adjusts the data amount coarsely adjusted by the data amount adjustment means (130, 132) such that the precode image (128) based on the precode image data generated by the precode generation means (40) is recorded within the code image recording area (138) which is designated on the recording medium in advance.

When it is confirmed that the precode image data corresponding to the coarsely adjusted data amount cannot be recorded within the designated area, another data amount adjustment means is provided. With this arrangement, completely satisfactory data amount adjustment corresponding to the designated area can be performed.

(6) The code image data output apparatus according to (5), characterized in that, when the input multimedia information is voice information, the data amount fine adjustment means (168, 170) inserts/deletes voice data to/from data corresponding to the coarsely adjusted voice information in units of divided frames each having a predetermined length.

A voice waveform is formed by repeating a basic waveform in which the similarity is almost maintained over a predetermined length. When the voice data is inserted/ deleted in units of the predetermined lengths, the data amount can be finely adjusted without changing the basic waveform, i.e., the tone of the voice information. When the predetermined length is defined as a basic structure unit which characterizes the voice waveform, the voice data can be effectively compression-coded. When the voice data is inserted/deleted in units of the predetermined lengths, the subsequent compression coding can be adaptively performed, and the influence on the voice data quality can be made smaller than that in a case wherein the voice data is inserted/deleted in units of lengths other than the predetermined length. Consequently, satisfactory reproduced voice information can be obtained even when voice data is deleted or inserted.

(7) The code image data output apparatus according to (5), characterized in that the data amount fine adjustment means (168, 170) includes means (168) for, when the input information is image information, optimizing a parameter associated with compression coding from the precode image based on the data amount which is calculated by the compression coding means (20) in advance for data corresponding to the coarsely adjusted video information.

When the parameter for compression-coding image information is optimized, the data can be finely adjusted to the desired data amount while minimizing the degradation in image quality.

(8) The code image data output apparatus according to (5), characterized in that a recording format of the optically readable code image data is constituted by two-dimensionally arraying a plurality of blocks each including at least a data dot pattern arranged in correspondence with the contents of the multimedia information and a marker (48) arranged to have a predetermined positional relationship with respect to the data dot pattern to determine a read reference position of the data dot pattern.

Since the marker which can be easily recognized in detecting the arrangement position of the data dot pattern is formed, easy block recognition and data dot pattern detection after block recognition can be realized. When the blocks each having the predetermined positional relationship with respect to the data dot pattern are two-dimensionally arrayed, the degree of freedom for block array can be ensured. In addition, in reading by two-dimensional image pickup means, the number of blocks which can be read at once can be set to be large. For this reason, a larger data amount can be efficiently read, i.e., read in a short time.

In such a block structure recording format, the recording capacity can be increased/decreased only in units of block units. For example, when data of only several bytes is recorded in a block in which 100 bytes can be recorded, the several bytes are deleted by data amount fine adjustment. With this processing, the recording area corresponding to one block can be deleted, so that finer layout adjustment can be performed.

(9) The code image data output apparatus according to (1), characterized by further comprising display means (46, 134) for simultaneously displaying a code image recording area (138) which is designated on the recording medium in advance, and a precode image (128) based on the precode image data generated by the precode generation means (40), thereby displaying the recorded state of the precode image in the code image recording area.

Since the precode image is displayed in comparison with the target code image recording area, the data amount excess/deficiency state can be visually grasped. Therefore, the precode image can be adjusted to the designated code image recording area by performing data amount adjustment processing a smaller number of times.

(10) The code image data output apparatus according to (9), characterized in that the display means (46, 134) displays the code image recording area (138) and the precode image (128) in an overlapping state such that the mismatching amount therebetween can be visually determined.

Since the precode image overlaps the target code image recording area, the data amount excess/deficiency state can be easily visually grasped. Therefore, the precode image can be adjusted to the designated code image recording area by performing data amount adjustment processing a smaller number of times.

(11) The code image data output apparatus according to (3), characterized by further comprising display means (174, 184, 186) for displaying information representing that a fine adjustment operation by the data amount fine adjustment means (168, 170) is enabled when the precode image based on the data amount coarsely adjusted by the data amount adjustment means (130, 132) reaches a predetermined matching ratio to the code image recording area (138).

Since it is displayed whether the precode image data which is being coarsely adjusted reaches a data size for allowing the fine adjustment operation, the timing for starting the fine adjustment operation can be properly recognized. In data amount adjustment for the code image data, coarse adjustment and fine adjustment can be combined without performing any cumbersome operation such that the capability of each adjustment processing is maximized. Therefore, the data amount can be effectively adjusted.

(12) The code image data output apparatus according to (11), characterized in that the display means (174, 184, 186) displays the information representing that the fine adjustment operation by the data amount fine adjustment means (168, 170) is enabled, together with a finely adjustable range.

When the finely adjustable range is displayed, the adjustment amount to be set in the fine adjustment operation can be properly and easily grasped. Since the fine adjustment amount can be appropriately set, the operation efficiency can be increased.

(13) The code image data output apparatus according to (1), characterized by further comprising reproduction means (56, 58) for decoding the code image data converted by the code conversion means (22) into the original multimedia information and outputting the multimedia information.

When the reproduction means for decoding the temporarily coded code image data into the original multimedia information and outputting the multimedia information is arranged, it can be confirmed whether the multimedia information as a coding target has been properly coded without any error. For this reason, an recording error due to erroneous coding processing can be checked without interposing a process of recording the data in the medium, and an increase in cost and a useless operation can be prevented.

(14) The code image data output apparatus according to (1), characterized in that the input means (18) includes output state edit means (46, 226, 230) for adding control information for setting at least one of an output position, an output timing, and an output period on a display window of the multimedia information which is obtained by optically reading the code image of the input multimedia information, which is recorded in the recording medium by the recording device, and decoding the code image into the original multimedia information.

When the output state edit means is arranged, the multimedia information can be output in a state desired by the code operator. When the output position, time, and period are appropriately controlled, a wider multimedia information expression capability can be realized.

(15) The code image data output apparatus according to (14), characterized in that the output state edit means (46, 226, 230) further comprises display means (46, 234) for movably arranging an icon corresponding to each of a plurality of pieces of multimedia information on a time axis representing at lest one of the output timing and output period in the display window, thereby setting the at lest one of output timing and output period for each multimedia information.

In realizing a wider multimedia information expression capability, output state edit processing on the time axis, which can hardly be visually recognized, can be visually performed. Therefore, the relationship in the output time and period between the multimedia information can be easily recognized and changed or corrected by a very simple operation.

(16) The code image data output apparatus according to (1), characterized in that the code conversion means (22) includes error correction condition setting means (66, 248) for setting an error correction condition in converting the data compression-coded by the compression coding means (20) into the code data.

The error correction condition setting means can set an appropriate correction condition for correcting a data error generated depending on the medium for recording the code and recording conditions. Therefore, in reproducing the code, the information can be stably and properly reconstructed independently of the medium and recording conditions.

(17) The code image data output apparatus according to (16), characterized in that the error correction condition setting means (66, 248) includes means (250, 252, 254) for alternatively selecting one of a plurality of error correction levels for the code data.

Since the appropriate correction condition for correcting the data error generated depending on the medium and the recording conditions can be set by alternative selection, the setting operation is simplified, and the operation efficiency can be increased.

(18) The code image data output apparatus according to (16), characterized in that the error correction condition setting means (66, 248) includes selection means (258) for selecting an error generation environment which is predicted for an error in code image reading, and conversion means (270) for predicting a rate of errors to be generated, on the basis of the selection means (258).

With the selection means for selecting the error generation environment and the conversion means for predicting the error rate, the data error correction capability can be set not by direct setting for which a relatively advanced knowledge about the dependent relationship between the data correction capability level and the correction condition is required but in accordance with a set item which can be easily predicted or grasped by the code operator.

(19) The code image data output apparatus according to (16), characterized in that the error correction condition setting means (66, 248) includes means (250, 274, 276) for alternatively selecting one of a plurality of code data interleave lengths.

Since the appropriate correction condition for correcting the data error depending on the recording medium and recording conditions, i.e., the interleave length can be set by alternative selection, the correction condition setting operation for a burst error is simplified, and the operation efficiency can be increased.

(20) The code image data output apparatus according to (1), characterized in that the code conversion means (22) includes management information setting means (70, 246) for adding, to the code data, various kinds of management information in converting the data compression-coded by the compression coding means (20) into the code data.

Since the management information setting means can set various kinds of management information in converting the data into the code data, i.e., recognition information for a predetermined data management unit intermediately generated in code data conversion and structuring information for structuring the recognition information in accordance with the standard format, data design in different code data conversion modes can be appropriately and flexibly performed in accordance with the recording medium and the application purpose.

(21) The code image data output apparatus according to (1), characterized in that the precode generation means (40) includes supplementary information setting means (302) for setting recognition information which is supplementarily displayed together with the precode image generated by itself.

The precode image and information contents corresponding to the precode image cannot be recognized or can hardly be recognized only from the precode image. However, with the supplementary information setting means, the precode operator can set supplementary information that can be easily recognized or associated to the precode image. Therefore, the precode image and the corresponding information contents can be easily associated with each other, and layout edit processing based on only the precode image on the recording medium can be comfortably performed without generating any error.

(22) The code image data output apparatus according to (1), characterized in that the code conversion means (22) includes code image generation condition setting means (300) for setting various generation conditions in converting the data compression-coded by the compression coding means (20) into the code image data.

The conditions associated with code image generation, including the recording resolution of the code image on the recording medium and the dot pattern shape, can be set by the code image generation condition setting means. The conditions can be set such that the code image quality on the medium, which changes depending on the medium, the recording device, and the operation condition of the recording device, approaches the desired quality. Consequently, the correction performance in reading the recorded code image and reconstructing the information can be improved. In addition, size adjustment for the code image is enabled without adjusting the data amount. Therefore, the code image can be adapted to the recording area desired by the code operator.

(23) The code image data output apparatus according to (22), characterized in that the code image generation condition setting means (300) sets the code image generation conditions on the basis of the precode image generated by the precode generation means (40) before the code image is recorded.

The code operator can easily confirm the actual recording size of the code image in a short time by setting the code image generation conditions and generating the precode image. The code operator can quickly grasp the error in the desired code image size with reference to the precode image and reflect it on the change in setting of the code image generation condition. Therefore, the processes until setting the proper code image generation conditions can be efficiently performed.

(24) The code image data output apparatus according to (22) or (23), characterized in that the code image data output apparatus is constituted such that when a plurality of code images are to be recorded, the plurality of code images can be recorded in the recording medium at once after the code image generation condition setting means (300) completes setting of various generation conditions for all the plurality of code images.

Utilizing the processes of setting the code image generation conditions and generating the precode image in a relatively short time, the code image generation conditions for generating a code image in a desired size can be easily determined in a short time. The process of generating an actual code image normally takes a relatively long time. When the plurality of code image is to be generated and output, operations until determination of the code image generation conditions, which require the code operator to ensure a time, are performed first, and thereafter, the code image generation operation which can be executed without the code operator is performed at once. With this processing, the operation efficiency can be increased.

(25) The code image data output apparatus according to (22), characterized in that the various generation conditions set by the code image generation condition setting means (300) are conditions associated with at least one of the recording medium and the recording device, and the code image generation condition setting means (300) includes means (312, 314) for obtaining a recommended recording condition on the basis of the conditions.

To optimize the code image output quality which changes depending on the conditions associated with the recording medium or the recording device, i.e., to minimize the read error of the code image, optimum code image generation conditions must be set. Even when the code operator does not have the knowledge about the dependent relationship between the conditions associated with the recording medium or the recording device and the code image output quality, the optimum code image generation conditions can be indirectly set by the means for obtaining the recommended recording condition using information that the code operator can easily know.

(26) The code image data output apparatus according to (7), characterized in that the parameter associated with compression coding is information representing a compression coding amount assigned to each predetermined divided area in the image.

When the compression-coding amount is optimally assigned to each predetermined divided area in the image, the compression coding amount for each predetermined divided area can be adjusted in the subsequent compression coding processing. Therefore, highly precise data amount fine adjustment can be performed, and additionally, the degradation in image quality due to compression can be minimized.

(27) A code image data output apparatus which outputs code image data corresponding to multimedia information including at least one of voice information and image information to a recording device for recording the multimedia information on a recording medium as an optically readable code image, comprising:

input means (18) for inputting the multimedia information;

compression coding means (20) for compression-coding data corresponding to the multimedia information input by the input means (18); and code conversion means (22) for converting the data compression-coded by the compression coding means (20) into code data, converting the code data into optically readable code image data according to a predetermined recording format, and outputting the code image data, characterized by further comprising:

switching means (30, 38) for performing switching between a precode image generation mode in which a data amount of the compression-coded data corresponding to the multimedia information input by the input means (18) is calculated in advance before the code image is recorded, and precode image data determined on the basis of the calculated data amount is generated and output, and a code image generation mode in which the data corresponding to the multimedia information input by the input means (18) is compression-coded, the compressed data is converted into the code data, the code data is converted into the optically readable code image data according to the predetermined recording format, and the code image data is output.

Generally, in recording the code image, a desired balance structure is obtained for the positional relationship with other images simultaneously recorded on the same medium or the sizes of the images, and the code image size must be repeatedly confirmed until the structure is defined. In the precode image generation mode, the precode image data can be generated without executing code conversion processing of generating the code image data before the code image is recorded. With this arrangement, the code image operator can immediately know the recorded state of the code image actually recorded on the medium, so that the operation of arranging/editing the code image on the page can be quickly and efficiently performed.

Code image generation processing can easily shift to the code image generation mode by switching the mode. The code image output result can be obtained by a very simple operation, and a convenient apparatus can be provided.

(28) A code image data output method of outputting code image data corresponding to multimedia information including at least one of voice information and image information to a recording device for recording the multimedia information on a recording medium as an optically readable code image, characterized by comprising the steps of:

calculating a data amount of compression-coded data corresponding to the input multimedia information in advance;

generating precode image data on the basis of the calculated data amount;

compression-coding the data corresponding to the multimedia information and converting the data into code data; and converting the code data into optically readable code image data according to a predetermined recording format and outputting the code image data.

The precode image on which the code image size necessary for the operation of arranging/editing the code image on the page is reflected can be obtained in advance without performing data compression coding processing which requires a relatively long processing time. For this reason, the code image operator can immediately know the recorded state of the code image actually recorded on the medium, so that the operation of arranging/editing the code image on the page can be quickly and efficiently performed.

In addition, since code image can be generated independently of the operation of arranging/editing the code image on the page, the code image can be output in the minimum and necessary time in the entire operation processes until the code image is output. Therefore, an operation method with a high time use efficiency can be provided.

(29) A code image data output apparatus which outputs code image data corresponding to multimedia information including at least one of voice information and image information to a recording device for recording the multimedia information on a recording medium as an optically readable code image, comprising:

input means (18) for inputting the multimedia information;

unit information generation means (28) for dividing the multimedia information input by the input means (18) into predetermined information units and generating at least one unit information;

compression coding means (20) for compression-coding unit data corresponding to the unit information in units of unit information generated by the unit information generation means (28); and code conversion means (22) for converting at least one unit data compression-coded by the compression coding means (20) into code data, converting the code data into optically readable code image data according to a predetermined recording format, and outputting the code image data, characterized in that the compression coding means (20) comprises data amount calculation means (32) for calculating, in advance before the code image is recorded, a data amount of the compression-coded unit data in units of unit information generated by the unit information generation means; and the code conversion means (22) comprises precode generation means (40) for generating precode image data determined on the basis of the amount of the at least one unit data, which is calculated by the data amount calculation means (32) before the code image is recorded, and outputting the precode image data.

Since compression-coding processing can be performed for each of the plurality of information units constituting the multimedia information, compression coding processing corresponding to the characteristics of each information unit can be applied. Not only the respective information units but also the multimedia information formed by linking the information units can be recorded at a high compression ratio and with a high quality.

With the data amount calculation means, the amount of the compression-coded data can be calculated without performing compression coding processing before the code image is recorded. With the precode generation means, the precode image data can be generated without performing code conversion processing of generating the code image data before the code image is recorded. For this reason, the code image operator can immediately know the recorded state of the code image actually recorded on the medium. Generally, in recording the code image, a desired balance structure is obtained for the positional relationship with other images simultaneously recorded on the same medium or the sizes of the images, and the code image size must be repeatedly confirmed until the structure is defined. In the code image data output apparatus of the present invention, the code image size can be confirmed in a short time. In addition, code image generation at a high operation efficiency and edit processing for page layout with code images can be performed.

(30) The code image data output apparatus according to (29), characterized by further comprising data amount adjustment means (130, 132) for coarsely adjusting the amount of the data corresponding to the input multimedia information in units of unit information such that a precode image (128) based on the precode image data generated by the precode generation means (40) is recorded within a code image recording area (138) which is designated on the recording medium in advance.

To meet the basic requirement for recording the prepared code image in the recording area desired by the code operator, the code image size can be adjusted by the recorded data coarse adjustment function of the data amount adjustment means in units of unit information. Since the code image size can be adjusted in consideration of the distribution of the coarse adjustment amount to the unit information, coarsely adjusted multimedia information that the code operator satisfies can be generated.

(31) The code image data output apparatus according to (30), characterized in that the data amount adjustment means (130, 132) includes data amount fine adjustment means (168, 170) for further finely adjusting the coarsely adjusted data amount in units of unit information.

The coarsely adjusted code image size can be adjusted in units of unit information by the data amount fine adjustment function of the data amount fine adjustment means. Since the code image size can be properly adjusted in consideration of the distribution of the fine adjustment amount to the unit information such that the code image can be recorded in the desired recording area, coarsely adjusted multimedia information that the code operator satisfies or desires can be generated.

(32) The code image data output apparatus according to (31), characterized in that after the data amount fine adjustment means (168, 170) finely adjusts the data amount in units of unit information, the compression coding means (20) compression-codes the unit data.

When compression coding is executed after data amount fine adjustment is performed for each information unit, data amount fine adjustment can be performed independently of the compression coding scheme. Therefore, the independence of the function of finely adjusting each data amount and the compression coding function can be increased, and a flexible data amount adjustment function for the multimedia information is realized.

A voice signal or an image signal as information and data obtained by compression-coding the voice signal or the image signal are generally constituted by a map in which the signal and the compressed data are made to correspond to each other in units of coding units defined according to the coding scheme. When the data amount is adjusted after compression coding, the data amount can be finely adjusted only in units of coding units defined by the coding scheme, or the dependency between the coding units is damaged, and reproduced information is unnaturally perceived. That is, data amount fine adjustment after compression coding is largely restricted in terms of the fine adjustment range or reproduction quality of the compression-coded data. On the other hand, when data amount fine adjustment is to be performed before compression coding, fine adjustment can be performed without placing any restriction on the compression-coded data. Therefore, more flexible fine adjustment is enabled, and the compression-coding scheme to be performed thereafter can be relatively flexibly selected.

(33) The code image data output apparatus according to (31) or (32), characterized in that the data amount fine adjustment means (168, 170) finely adjusts the data amount coarsely adjusted by the data amount adjustment means (130, 132) in units of unit information such that the precode image based on the precode image data (128) generated by the precode generation means (40) is recorded within the code image recording area (138) which is designated on the recording medium in advance.

When it is confirmed that the precode image data corresponding to the coarsely adjusted data amount cannot be recorded within the designated area, another data amount adjustment means is provided. With this arrangement, completely satisfactory data amount adjustment corresponding to the designated area can be performed.

In addition, since data amount adjustment can be performed in units of unit information constituting the multimedia information, the code image size can be adjusted in consideration of the distribution of the fine adjustment amount to the unit information such that the code image can be recorded in the desired recording area. Therefore, coarsely adjusted multimedia information that the code operator satisfies or desires can be generated.

(34) The code image data output apparatus according to (33), characterized in that, when the input multimedia information is voice information, the data amount fine adjustment means (168, 170) inserts/deletes voice data to/from data corresponding to the coarsely adjusted voice information in units of unit information and in units of frames each having a predetermined length and obtained by dividing the unit information.

A voice waveform is formed by repeating a basic waveform in which the similarity is almost maintained over a predetermined length. When the voice data is inserted/deleted in units of predetermined lengths, the data amount can be finely adjusted without changing the basic waveform, i.e., the tone of the voice information. When the predetermined length is defined as a basic structure unit that characterizes the voice waveform, the voice data can be effectively compression-coded. When the voice data is inserted/deleted in units of predetermined lengths, the subsequent compression coding can be adaptively performed, and the influence on the voice data quality can be made smaller than that in a case wherein the voice data is inserted/deleted in units of lengths other than the predetermined length. Consequently, satisfactory reproduced voice information can be obtained even when voice data is deleted or inserted.

Since the predetermined length can be set in units of unit information, the voice data can be inserted/deleted in accordance with the basic structure unit that characterizes each voice waveform. Therefore, deletion/insertion can be performed for each unit information while minimizing the degradation in voice quality.

(35) The code image data output apparatus according to (33), characterized in that the data amount fine adjustment means (168, 170) includes means (168) for, when the input information is image information, optimizing a parameter associated with compression coding in units of unit information from the precode image based on the unit data amount which is calculated by the compression coding means (20) in advance for unit data corresponding to the coarsely adjusted video information.

When the parameter for compression-coding image information is optimized, the data can be finely adjusted to the desired data amount while minimizing the degradation in image quality.

(36) The code image data output apparatus according to (33), characterized in that a recording format of the optically readable code image data is constituted by two-dimensionally arraying a plurality of blocks each including at least a data dot pattern arranged in correspondence with the contents of the multimedia information and a marker (48) arranged to have a predetermined positional relationship with respect to the data dot pattern to determine a read reference position of the data dot pattern.

Since the marker which can be easily recognized in detecting the arrangement position of the data dot pattern is formed, easy block recognition and data dot pattern detection after block recognition can be realized. When the blocks each having the predetermined positional relationship with respect to the data dot pattern are two-dimensionally arrayed, the degree of freedom for block array can be ensured. In addition, in reading by two-dimensional image pickup means, the number of blocks which can be read at once can be set to be large. For this reason, a larger data amount can be efficiently read, i.e., read in a short time.

In such a block structure recording format, the recording capacity can be increased/decreased only in units of block units. For example, when data of only several bytes is recorded in a block in which 100 bytes can be recorded, the several bytes are deleted by data amount fine adjustment. With this processing, the recording area corresponding to one block can be deleted, so that finer layout adjustment can be performed.

(37) The code image data output apparatus according to (29), characterized by further comprising display means (46, 134) for simultaneously displaying a code image recording area (138) which is designated on the recording medium in advance, and a precode image (128) based on the precode image data generated by the precode generation means (40), thereby displaying the recorded state of the precode image in the code image recording area.

Since the precode image is displayed in comparison with the target code image recording area, the data amount excess/deficiency state can be visually grasped. Therefore, the precode image can be adjusted to the designated code image recording area by performing data amount adjustment processing a smaller number of times.

(38) The code image data output apparatus according to (37), characterized in that the display means (46, 134) displays the code image recording area (138) and the precode image (128) in an overlapping state such that the mismatching amount therebetween can be visually determined.

Since the precode image overlaps the target code image recording area, the data amount excess/deficiency state can be easily visually grasped. Therefore, the precode image can be adjusted to the designated code image recording area by performing data amount adjustment processing a smaller number of times.

(39) The code image data output apparatus according to (31), characterized by further comprising display means (174, 184, 186) for displaying information representing that a fine adjustment operation by the data amount fine adjustment means (168, 170) is enabled when the precode image based on at least one unit data amount coarsely adjusted by the data amount adjustment means (130, 132) reaches a predetermined matching ratio to the code image recording area (138).

Since it is displayed whether the precode image data which is being coarsely adjusted reaches a data size for allowing the fine adjustment operation, the timing for starting the fine adjustment operation can be properly recognized. In data amount adjustment for the code image data, coarse adjustment and fine adjustment can be combined without performing any cumbersome operation such that the capability of each adjustment processing is maximized. Therefore, the data amount can be effectively adjusted.

(40) The code image data output apparatus according to (39), characterized in that the display means (174, 184, 186) displays the information representing that the fine adjustment operation by the data amount fine adjustment means (168, 170) is enabled, together with a finely adjustable range.

When the finely adjustable range is displayed, the adjustment amount to be set in the fine adjustment operation can be properly and easily grasped. Since the fine adjustment amount can be appropriately set, the operation efficiency can be increased.

(41) The code image data output apparatus according to (37), characterized in that when the display means (46, 134) simultaneously displays the code image recording area (138) and the precode image (128) to display the recorded state of the precode image in the code image recording area, and the precode image includes a plurality of pieces of unit information, the display means (46, 134) also displays the ratio of a data amount of each of the plurality of pieces of unit information to the precode image.

When the ratio of the data amount of each of the plurality of pieces of unit information to the precode image is simultaneously displayed, the code operator can easily determine the policy for adjustment amount assignment to the unit information in accordance with the allowance of the visual data amount adjustment range which changes depending on the ratio of unit information and the type of information before the data amount adjustment operation for recording the precode image in the code image recording area is started. Therefore, smooth data amount adjustment can be effectively performed.

(42) The code image data output apparatus according to (33), characterized in that the data amount adjustment means (168, 170) can set an assignment ratio for unit data amount fine adjustment for each unit information when the data amount is to be adjusted for each of the plurality of pieces of unit information.

Since the assignment ratio for unit data amount fine adjustment can be set for each unit information, the code operator can properly and flexibly easily determine and set the assignment ratio of the adjustment amount for each unit information in accordance with the allowance of the visual data amount adjustment range which changes depending on the ratio of unit information and the type of information before the data amount adjustment operation for recording the precode image in the code image recording area is started. Therefore, setting that the code operator satisfies can be made.

(43) The code image data output apparatus according to (29), characterized by further comprising reproduction means (56, 58) for decoding the code image data converted by the code conversion means (22) into the original multimedia information and outputting the multimedia information.

When the reproduction means for decoding the temporarily coded code image data into the original multimedia information and outputting the multimedia information is arranged, it can be confirmed whether the multimedia information as a coding target has been properly coded without any error. For this reason, a recording error due to erroneous coding processing can be checked without interposing a process of recording the data in the medium, and an increase in cost and a useless operation can be prevented.

(44) The code image data output apparatus according to (29), characterized in that the input means (18) includes output state edit means (46, 226, 230) for adding control information for setting at least one of an output position, an output timing, and an output period on a display window of the multimedia information which is obtained by optically reading the code image of the input multimedia information, which is recorded in the recording medium by the recording device, and decoding the code image into the original multimedia information.

When the output state edit means is arranged, the multimedia information can be output in a state desired by the code operator. When the output position, time, and period are appropriately controlled, a wider multimedia information expression capability can be realized.

(45) The code image data output apparatus according to (44), characterized in that the output state edit means (46, 226, 230) further comprises a display means (46, 234) for movably arranging an icon corresponding to each of a plurality of pieces of multimedia information on a time axis representing the at least one of output timing and output period in the display window, thereby setting the at least one of output timing and output period for each multimedia information.

In realizing a wider multimedia information expression capability, output state edit processing on the time axis, which can hardly be visually recognized, can be visually performed. Therefore, the relationship in the output time and period between the multimedia information can be easily recognized and changed or corrected by a very simple operation.

(46) The code image data output apparatus according to (29), characterized in that the code conversion means (22) includes error correction condition setting means (66, 248) for setting an error correction condition in converting the at least one unit data compression-coded by the compression coding means (20) into the code data.

The error correction condition setting means can set an appropriate correction condition for correcting a data error generated depending on the medium for recording the code and recording conditions. Therefore, in reproducing the code, the information can be stably and properly reconstructed independently of the medium and recording conditions.

(47) The code image data output apparatus according to (46), characterized in that the error correction condition setting means (66, 248) includes means (250, 252, 254) for alternatively selecting one of a plurality of error correction levels for the code data.

Since the appropriate correction condition for correcting the data error generated depending on the medium and the recording conditions can be set by alternative selection, the setting operation is simplified, and the operation efficiency can be increased.

(48) The code image data output apparatus according to (46), characterized in that the error correction condition setting means (66, 248) includes selection means (258) for selecting an error generation environment which is predicted for an error in code image reading, and conversion means (270) for predicting a rate of errors to be generated, on the basis of the selection means (258).

With the selection means for selecting the error generation environment and the conversion means for predicting the error rate, the data error correction capability can be set not by direct setting for which a relatively advanced knowledge about the dependent relationship between the data correction capability level and the correction condition is required but in accordance with a set item which can be easily predicted or grasped by the code operator.

(49) The code image data output apparatus according to (46), characterized in that the error correction condition setting means (66, 248) includes means (250, 274, 276) for alternatively selecting one of a plurality of code data interleave lengths.

Since the appropriate correction condition for correcting the data error depending on the recording medium and recording conditions, i.e., the interleave length can be set by alternative selection, the correction condition setting operation for a burst error is simplified, and the operation efficiency can be increased.

(50) The code image data output apparatus according to (29), characterized in that the code conversion means (22) includes management information setting means (70, 246) for adding, to the code data, various kinds of management information in converting the at least one unit data compression-coded by the compression coding means (20) into the code data.

Since the management information setting means can set various kinds of management information in converting the data into the code data, i.e., recognition information for a predetermined data management unit intermediately generated in code data conversion and structuring information for structuring the recognition information in accordance with the standard format, data design in different code data conversion modes can be appropriately and flexibly performed in accordance with the recording medium and the application purpose.

(51) The code image data output apparatus according to (29), characterized in that the precode generation means (40) includes supplementary information setting means (302) for setting recognition information which is supplementarily displayed together with the precode image generated by itself.

The precode image and information contents corresponding to the precode image cannot be recognized or can hardly be recognized only from the precode image. However, with the supplementary information setting means, the precode operator can set supplementary information which can be easily recognized or associated to the precode image. Therefore, the precode image and the corresponding information contents can be easily associated with each other, and layout edit processing based on only the precode image on the recording medium can be comfortably performed without generating any error.

(52) The code image data output apparatus according to (29), characterized in that the code conversion means (22) includes unit data linking means (240) for linking the plurality of unit data compression-coded by the compression coding means (20) and code image generation condition setting means (300) for setting various generation conditions in converting the unit data group linked by the unit data linking means (240) into the code image data.

The group of unit data which are to be set under the same code image generation conditions is generated. The conditions associated with code image generation, including the recording resolution of the code image on the recording medium and the dot pattern shape, can be set by the code image generation condition setting means. The conditions can be set such that the code image quality on the medium, which changes depending on the medium, the recording device, and the operation condition of the recording device, approaches the desired quality. Consequently, the correction performance in reading the recorded code image and reconstructing the information can be improved. In addition, size adjustment for the code image is enabled without adjusting the data amount. Therefore, the code image can be adapted to the recording area desired by the code operator.

(53) The code image data output apparatus according to (52), characterized in that the code image generation condition setting means (300) sets the code image generation conditions for the unit data group linked by the unit data linking means (240) on the basis of the precode image generated by the precode generation means (40) before the code image is recorded.

The code operator can easily confirm the actual recording size of the code image in a short time by setting the code image generation condition and generating the precode image. The code operator can quickly grasp the error in the desired code image size with reference to the precode image and reflect it on the change in setting of the code image generation condition. Therefore, the processes until setting the proper code image generation condition can be efficiently performed.

(54) The code image data output apparatus according to (52) or (53), characterized in that the code image data output apparatus is constituted such that when a plurality of code images are to be recorded, the plurality of code images can be recorded in the recording medium at once after the code image generation condition setting means (300) completes setting of various generation conditions for all the plurality of code images.

Utilizing the processes of setting the code image generation conditions and generating the precode image in a relatively short time, the code image generation conditions for generating a code image in a desired size can be easily determined in a short time. The process of generating an actual code image normally takes a relatively long time. When the plurality of code image is to be generated and output, operations until determination of the code image generation conditions, which require the code operator to ensure a time, are performed first, and thereafter, the code image generation operation which can be executed without the code operator is performed at once. With this processing, the operation efficiency can be increased.

(55) The code image data output apparatus according to (52), characterized in that the various generation conditions set by the code image generation condition setting means (300) are conditions associated with at least one of the recording medium and the recording device, and the code image generation condition setting means (300) includes means (312, 314) for obtaining a recommended recording condition on the basis of the conditions.

To optimize the code image output quality which changes depending on the conditions associated with the recording medium or the recording device, i.e., to minimize the read error of the code image, optimum code image generation conditions must be set. Even when the code operator does not have the knowledge about the dependent relationship between the conditions associated with the recording medium or the recording device and the code image output quality, the optimum code image generation condition can be indirectly set by the means for obtaining the recommended recording condition using information that the code operator can easily know.

(56) The code image data output apparatus according to (35), characterized in that the parameter associated with compression coding is information representing a compression-coding amount assigned to each predetermined divided area in the image.

When the compression-coding amount is optimally assigned to each predetermined divided area in the image, the compression-coding amount for each predetermined divided area can be adjusted in the subsequent compression coding processing. Therefore, highly precise data amount fine adjustment can be performed, and additionally, the degradation in image quality due to compression can be minimized.

(57) A code image data output apparatus which outputs code image data corresponding to multimedia information including at least one of voice information and image information to a recording device for recording the multimedia information on a recording medium as an optically readable code image, comprising:

input means (18) for inputting the multimedia information;

unit information generation means (28) for dividing the multimedia information input by the input means (18) into predetermined information units and generating at least one unit information;

compression coding means (20) for compression-coding unit data corresponding to the unit information in units of unit information generated by the unit information generation means (28); and code conversion means (22) for converting at least one unit data compression-coded by the compression coding means (20) into code data, converting the code data into optically readable code image data according to a predetermined recording format, and outputting the code image data, characterized by further comprising:

switching means (30, 38) for performing switching between a precode image generation mode in which a data amount of the compression-coded unit data in units of unit information generated by the unit information generation means (28) is calculated in advance before the code image is recorded, and precode image data determined on the basis of the calculated amount of at least one unit data is generated and output, and a code image generation mode in which the unit data is compression-coded in units of unit information generated by the unit information generation means (28), the at least one compressed unit data is converted into the code data, the code data is converted into the optically readable code image data according to the predetermined recording format, and the code image data is output.

Generally, in recording the code image, a desired balance structure is obtained for the positional relationship with other images simultaneously recorded on the same medium or the sizes of the images, and the code image size must be repeatedly confirmed until the structure is defined. When the multimedia information constituted by the plurality of unit data is to be converted into the code image and output, in the precode image generation mode, the precode image data can be generated without executing code conversion processing of generating the code image data before the code image is recorded. With this arrangement, the code image operator can immediately know the recorded state of the code image actually recorded on the medium, so that the operation of arranging/editing the code image on the page can be quickly and efficiently performed.

Code image generation processing can easily shift to the code image generation mode by switching the mode. The code image output result can be obtained by a very simple operation, and a convenient apparatus can be provided.

(58) A code image data output method of outputting code image data corresponding to multimedia information including at least one of voice information and image information to a recording device for recording the multimedia information on a recording medium as an optically readable code image, characterized by comprising the steps of:

dividing the input multimedia information into predetermined information units;

calculating a data amount of compression-coded unit data corresponding to the unit information in units of the divided unit information in advance;

generating precode image data on the basis of the calculated amount of at least one unit data;

compression-coding the unit data in units of unit information to convert the unit data into code data; and converting the code data into optically readable code image data according to a predetermined recording format and outputting the code image data.

In the method of converting the multimedia information constituted by the plurality of unit data into the code image and outputting the code image, the precode image on which the code image size necessary for the operation of arranging/editing the code image on the page is reflected can be obtained in advance without individually performing data compression coding processing which requires a relatively long processing time. For this reason, the code image operator can immediately know the recorded state of the code image actually recorded on the medium, so that the operation of arranging/editing the code image on the page can be quickly and efficiently performed.

In addition, since code image can be generated independently of the operation of arranging/editing the code image on the page, the code image can be output in the minimum and necessary time in the entire operation processes until the code image is output. Therefore, an operation method with a high time use efficiency can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A code image data output apparatus which outputs image data of an optically readable code image to a recording device for recording at least one of audio and image information as the code image on a recording medium such as a sheet of paper, said apparatus comprising:

an input section for inputting said at least one of audio and image information;

a code conversion section for processing said at least one of audio and image information input by the input section and converting it to the image data of the optically readable code image in a predetermined recording format;

an output section for outputting the image data of the code image converted by the code conversion section, to the recording device;

a display section for displaying how the code image corresponding to said at least one of audio and image information by the input section is laid out on the recording medium; and a reproduction section for reproducing said at least one of audio and image information whose code image layout is displayed on the display section in such a manner that a user can check the contents of said at least one of audio and image information.

2. A code image data output apparatus according to claim 1, wherein said reproduction section reproduces said at least one of the audio and image information that is obtained by decoding the image data of the code image converted by the code conversion section.

3. A code image data output apparatus according to claim 1, wherein said reproduction section reproduces said at least one of the audio and image information of a state before being converted to the image data of the code image.

4. A code image data output apparatus according to claim 1, wherein said reproduction section initiates a reproducing operation in response to the user selecting on the display section said at least one of audio and image information that is laid out as the code image.

5. A code image data output apparatus according to claim 1, wherein said at least one of audio and image information displayed on the display section is laid out as a pre-code image that is obtained by a calculation performed before a converting operation of the code conversion section through which the image data of the code image is obtained.

6. A code image data output method of outputting image data of an optically readable code image to a recording device for recording at least one of audio and image information as the code image on a recording medium such as a sheet of paper, said method comprising the steps of:

inputting said at least one of audio and image information;

processing said at least one of audio and image information input at the inputting step and converting it to the image data of the optically readable code image in a predetermined recording format; and outputting the image data of the code image converted at the code converting step to the recording device, wherein, before the code image is recorded onto the recording medium by the recording device, how the code image corresponding to said at least one of audio and image information input at the inputting step is laid out on the recording medium is displayed on a display section, and said at least one of the laid out audio and image information is reproduced, in such a manner that a user can check the contents of said at least one of audio and image information.

7. A code image data output method according to claim 6, wherein said at least one of audio and image information is reproduced by decoding the image data of the code image converted at the code converting step.

8. A code image data output method according to claim 6, wherein said at least one of audio and image information of a state before being converted to the image data of the code image is reproduced.

9. A code image data output method according to claim 6, wherein said at least one of audio and image information is reproduced in response to the user selecting on the display section said at least one of audio and image information that is laid out as the code image.

10. A code image data output method according to claim 6, wherein said at least one of audio and image information is laid out as a pre-code image that is obtained by a calculation performed before the code converting step at which said at least one of audio and image information is actually converted to the image data of the code image.

* * * * *